(12) United States Patent
Couzin et al.

(10) Patent No.: US 9,075,177 B2
(45) Date of Patent: *Jul. 7, 2015

(54) LIGHT ENHANCING STRUCTURES WITH A PLURALITY OF ARRAYS OF ELONGATE FEATURES

(75) Inventors: Dennis I. Couzin, Berlin (DE); William J. Cassarly, Wooster, OH (US); Steven R. Chapman, Glenview, IL (US)

(73) Assignee: Avery Dennison Corporation, Pasadena, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 12/984,498

(22) Filed: Jan. 4, 2011

(65) Prior Publication Data

US 2011/0255306 A1    Oct. 20, 2011

Related U.S. Application Data

(63) Continuation of application No. 11/594,712, filed on Nov. 8, 2006, now Pat. No. 7,866,871.

(60) Provisional application No. 60/759,086, filed on Jan. 13, 2006.

(51) Int. Cl.
*F21V 7/04* (2006.01)
*F21V 8/00* (2006.01)
(Continued)

(52) U.S. Cl.
CPC .............. *G02B 6/0053* (2013.01); *G02B 5/021* (2013.01); *G02B 5/0278* (2013.01); *G02B 5/045* (2013.01);
(Continued)

(58) Field of Classification Search
CPC ........... G02B 19/0028; G02B 19/0052; G02B 19/0061; G02B 27/0994; G02B 27/1006
USPC .................................................. 362/600–634
See application file for complete search history.

(56) References Cited

U.S. PATENT DOCUMENTS

| 2,050,429 | A | 8/1936 | Dorey et al. |
| 2,971,083 | A | 2/1961 | Phillips et al. |

(Continued)

FOREIGN PATENT DOCUMENTS

| EP | 0390344 | 10/1990 |
| EP | 0814300 | 12/1997 |

(Continued)

OTHER PUBLICATIONS

Davis, "Microstructured Optics for LED Applications", http://www.fresnel-optics.com/technical_papers.htm (Oct. 2002).

(Continued)

*Primary Examiner* — Anh Mai
*Assistant Examiner* — Jessica M Apenteng
(74) *Attorney, Agent, or Firm* — Knobbe, Martens, Olson & Bear, LLP

(57) ABSTRACT

Various embodiments comprise light recycling films comprising an array of parallel ridges and grooves that form prisms that selectively reflect or transmit light. In some embodiments, the light recycling film may be used in displays that include spatial light modulators comprising a plurality of pixels. The light recycling film can limit the field-of-view of the display and enhance the luminance within that field-of-view. Various embodiments comprising multiple arrays of ridges and/or grooves can enhance uniformity of illumination of the pixels in the spatial light modulator and reduce Moiré effects.

16 Claims, 54 Drawing Sheets

(51) Int. Cl.
*G02B 5/02* (2006.01)
*G02B 5/04* (2006.01)
*G02B 19/00* (2006.01)
G02B 27/09 (2006.01)
G02B 27/10 (2006.01)

(52) U.S. Cl.
CPC ............ *G02B 6/0025* (2013.01); *G02B 6/0028* (2013.01); *G02B 6/0046* (2013.01); *G02B 27/0994* (2013.01); *G02B 27/1006* (2013.01); *G02B 19/0052* (2013.01); *G02B 19/0028* (2013.01); *G02B 19/0061* (2013.01)

(56) References Cited

U.S. PATENT DOCUMENTS

| | | | |
|---|---|---|---|
| 3,043,947 A | 7/1962 | Albinger, Jr. | |
| 3,163,367 A | 12/1964 | Bodian | |
| 3,258,590 A | 6/1966 | Goodbar | |
| 3,532,876 A | 10/1970 | Muller et al. | |
| 3,716,710 A | 2/1973 | Clostermann et al. | |
| 4,064,433 A | 12/1977 | Korn | |
| 4,260,220 A | 4/1981 | Whitehead | |
| 4,359,265 A | 11/1982 | Winston | |
| 4,452,449 A | 6/1984 | Propst | |
| 4,486,363 A | 12/1984 | Pricone et al. | |
| 4,542,449 A | 9/1985 | Whitehead | |
| 4,573,764 A | 3/1986 | Bradley | |
| 4,576,850 A | 3/1986 | Martens | |
| 4,791,540 A | 12/1988 | Dreyer, Jr. et al. | |
| 4,799,131 A | 1/1989 | Aho et al. | |
| 4,799,137 A | 1/1989 | Aho | |
| 4,883,341 A | 11/1989 | Whitehead | |
| 4,906,070 A | 3/1990 | Cobb, Jr. | |
| 4,975,808 A | 12/1990 | Bond et al. | |
| 4,984,144 A | 1/1991 | Cobb, Jr. et al. | |
| 5,005,108 A | 4/1991 | Pristash et al. | |
| 5,056,892 A | 10/1991 | Cobb, Jr. | |
| 5,161,041 A | 11/1992 | Abileah et al. | |
| 5,175,030 A | 12/1992 | Lu et al. | |
| 5,183,597 A | 2/1993 | Lu | |
| 5,280,371 A | 1/1994 | McCartney, Jr. et al. | |
| 5,289,351 A | 2/1994 | Kashima et al. | |
| 5,339,179 A | 8/1994 | Rudisill et al. | |
| 5,359,691 A | 10/1994 | Tai et al. | |
| 5,390,276 A | 2/1995 | Tai et al. | |
| 5,396,350 A | 3/1995 | Beeson et al. | |
| 5,402,324 A | 3/1995 | Yokoyama et al. | |
| 5,428,468 A | 6/1995 | Zimmerman et al. | |
| 5,442,523 A | 8/1995 | Kashima et al. | |
| 5,462,700 A | 10/1995 | Beeson et al. | |
| 5,521,797 A | 5/1996 | Kashima et al. | |
| 5,528,270 A | 6/1996 | Tajika et al. | |
| 5,528,720 A | 6/1996 | Winston et al. | |
| 5,555,109 A | 9/1996 | Zimmerman et al. | |
| 5,557,836 A | 9/1996 | Smith et al. | |
| 5,572,411 A | 11/1996 | Watai et al. | |
| 5,594,830 A | 1/1997 | Winston | |
| 5,598,281 A | 1/1997 | Zimmerman et al. | |
| 5,600,455 A | 2/1997 | Ishikawa et al. | |
| 5,600,462 A | 2/1997 | Suzuki et al. | |
| 5,608,550 A | 3/1997 | Epstein et al. | |
| 5,626,800 A | 5/1997 | Williams et al. | |
| 5,635,278 A | 6/1997 | Williams | |
| 5,657,408 A | 8/1997 | Ferm et al. | |
| 5,716,681 A | 2/1998 | Williams | |
| 5,721,603 A | 2/1998 | De Vaan et al. | |
| 5,730,518 A | 3/1998 | Kashima et al. | |
| 5,735,590 A | 4/1998 | Kashima et al. | |
| 5,739,931 A | 4/1998 | Zimmerman et al. | |
| 5,748,828 A | 5/1998 | Steiner et al. | |
| 5,764,413 A * | 6/1998 | Smith et al. | 359/530 |
| 5,771,328 A | 6/1998 | Wortman et al. | |
| 5,828,488 A | 10/1998 | Ouderkirk et al. | |
| 5,831,767 A * | 11/1998 | Benson et al. | 359/529 |
| 5,831,797 A | 11/1998 | Schaenzer et al. | |
| 5,833,344 A | 11/1998 | Arai et al. | |
| 5,839,812 A | 11/1998 | Ge et al. | |
| 5,839,823 A | 11/1998 | Hou et al. | |
| 5,851,062 A | 12/1998 | Shinohara et al. | |
| 5,858,139 A | 1/1999 | Ouderkirk et al. | |
| 5,908,874 A | 6/1999 | Fong et al. | |
| 5,917,664 A * | 6/1999 | O'Neill et al. | 359/831 |
| 5,919,551 A | 7/1999 | Cobb, Jr. et al. | |
| 5,926,601 A | 7/1999 | Tai et al. | |
| 5,949,933 A | 9/1999 | Steiner et al. | |
| 5,995,288 A | 11/1999 | Kashima et al. | |
| 6,024,462 A | 2/2000 | Whitehead | |
| 6,025,897 A | 2/2000 | Weber et al. | |
| 6,049,649 A | 4/2000 | Arai | |
| 6,052,164 A | 4/2000 | Cobb, Jr. et al. | |
| 6,074,069 A | 6/2000 | Chao-Ching et al. | |
| 6,091,547 A | 7/2000 | Gardiner et al. | |
| 6,099,134 A | 8/2000 | Taniguchi et al. | |
| 6,129,439 A | 10/2000 | Hou et al. | |
| 6,151,166 A | 11/2000 | Matsushita et al. | |
| 6,151,169 A | 11/2000 | Kim | |
| 6,213,625 B1 | 4/2001 | Leadford et al. | |
| 6,277,471 B1 | 8/2001 | Tang | |
| 6,280,063 B1 | 8/2001 | Fong et al. | |
| 6,293,683 B1 | 9/2001 | Okada | |
| 6,322,236 B1 | 11/2001 | Campbell et al. | |
| 6,354,709 B1 | 3/2002 | Campbell et al. | |
| 6,355,754 B1 | 3/2002 | Olson et al. | |
| 6,356,391 B1 | 3/2002 | Gardiner et al. | |
| 6,359,170 B1 | 3/2002 | Olson | |
| 6,368,682 B1 | 4/2002 | Fong | |
| 6,454,452 B1 | 9/2002 | Sasagawa et al. | |
| 6,533,959 B2 | 3/2003 | Olson | |
| 6,543,153 B1 | 4/2003 | Weber et al. | |
| 6,559,911 B2 | 5/2003 | Arakawa et al. | |
| 6,560,026 B2 | 5/2003 | Gardiner et al. | |
| 6,570,710 B1 | 5/2003 | Nilsen et al. | |
| 6,581,286 B2 | 6/2003 | Campbell et al. | |
| 6,582,095 B1 | 6/2003 | Toyoda | |
| 6,603,520 B2 | 8/2003 | Umemoto et al. | |
| 6,606,133 B1 | 8/2003 | Okabe | |
| 6,609,809 B2 | 8/2003 | Ohkawa | |
| 6,631,998 B2 | 10/2003 | Egawa et al. | |
| 6,636,358 B2 | 10/2003 | Umemoto et al. | |
| 6,652,109 B2 * | 11/2003 | Nakamura | 362/600 |
| 6,707,611 B2 | 3/2004 | Gardiner et al. | |
| 6,751,023 B2 | 6/2004 | Umemoto et al. | |
| 6,759,113 B1 | 7/2004 | Tang | |
| 6,761,461 B2 | 7/2004 | Mizutani et al. | |
| 6,798,574 B2 | 9/2004 | Kim | |
| 6,811,272 B2 | 11/2004 | O'Connor et al. | |
| 6,811,274 B2 | 11/2004 | Olczak | |
| 6,845,212 B2 | 1/2005 | Gardiner et al. | |
| 6,871,966 B2 | 3/2005 | Couzin et al. | |
| 6,880,496 B2 | 4/2005 | Batzill et al. | |
| 6,880,946 B2 | 4/2005 | Mullen | |
| 6,952,627 B2 | 10/2005 | Olczak et al. | |
| 6,984,047 B2 | 1/2006 | Couzin et al. | |
| 7,018,088 B2 | 3/2006 | Yu et al. | |
| 7,230,764 B2 | 6/2007 | Mullen et al. | |
| 7,277,609 B2 | 10/2007 | Cassarly | |
| 7,317,501 B2 | 1/2008 | Tanaka et al. | |
| 7,318,501 B2 | 1/2008 | Felder | |
| 7,360,939 B2 | 4/2008 | Sugiura | |
| 7,364,341 B2 | 4/2008 | Parker et al. | |
| 7,364,342 B2 | 4/2008 | Parker et al. | |
| 7,366,393 B2 | 4/2008 | Cassarly et al. | |
| 7,407,317 B2 | 8/2008 | Lee et al. | |
| 7,545,569 B2 | 6/2009 | Cassarly | |
| 7,674,028 B2 | 3/2010 | Cassarly et al. | |
| 7,866,871 B2 | 1/2011 | Couzin et al. | |
| 2002/0008899 A1 | 1/2002 | Tanaka et al. | |
| 2002/0163790 A1 | 11/2002 | Yamashita et al. | |
| 2003/0075815 A1 | 4/2003 | Couzin et al. | |
| 2003/0117793 A1 | 6/2003 | Shin et al. | |
| 2003/0214728 A1 | 11/2003 | Olczak | |
| 2004/0076396 A1 | 4/2004 | Suga | |
| 2004/0085749 A1 | 5/2004 | Parker et al. | |

(56) References Cited

U.S. PATENT DOCUMENTS

| | | | |
|---|---|---|---|
| 2004/0114244 A1 | 6/2004 | Couzin | |
| 2004/0114346 A1* | 6/2004 | Parker et al. | 362/31 |
| 2004/0246599 A1 | 12/2004 | Nilsen | |
| 2005/0018292 A1 | 1/2005 | Mimura et al. | |
| 2005/0018309 A1 | 1/2005 | McGuire, Jr. et al. | |
| 2005/0024849 A1 | 2/2005 | Parker et al. | |
| 2005/0147374 A1 | 7/2005 | Gardiner | |
| 2005/0179632 A1 | 8/2005 | Miyachi et al. | |
| 2005/0280752 A1 | 12/2005 | Kim et al. | |
| 2006/0002149 A1 | 1/2006 | Lee et al. | |
| 2006/0092490 A1 | 5/2006 | McCollum et al. | |
| 2006/0103777 A1 | 5/2006 | Ko et al. | |
| 2006/0232998 A1 | 10/2006 | Tsai et al. | |
| 2007/0035843 A1 | 2/2007 | Cassarly | |
| 2007/0086086 A1 | 4/2007 | Cassarly et al. | |
| 2007/0086207 A1 | 4/2007 | Cassarly et al. | |
| 2007/0091616 A1 | 4/2007 | Cassarly et al. | |
| 2007/0091617 A1 | 4/2007 | Couzin et al. | |
| 2007/0285941 A1 | 12/2007 | Ishihara et al. | |
| 2008/0248256 A1 | 10/2008 | Kim et al. | |

FOREIGN PATENT DOCUMENTS

| | | |
|---|---|---|
| EP | 1004819 | 5/2000 |
| EP | 1336876 | 8/2003 |
| EP | 1486802 | 12/2004 |
| EP | 1491919 | 12/2004 |
| JP | 06-308485 | 4/1994 |
| JP | 07-218706 | 8/1995 |
| JP | 10-311910 | 11/1998 |
| JP | 11-305017 | 11/1999 |
| WO | WO 96/16348 | 5/1996 |
| WO | WO 03/050448 | 6/2003 |
| WO | WO 2005/119350 | 12/2005 |
| WO | WO 2007/081632 A1 | 7/2007 |
| WO | WO 2007/087031 A1 | 8/2007 |
| WO | WO 2007/087034 A2 | 8/2007 |
| WO | WO 2007/087035 A1 | 8/2007 |
| WO | WO 2007/087036 A1 | 8/2007 |

OTHER PUBLICATIONS

IBM Technical Disclosure Bulletin, vol. 34, No. 9, pp. 148-149 (Feb. 1992).
International Search Report and Written Opinion for International Application PCT/US2006/047361, mailed Jun. 21, 2007, in 11 pages.
International Search Report and Written Opinion for International Application PCT/US2006/047471, mailed Aug. 6, 2007, in 11 pages.
International Search Report and Written Opinion for PCT Application PCT/US2006/047494, mailed Jun. 1 2007, in 11 pages.
International Search Report and Written Opinion for International Application PCT/US2006/047535, mailed Jun. 8, 2007, in 12 pages.
"Start on mass production of DIAART™ Y-type prism sheets for high luminance LCD displays", Mitsubishi Rayon Co., Ltd. Press Release, Apr. 2, 2003.
International Preliminary Report on Patentability for International Application No. PCT/US2006/047494, issued Jul. 15, 2008, in 1 page.
Written Opinion of the International Searching Authority for International Application No. PCT/US2006/047494, issued Jul. 15, 2008, in 5 pages.
International Preliminary Report on Patentability for International Application No. PCT/US2006/047361, issued Jul. 15, 2008, in 2 pages.
Written Opinion of the International Searching Authority for International Application No. PCT/US2006/047361, issued Jul. 15, 2008, in 5 pages.
International Preliminary Report on Patentability for International Application No. PCT/US2006/047471, mailed on Jul. 15, 2008, in 6 pages.
International Preliminary Report on Patentability for International Application No. PCT/US2006/047535, mailed on Jul. 15, 2008, in 7 pages.
International Search Report for International Application No. PCT/US2006/061941, mailed on Apr. 26, 2007, in 2 pages.
International Preliminary Report on Patentability for International Application No. PCT/US2006/061941, mailed on Jul. 15, 2008, in 6 pages.
Suzuki et al., High Efficiency Back Light for LCD, *IBM Technical Disclosure Bulletin*, Feb. 1991, pp. 261-262, vol. 33(9).
Olsen, Generating Fast and Very Slow Propagating Modes to Accommodate Potentially High-Dispersive Optical Multi-Mode Waveguides, *IBM Technical Disclosure Bulletin*, Feb. 1992, pp. 148-149, vol. 34(9).
Wilson et al., Predicting Performance of a Microlens LCD Brightness Film, *SID 06 Digest*, pp. 1332-1335, vol. 32(1), Jun. 7, 2006.
Olczak et al., A Moiré-Free Platform for LCD Backlighting, *SID 06 Digest*, pp. 1336-1339, vol. 32(2), Jun. 7, 2006.
DIAART, http:/www.mrc.co.jp/English/rde/content/information/html.
Mar. 26, 2009 Election of species requirement in U.S. Appl. No. 11/594,698 in 5 pages.
Apr. 24, 2009 Response to Election of Species Requirement in U.S. Appl. No. 11/594,698 in 15 pages.
Jun. 26, 2009 Non-Final Office Action in U.S. Appl. No. 11/594,698 in 21 pages.
Dec. 21, 2009 Response to Office Action Dated Jun. 26, 2009 in U.S. Appl. No. 11/594,698 in 20 pages.
Jan. 26, 2010 Final Office Action in U.S. Appl. No. 11/594,698 in 34 pages.
Feb. 22, 2008 Restriction Requirement in U.S. Appl. No. 11/594,699 in 6 pages.
Mar. 20, 2008 Response to Restriction Requirement of Feb. 22, 2008, in U.S. Appl. No. 11/594,699 in 10 pages.
Jun. 27, 2008 Non-final Office Action in U.S. Appl. No. 11/594,699 in 15 pages.
Nov. 25, 2008 Response to Jun. 27, 2008 Non-final Office Action in U.S. Appl. No. 11/594,699 in 13 pages.
Mar. 23, 2009 Final Office Action in U.S. Appl. No. 11/594,699 in 11 pages.
Jul. 23, 2009 Amendment filed with Request for Continued Examination in U.S. Appl. No. 11/594,699 in 9 pages.
Aug. 10, 2009 Notice of Allowance in U.S. Appl. No. 11/594,699 in 9 pages.
Nov. 9, 2009 Issue Fee Payment Form in U.S. Appl. No. 11/594,699 in 1 page.
Nov. 9, 2009 Comment on Statement of Reasons for Allowance in U.S. Appl. No. 11/594,699 in 2 pages.
Nov. 9, 2009 Amendment after Notice of Allowance Pursuant to 37CFR 1.312 in U.S. Appl. No. 11/594,699 in 8 pages.
Sep. 28, 2007 Notice of Allowance in U.S. Appl. No. 11/594,692 in 11 pages.
Dec. 3, 2007 Issue Fee Transmittal and Comments on Statement of Reasons for Allowance in U.S. Appl. No. 11/594,692 in 3 pages.
Jan. 23, 2008 Request for Continued Examination and Petition to Withdraw Application from Issue in U.S. Appl. No. 11/594,692 in 7 pages.
Jan. 31, 2008 Notice of Allowance in U.S. Appl. No. 11/594,692 in 12 pages.
Mar. 11, 2008 Issue Fee Transmittal and Comments on Statement of Reasons for Allowance in U.S. Appl. No. 11/594,692 in 3 pages.
Oct. 2, 2008 Request for Certificate of Correction in U.S. Appl. No. 11/594,692 in 4 pages.
Jul. 16, 2007 Preliminary Amendment in U.S. Appl. No. 11/594,434, filed Nov. 8, 2006 in 6 pages.
Sep. 24, 2008 Non-final Office Action received in U.S. Appl. No. 11/594,434 in 11 pages.
Dec. 24, 2008 Amendment in response to Sep. 24, 2008 Non-final Office Action U.S. Appl. No. 11/594,434 in 18 pages.
Mar. 10, 2009 Notice of Allowance in U.S. Appl. No. 11/594,434 in 7 pages.
May 6, 2009 Issue Fee Transmittal in U.S. Appl. No. 11/594,434 in 1 page.

* cited by examiner

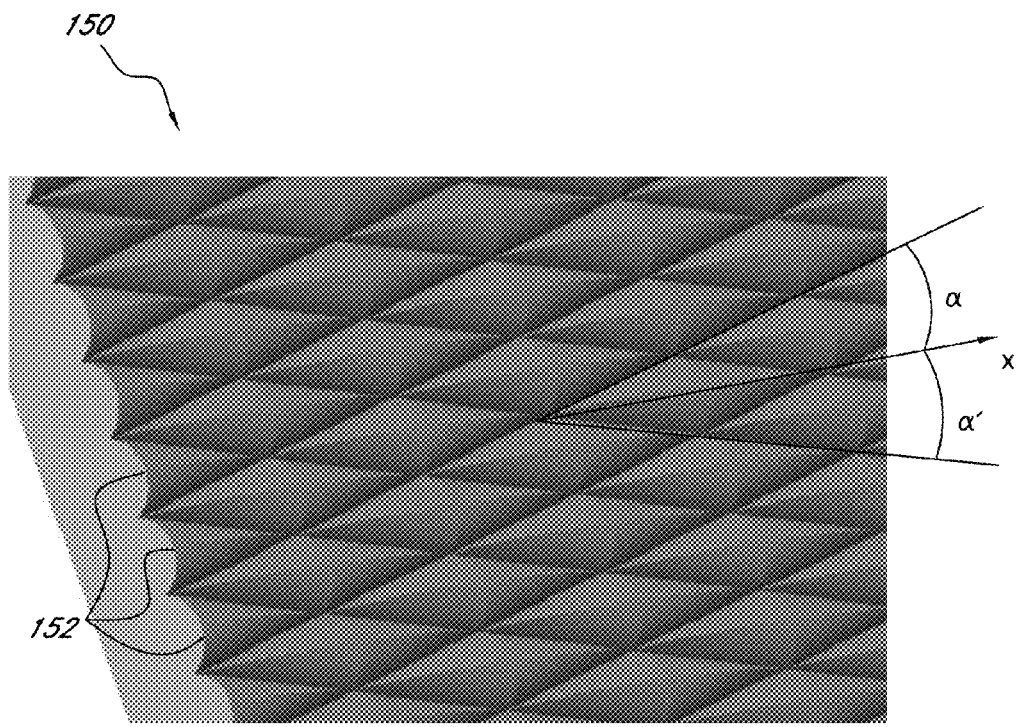
FIG. 3O
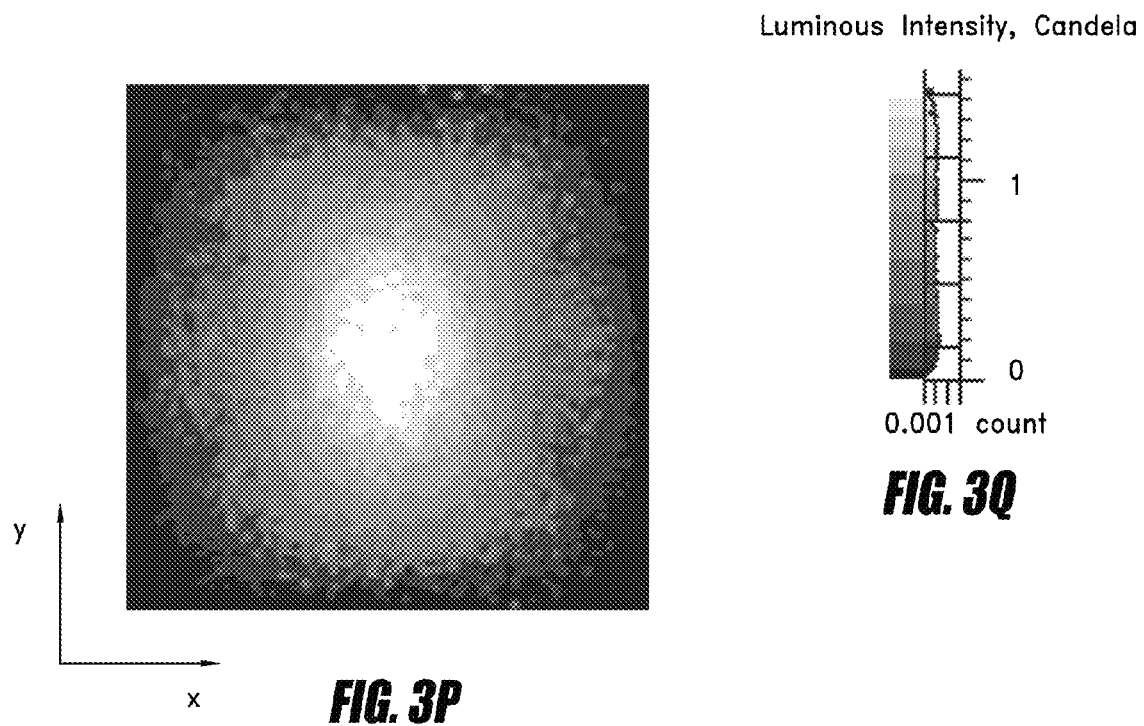
FIG. 3P
FIG. 3Q

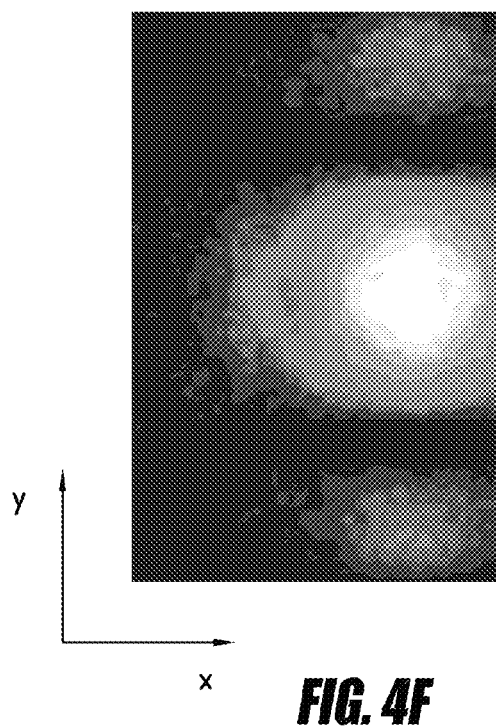
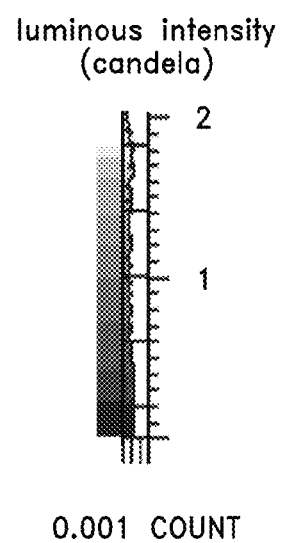
*FIG. 4F*   *FIG. 4H*
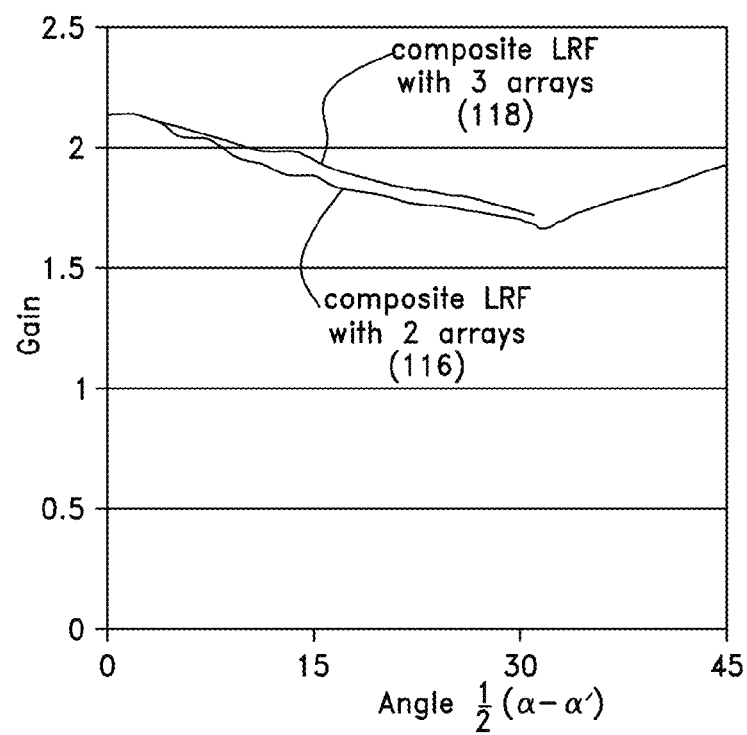
*FIG. 4G*

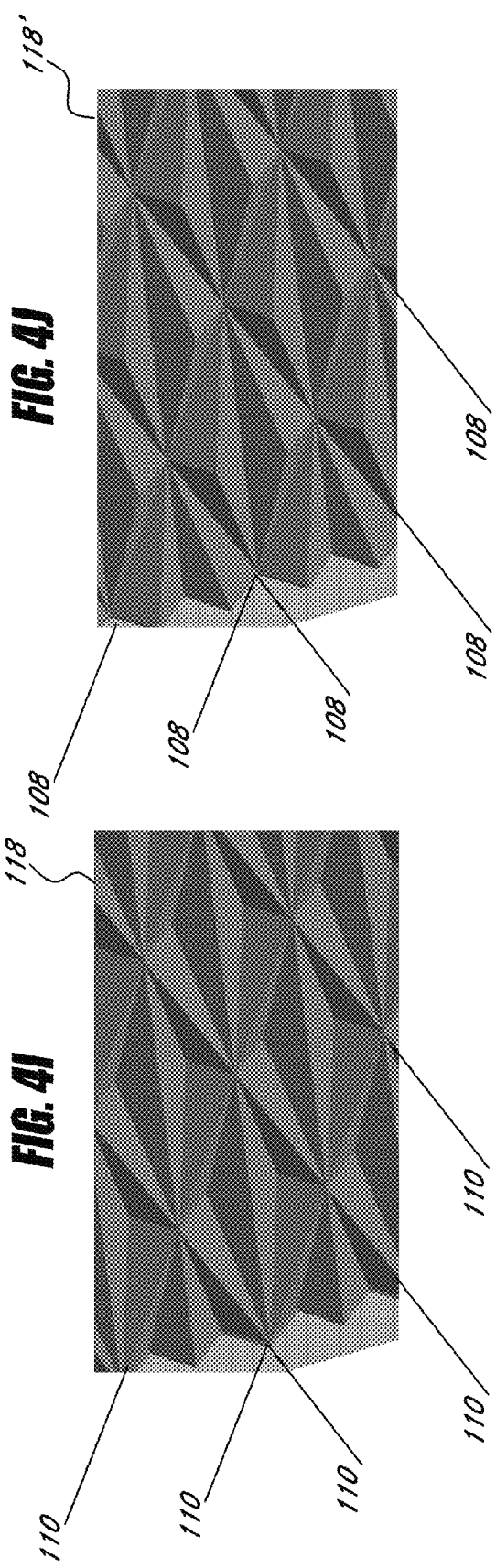

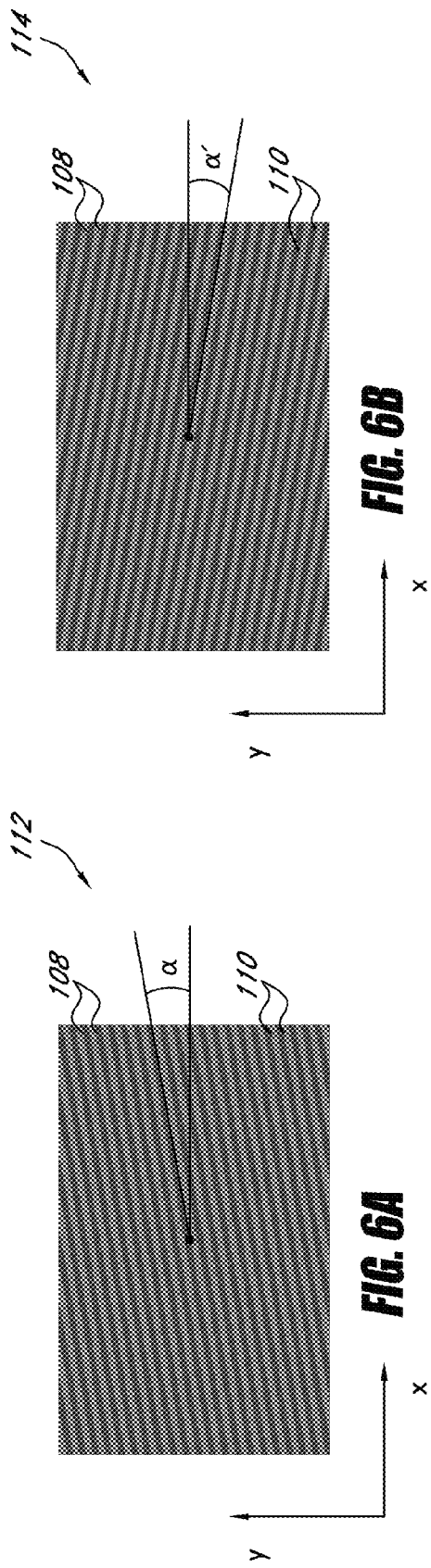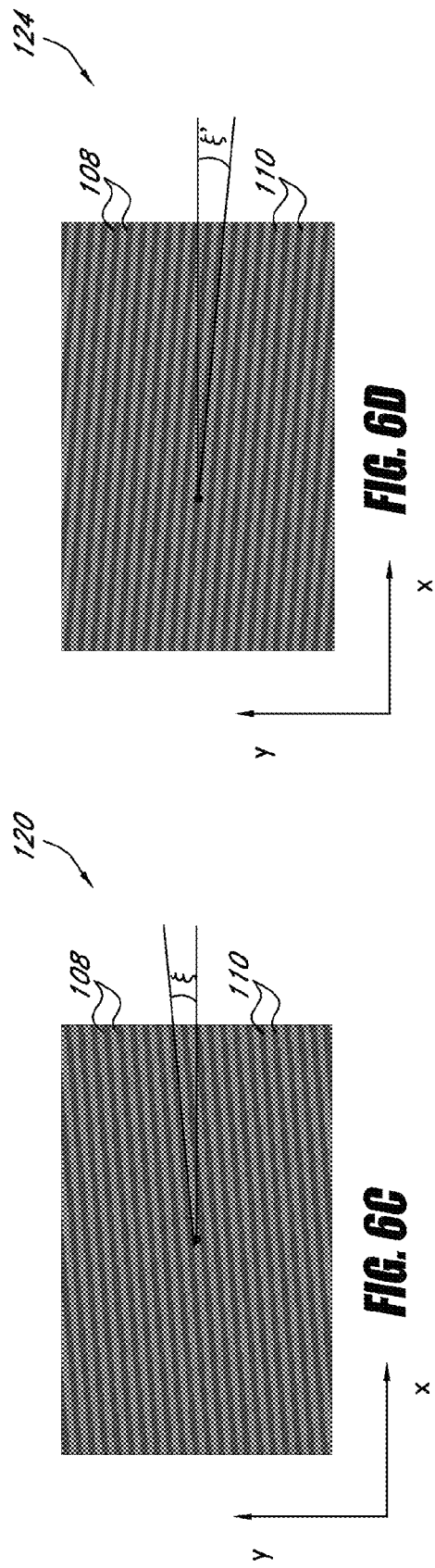

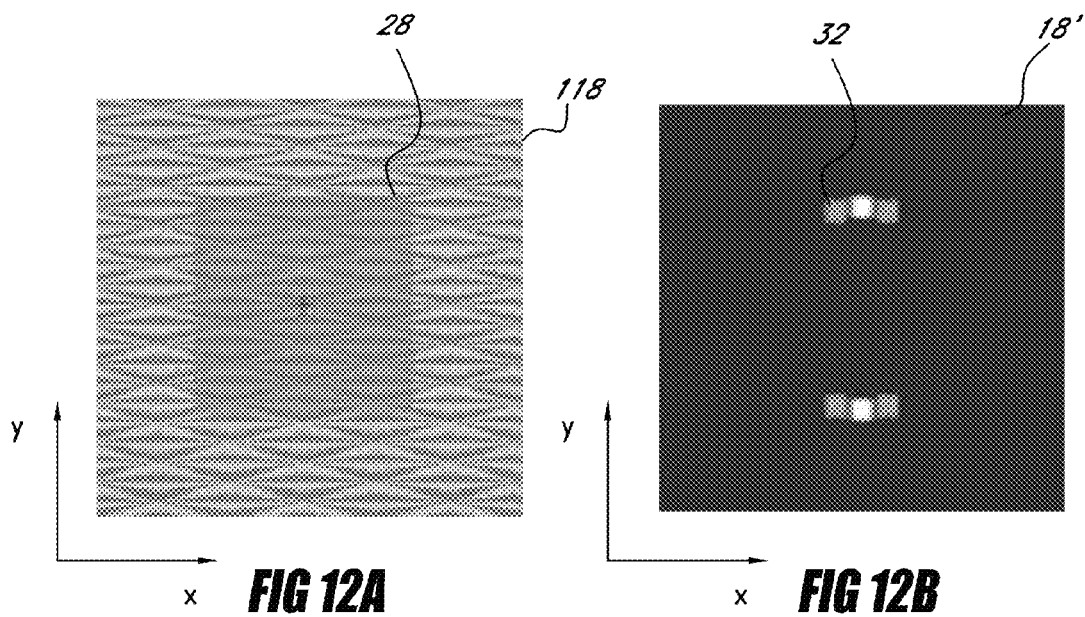
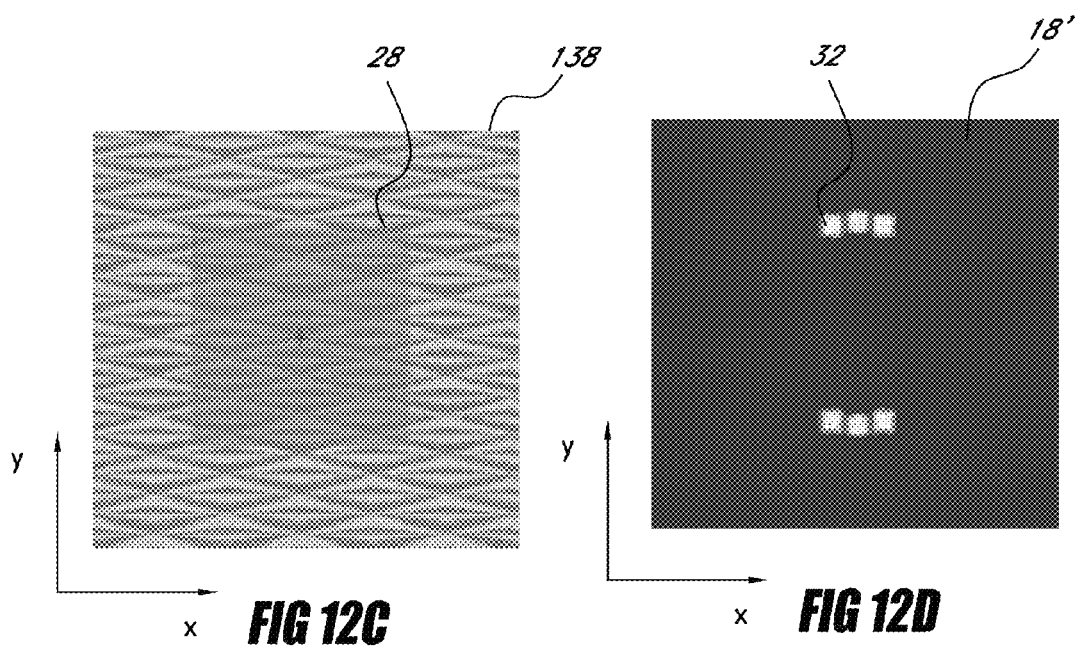

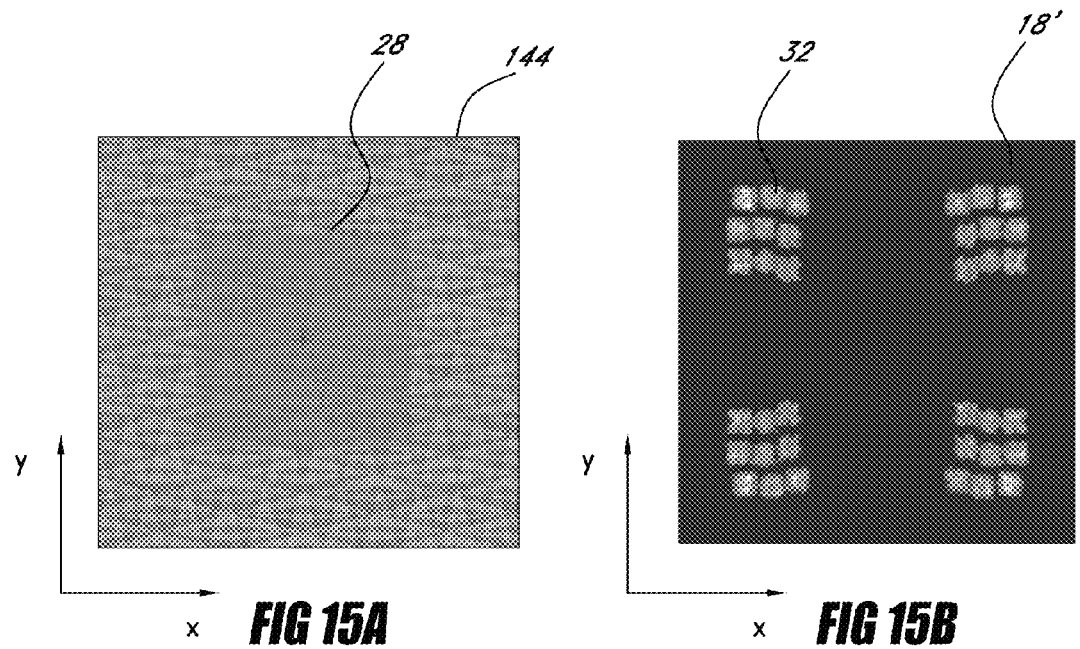
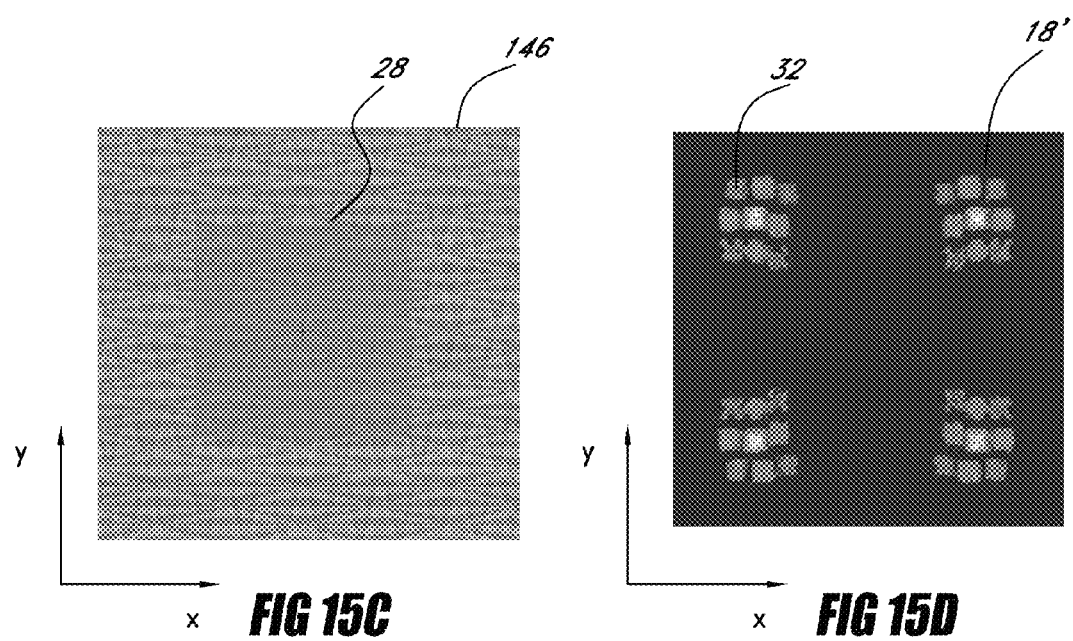

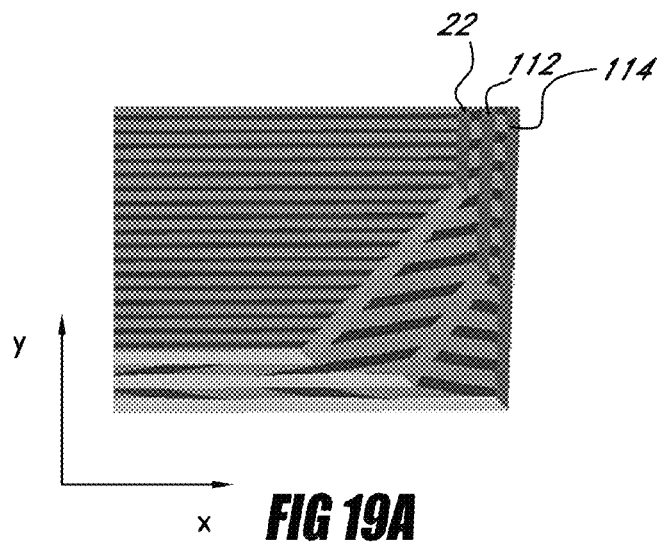
FIG 19A
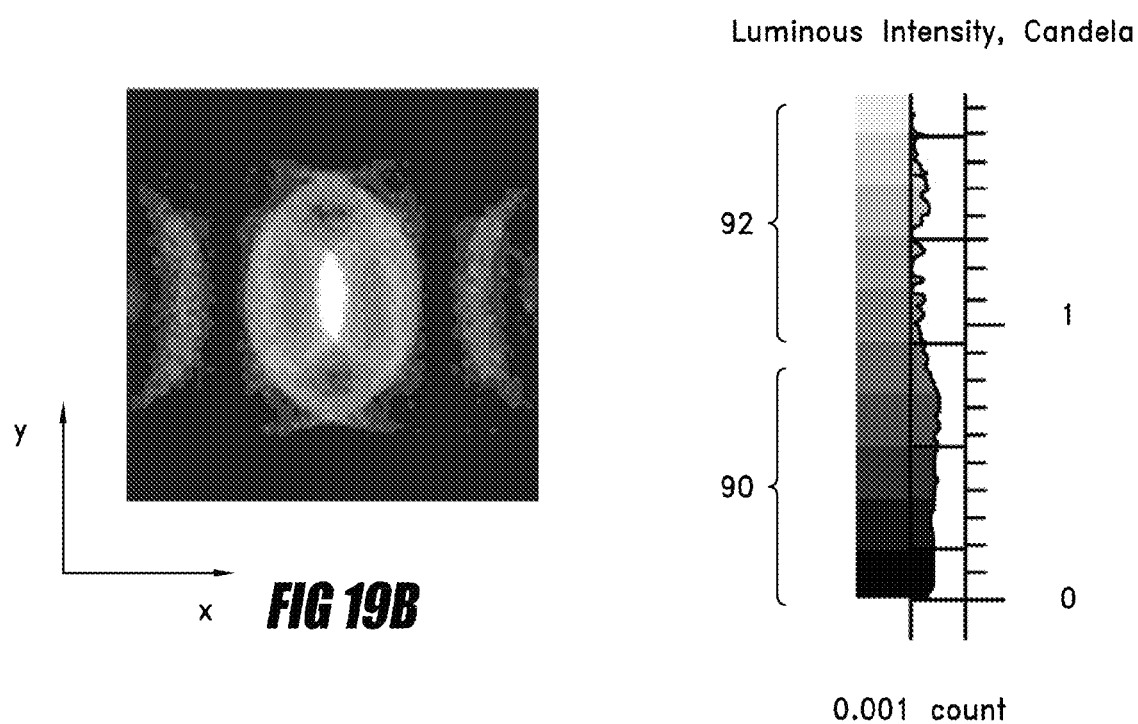
FIG 19B
FIG 19C

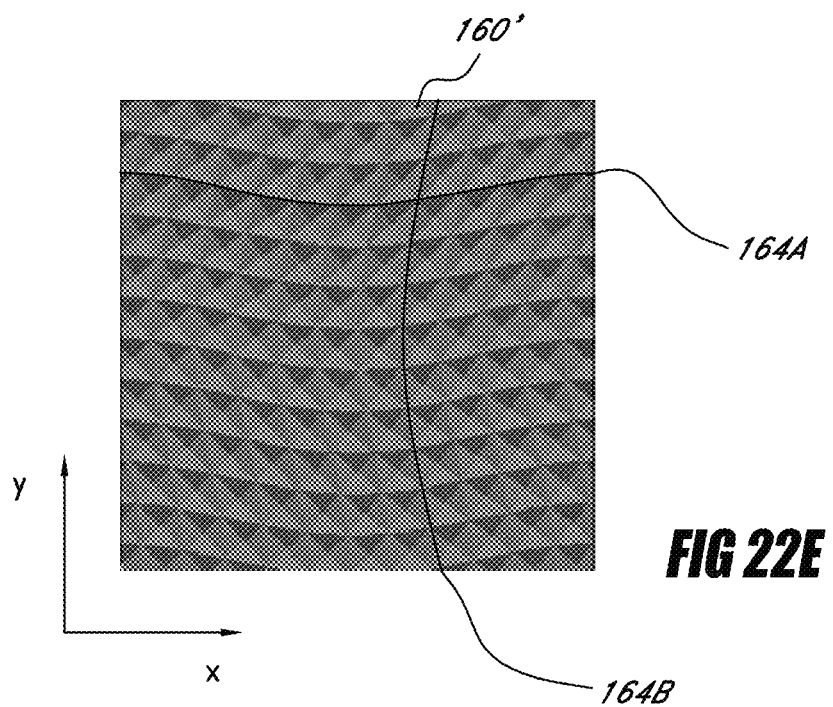

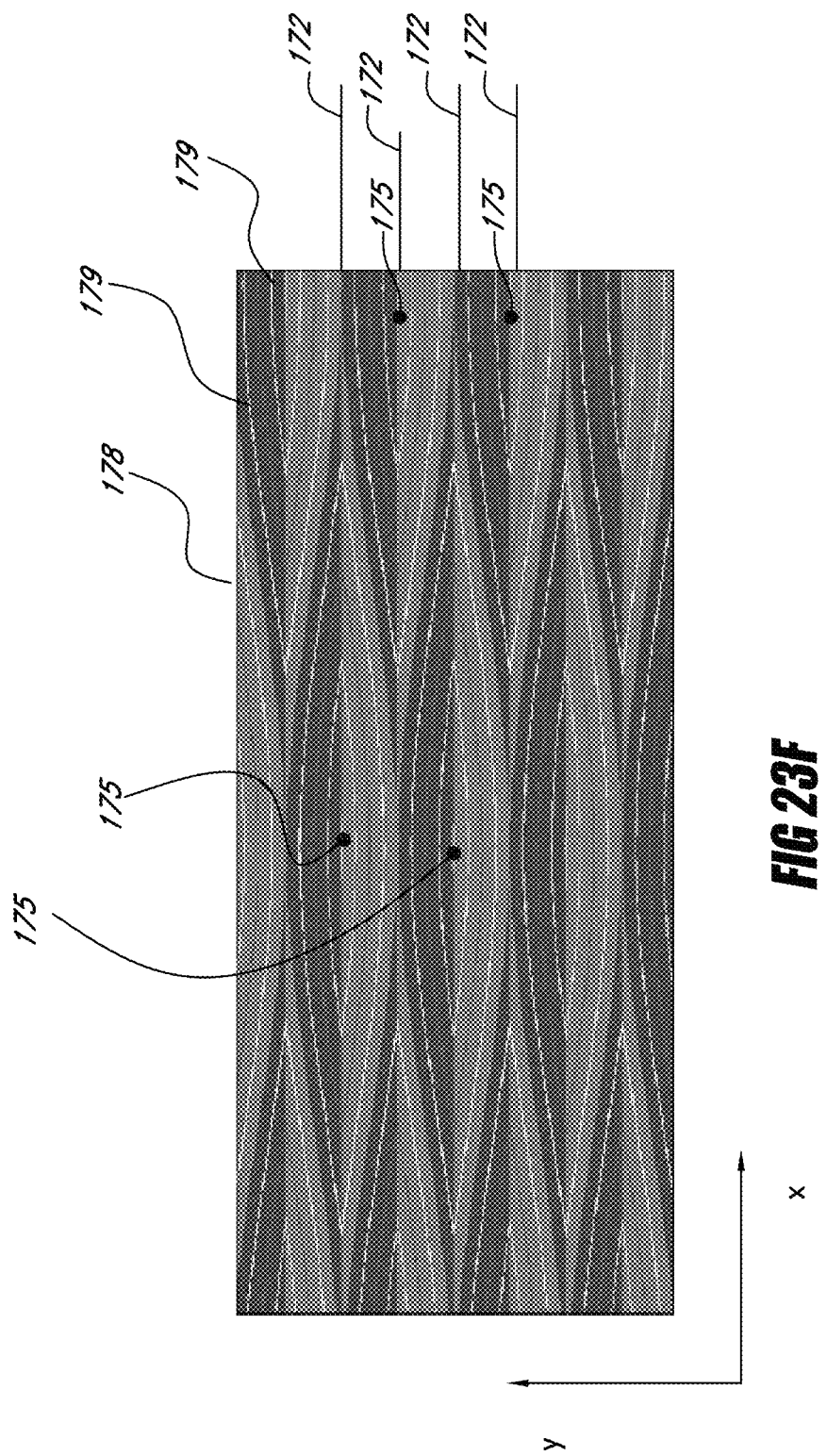

LIGHT ENHANCING STRUCTURES WITH A PLURALITY OF ARRAYS OF ELONGATE FEATURES

PRIORITY APPLICATIONS

This application is a continuation of U.S. patent application Ser. No. 11/594,712, filed Nov. 8, 2006, entitled "Light Enhancing Structures With a Plurality of Arrays of Elongate Features," now U.S. Pat. No. 7,866,871, which claims priority to U.S. Provisional Patent Application No. 60/759,086 entitled "Light Recycling Structures with Multiple Arrays of Elongate Features" filed Jan. 13, 2006; each of the aforementioned applications is incorporated by reference herein in its entirety.

FIELD OF THE INVENTION

This application relates generally to light enhancing structures such as light enhancing films, and relates more specifically to light enhancing structures comprising multiple arrays of elongate features such as grooves or ridgelines.

BACKGROUND

Light enhancing films comprising elongated micro-prisms can be used to increase the light output into a limited field-of-view of a display; this increase is in comparison with the light output into those angles of the display without the light enhancing film. The enhancement is accomplished by redistributing light so that more light is included in that particular field-of-view through a process referred to a "recycling," which is described more fully below.

The light enhancing films comprise an array of parallel ridges and grooves that form the elongated micro-prisms. Such light enhancing films are included in displays that additionally comprise a light source, a planar light guide optically coupled to the light source, and a transmissive spatial light modulator that receives light from the light guide. The spatial light modulator comprises an array of selectively activated pixels that can be used to form an image or pattern (e.g., text).

The light source may be disposed at an edge of the light guide to couple light into the light guide. Light guided within the light guide may be extracted from a front planar surface of the light guide using an array of extractor elements, for example, on a back planar surface of the light guide. The light enhancing film is disposed between the front planar surface of the light guide and the spatial light modulator such that the light enhancing film receives light from the front surface of the light guide. The plurality of micro-prisms in the light enhancing film are configured such that a portion of this light is transmitted through the light enhancing film into a limited range of angles. Another portion of the light is reflected back into the light guide. This reflected light may once again exit the light guide and may be transmitted through the light enhancing film into the limited range of angles or be reflected back by the light enhancing film once again. This process may be referred to as light recycling. Similarly the light enhancing films may be referred to as light recycling films, and the terms are used interchangeably herein. These terms are used even though the light enhancing film or light recycling film is not solely responsible for the recycling process or resultant enhancement. (For example, other components are used to redirect that light back to the light recycling film to enable the recycling process and produce the enhancement.) Advantageously, through this light recycling process, the light recycling film increases the light directed into the limited range of angles, increasing luminance for those directions, and reduces the luminance in other directions.

One drawback of conventional light recycling films is that periodicity introduced by the light recycling films contribute to the formation of Moiré fringes. Moiré fringes result from the superposition of a plurality of periodic structures. In this case, periodicity is introduced by the array of parallel ridges and grooves in the light recycling film and the extractors used to couple the light out of the light guide. Additionally, Moiré fringes can occur because of periodicity with the pixel in the spatial light modulator.

What is needed, therefore, is a way to reduce or eliminate the contributions to the Moiré effect.

SUMMARY OF CERTAIN PREFERRED EMBODIMENTS

One embodiment of the invention comprises an optical member comprising an array of total internal reflection structures, said optical member comprising: an optically transmissive film having a surface; a first plurality of non-intersecting elongate features formed in said surface; and a second plurality of non-intersecting elongate features formed in said surface, said first plurality of non-intersecting elongate features being oriented at an angle with respect to said second plurality of non-intersecting elongate features that is less than 30°, wherein each of said non-intersecting elongate features in said first plurality extends across said multiple non-intersecting elongate features in said second plurality thereby defining said total internal reflection structures.

Another embodiment of the invention comprises an optical member comprising an array of total internal reflection structures, said optical member comprising: an optically transmissive material having a surface; a first plurality of non-intersecting elongate features formed in said surface, said first plurality of non-intersecting elongate features oriented at an angle $\alpha$; a second plurality of non-intersecting elongate features formed in said surface, said second plurality of non-intersecting elongate features oriented at an angle $\alpha'$, said first plurality of non-intersecting elongate features being oriented at an angle $|\alpha-\alpha'|$ with respect to said second plurality of non-intersecting elongate features, said angle $|\alpha-\alpha'|$ being less than 30°; and a third plurality of non-intersecting elongate features formed in said surface, said third plurality of non-intersecting elongate features oriented at an angle $\xi$, said second plurality of non-intersecting elongate features being oriented at an angle $|\alpha'-\xi|$ with respect to said third plurality of non-intersecting elongate features, said angle $|\alpha'-\xi|$ being less than 30°, said first plurality of non-intersecting elongate features being oriented at an angle $|\alpha-\xi|$ with respect to said third plurality of non-intersecting elongate features, said angle $|\alpha-\xi|$ being less than 30°, wherein each of said non-intersecting elongate features in said first plurality extends across said non-intersecting elongate features in said second plurality and said non-intersecting elongate features in said third plurality and each of said non-intersecting elongate features in said second plurality extends across said non-intersecting elongate features in third plurality thereby defining said total internal reflection structures.

Another embodiment of the invention comprises an optical member comprising an array of total internal reflection structures, said optical member comprising: an optically transmissive material having a surface, said surface having a surface normal; a first plurality of non-intersecting elongate features in said surface; a second plurality of non-intersecting elongate features in said surface, said first plurality of non-intersecting elongate features angled with respect to said second plurality of non-intersecting elongate features; and a third plurality of non-intersecting elongate features in said optically transmissive material, said second plurality of non-intersecting elongate features being angled with respect to said first plurality of non-intersecting elongate features and said third plurality of non-intersecting elongate features, wherein each of said non-intersecting elongate features in said first plurality extends across said non-intersecting elongate features in said second plurality and said non-intersecting elongate features in said third plurality and each of said non-intersecting elongate features in said second plurality extends across said non-intersecting elongate features in third plurality thereby defining said total internal reflection structures, said total internal reflection structures being configured such that a first portion of light incident on said surface is total internally reflected back from said surface and a second portion of said light incident on said surface is transmitted through said surface, a substantial portion of said second portion of light that is transmitted being refracted by said total internal reflection structures into a limited to a range of angles, $\Phi$.

Another embodiment of the invention comprises an optical member comprising an array of total internal reflection structures, said optical member comprising: an optically transmissive material having a surface; a first plurality of non-intersecting elongate features in said surface; a second plurality of non-intersecting elongate features in said surface, said first plurality of non-intersecting elongate features being angled with respect to said second plurality of non-intersecting elongate features; a third plurality of non-intersecting elongate features in said surface, said second plurality of non-intersecting elongate features being angled with respect to said first plurality of non-intersecting elongate features and said third plurality of non-intersecting elongate features; and a fourth plurality of non-intersecting elongate features in said surface, each of said third plurality of non-intersecting elongate features being angled with respect to said first plurality of non-intersecting elongate features, said second plurality of non-intersecting elongate features, and said third plurality of non-intersecting elongate features, wherein each of said non-intersecting elongate features in said first plurality extends across said non-intersecting elongate features in said second, third, and fourth pluralities of non-intersecting elongate features, each of said non-intersecting elongate features in said second plurality extends across said non-intersecting elongate features in said third, and fourth pluralities of non-intersecting elongate features, and each of said non-intersecting elongate features in said third plurality extends across said non-intersecting elongate features in said fourth plurality, thereby defining said total internal reflection structures.

Another embodiment of the invention comprises an optical member comprising a plurality of total internal reflection structures, said optical member comprising: an optically transmissive material having a surface; a first plurality of non-intersecting elongate features in said surface, said first plurality of non-intersecting elongate features oriented at an angle $\alpha$; a second plurality of non-intersecting elongate features in said surface, said second plurality of non-intersecting elongate features oriented at an angle $\alpha'$; and a third plurality of non-intersecting elongate features in said surface, said third plurality of non-intersecting elongate features oriented at an angle $\xi$, wherein each of said non-intersecting elongate features in said first plurality extends across said non-intersecting elongate features in said second and third pluralities of non-intersecting elongate features and each of said non-intersecting elongate features in said second plurality extends across said non-intersecting elongate features in said third pluralities of non-intersecting elongate features thereby forming said plurality of total internal reflection structures, and said first and second plurality of non-intersecting elongate features are arranged non-symmetrically about said third plurality of non-intersecting elongate features such that $|\alpha+\alpha'|=|\neq|\xi|$.

Another embodiment of the invention comprises a display apparatus comprising: a light guide; a spatial light modulator comprising an array of pixels, said pixel array comprising a plurality of rows of pixels; and an optical member comprising a substantially optically transmissive material having a surface, a first plurality of non-intersecting elongate features in said surface, and a second plurality of non-intersecting elongate features in said surface, said first plurality of non-intersecting elongate features angled with respect to said second plurality of non-intersecting elongate features, each of said non-intersecting elongate features in said first plurality extending across said second plurality of non-intersecting features thereby forming total internal reflection structures, wherein said first plurality of non-intersecting elongate features and said second plurality of non-intersecting elongate features are oriented at an angle with respect to said rows of pixels.

Another embodiment of the invention comprises a display apparatus comprising: a light guide; an array of extractors configured to extract light from said light guide, said array of extractors comprising a plurality of rows of extractors; and an optical member comprising a substantially optically transmissive material having a surface, a first plurality of non-intersecting elongate features in said surface, and a second plurality of non-intersecting elongate features in said surface, said first plurality of non-intersecting elongate features angled with respect to said second plurality of non-intersecting elongate features, each of said non-intersecting elongate features in said first plurality extending across a said second plurality of non-intersecting elongate features thereby forming total internal reflection structures, wherein said non-intersecting elongate features in said first plurality and said non-intersecting elongate features in said second plurality are oriented at an angle with respect to said rows of extractors.

Another embodiment of the invention comprises an optical apparatus comprising: a first optical member comprising substantially optically transmissive material having a first surface, a first plurality of non-intersecting elongate features in said first surface, said first plurality of non-intersecting elongate features defining a first plurality of total internal reflection structures; a second optical member comprising substantially optically transmissive material having a second surface, said second member further comprising: a second plurality of non-intersecting elongate features in said second surface; and a third plurality of non-intersecting elongate features in said second surface, said second plurality of non-intersecting elongate features being oriented at an angle with respect to said third plurality of non-intersecting elongate features, each of said non-intersecting elongate features in said second plurality extending across said third plurality of non-intersecting elongate features thereby forming a second plurality of total internal reflection structures, wherein said first optical member is oriented with respect to said second optical member such that said first plurality of non-intersecting elongate features is at an angle with respect to said second plurality of non-intersecting elongate features and at an angle with respect to said third plurality of non-intersecting elongate features.

Another embodiment of the invention comprises an optical apparatus comprising: a light emitter; a light guide; a first optical member comprising a substantially optically transmissive material having a first surface, said first member further comprising: a first plurality of non-intersecting elongate features in said first surface; and a second plurality of non-intersecting elongate features in said first surface, said second plurality of non-intersecting elongate features being oriented at an angle with respect to said first plurality of non-intersecting elongate features, each of said non-intersecting elongate features in said first plurality extending across said second plurality of non-intersecting elongate features thereby forming a plurality of total internal reflection structures, wherein said optical member is disposed in an optical path between said light emitter and said light guide.

Another embodiment of the invention comprises an optical member comprising an array of total internal reflection structures, said optical member comprising: a substantially optically transmissive film having a surface; a first plurality of non-intersecting elongate features in said surface; and a second plurality of non-intersecting elongate features in said surface, said first plurality of non-intersecting elongate features angled with respect to said second plurality of non-intersecting elongate features, wherein each of said non-intersecting elongate features in said first plurality extends across said non-intersecting elongate features in said second plurality of non-intersecting elongate features thereby forming said total internal reflection structures, and wherein at least a portion of said second plurality of non-intersecting elongate features has a height or depth that is smaller than the height or depth of at least a portion of said first plurality of non-intersecting elongate features but that is greater than 50% of the height or depth of said portion of said first plurality of non-intersecting elongate features.

Another embodiment of the invention comprises an optical member comprising an array of total internal reflection structures, said optical member comprising: a substantially optically transmissive film having a surface; a first plurality of non-intersecting elongate features in said surface; and a second plurality of non-intersecting elongate features in said surface, said first plurality of non-intersecting elongate features angled with respect to said second plurality of non-intersecting elongate features, wherein each of said non-intersecting elongate features in said first plurality extends across said non-intersecting elongate features in said second plurality of non-intersecting elongate features thereby forming said total internal reflection structures, and wherein the height or depth of at least some non-intersecting elongate features in said first plurality are unequal, and the height or depth of at least some non-intersecting elongate features in said second plurality are unequal.

Another embodiment of the invention comprises an optical member comprising an array of total internal reflection structures, said optical member comprising: a substantially optically transmissive film having a surface; a first plurality of non-intersecting elongate features in said surface; and a second plurality of non-intersecting elongate features in said surface, said first plurality of non-intersecting elongate features angled with respect to said second plurality of non-intersecting elongate features, wherein each of said non-intersecting elongate features in said first plurality extends across said non-intersecting elongate features in said second plurality of non-intersecting elongate features thereby forming said total internal reflection structures, wherein at least a portion of said first plurality of non-intersecting elongate features and at least a portion of said second plurality of non-intersecting elongate features have unequal pitches, and wherein said portion of first plurality of non-intersecting elongate features and said portion of second plurality of non-intersecting elongate features have heights or depths that are the same, or the height or depth of the smaller non-intersecting elongate features are at least 50% the height or depth of the larger non-intersecting elongate features.

Another embodiment of the invention comprises an optical member comprising an array of total internal reflection structures, said optical member comprising: a substantially optically transmissive film having a surface; a first plurality of non-intersecting elongate features in said surface; and a second plurality of non-intersecting elongate features in said surface, said first plurality of non-intersecting elongate features angled with respect to said second plurality of non-intersecting elongate features, wherein each of said non-intersecting elongate features in said first plurality extends across said non-intersecting elongate features in said second plurality of non-intersecting elongate features thereby forming said total internal reflection structures, and wherein the pitch of at least some non-intersecting elongate features in said first plurality are unequal, and the pitch of at least some non-intersecting elongate features in said second plurality are unequal.

BRIEF DESCRIPTION OF THE DRAWINGS

Example embodiments of the light recycling structures such as films disclosed herein are illustrated in the accompanying drawings, which are for illustrative purposes only.

FIG. 3O is a perspective view of a composite light recycling film formed by combining a pattern of parallel cylindrical elongate features (e.g., cylindrical grooves) rotated by an angle α with a pattern of parallel cylindrical elongate features rotated by an angle α'.

FIG. 3P is a plot of the intensity of the light transmitted by the composite light recycling film of FIG. 3O.

FIG. 3Q is a histogram of luminous intensity for the intensity plot of FIG. 3P.

FIG. 4F is a plot of the intensity of the light transmitted by the composite light recycling film of FIG. 4D.

FIG. 4G is a plot of the gain as a function of the half angle ½(α−α') for the composite light recycling films of FIGS. 3C and 4D.

FIG. 4H is a histogram of luminous intensity for the intensity plot of FIG. 4F.

FIG. 4I is a perspective view of the composite light recycling film of FIG. 4D, which has an upright ("everted") configuration comprising a plurality of parallel grooves that form upright total internal reflection structures.

FIG. 4J is a perspective view of an inverted composite light recycling film formed by combining a pattern of parallel ridges rotated by an angle α with a pattern of parallel ridges rotated by an angle α' and a pattern of parallel ridges that is parallel to the x axis.

FIG. 6A is a top surface view (parallel to xy plane) of a modified light recycling film having an array of parallel ridges and grooves that are angled with respect to the x axis by an angle α.

FIG. 6B is a top surface view (parallel to xy plane) of a modified light recycling film having an array of parallel ridges and grooves that are angled with respect to the x axis by an angle α'.

FIG. 6C is a top surface view (parallel to xy plane) of a modified light recycling film having an array of parallel ridges and grooves that are angled with respect to the x axis by an angle ξ.

FIG. 6D is a top surface view (parallel to xy plane) of a modified light recycling film having an array of parallel ridges and grooves that are angled with respect to the x axis by an angle ξ'.

FIG. 12A illustrates the projection of a selected pixel onto the composite light recycling film of FIG. 4D.

FIG. 12B is a plot of the illuminance of light projected onto the rear surface of the light guide when the collimated light rays such as illustrated in FIG. 9A are transmitted through the composite light recycling film of FIG. 4D.

FIG. 12C illustrates the projection of a selected pixel onto a composite light recycling film wherein the relative depth Δz of the grooves parallel to the x axis relative to the grooves rotated at an angle α and the groove rotated at an angle α' are +0.005.

FIG. 12D is a plot of the intensity of light projected onto the rear surface of the light guide when the collimated light rays such as illustrated in FIG. 9A are transmitted through the composite light recycling film of FIG. 12C.

FIG. 15A illustrates the projection of a selected pixel onto a two crossed light recycling films like the composite light recycling film of FIG. 4D.

FIG. 15B is a plot of the intensity of light projected onto the rear surface of the light guide when the collimated light rays such as illustrated in FIG. 9A are transmitted through the crossed light recycling films of FIG. 15A.

FIG. 15C illustrates the projection of a selected pixel onto two crossed light recycling films like the composite light recycling film of FIG. 12C.

FIG. 15D is a plot of the intensity of light projected onto the rear surface of the light guide when the collimated light rays such as illustrated in FIG. 9A are transmitted through the crossed light recycling films of FIG. 15C.

FIG. 19A is a schematic illustration of the light recycling film of FIG. 2A positioned over the modified light recycling film of FIG. 3A, which is positioned over the modified light recycling film of FIG. 3B.

FIG. 19B is a plot of the intensity of the light transmitted by the three sequentially-positioned light recycling films of FIG. 19A.

FIG. 19C is a histogram of the luminous intensity for the spatial intensity plot of FIG. 19B.

FIG. 22E is a top surface view (parallel to the xy plane) of an example embodiment of a composite nonlinear light recycling film formed by combining the two orthogonal patterns of grooves similar to those included in the light recycling film in FIG. 22A.

FIG. 23F is a top surface view (in the xy plane) of a modified light recycling film having a plurality of elongate feature with varying elevation, wherein the extrema points are 180° out of phase.

DETAILED DESCRIPTION OF CERTAIN PREFERRED EMBODIMENTS

Figure 1:
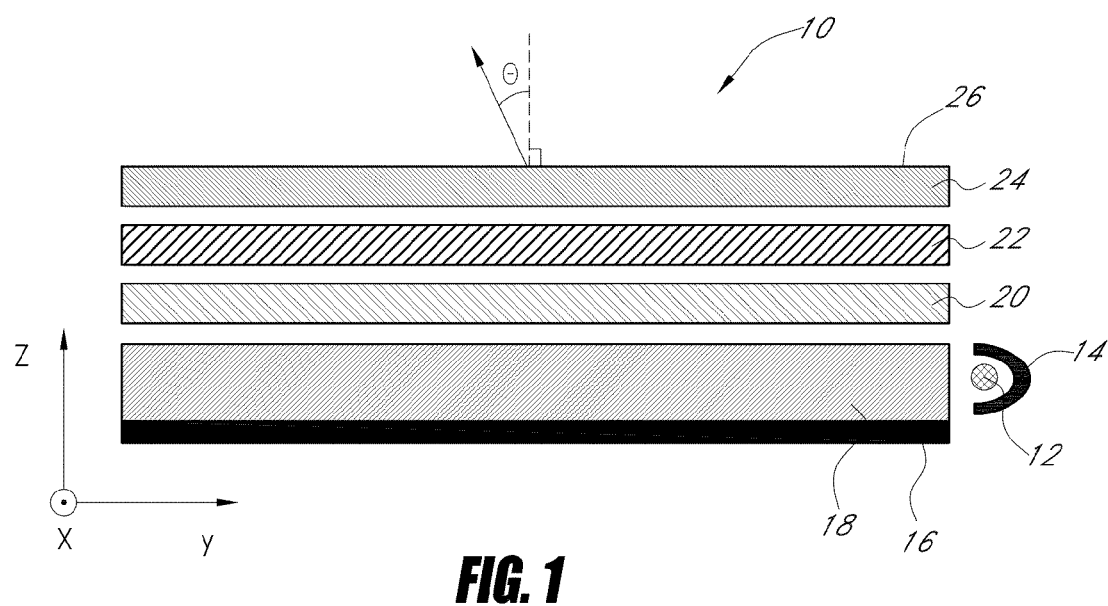
FIG. 1 is a cross-sectional view schematically illustrating selected components of an example display that includes a light recycling film.

FIG. 1 illustrates selected components of an example backlit display 10. The backlit display 10 has a substantially planar display surface 26 that is parallel to the xy plane, as defined in FIG. 1. The backlit display 10 includes a light source 12, such as one or more fluorescent lamps, incandescent lamps, light emitting diodes, or laser diodes. In other embodiments, other types of light sources are used, or a combination of different types of light sources is used. In certain embodiments, the backlit display 10 includes a light source that is configured to generate multi-chromatic light (for example, white light), while in other embodiments the backlit display 10 includes a light source that is capable of generating substantially monochromatic light at one or more selected wavelengths. One example of such a multi-chromatic light source is an array of red, green and blue light emitting diodes (an "RGB LED array"). In the example embodiment illustrated in FIG. 1, the light source 12 is a linear light source positioned along at least a portion of a selected edge of the backlit display 10 to provide edge lighting. Examples of other linear light sources include laser diodes or other light emitters arranged in a linear array or other light sources extended along a length substantially longer than their height. In other embodiments, the light source is a point source. Examples of point sources include a single LED or laser diode, a relatively small incandescent bulb, or other relatively small light emitters having similar height and width. In certain modified embodiments, the light source 12 is positioned along more than one edge of the backlit display. The light sources 12 may be positioned elsewhere.

Still referring to FIG. 1, the backlit display 10 further includes a planar, optically transmissive light guide 18 that is positioned substantially parallel to the display surface 26. The light guide 18 is configured to receive and propagate light from the light source 12. Depending on the type of light source used, an optional elongate concave reflector 14 is positioned on the opposite side of the light source 12 from the light guide 18. In such embodiments, the concave reflector 14 is used to increase the amount of light coupled from the light source 12 into the light guide 18. Other systems for coupling light from the light source 12 into the light guide 18 are used in other embodiments. For example, in an embodiment wherein the light source 12 comprises an array of light emitting diodes, light piping or a fiber optic coupling system can be used to couple light from the light source 12 into the light guide 18. This configuration allows the light source 12 to be positioned remotely with respect to the light guide 18. Other configurations are possible.

In certain embodiments the light guide 18 comprises material that is substantially optically transmissive to the wavelengths of operation, for example, to one or more wavelengths output by the light source 12. The light guide 18 may comprise, for example, glass or plastic or other polymeric material in certain preferred embodiments. In various embodiments, the light guide 18 comprises material having a higher index of refraction than surrounding areas such that light is guided within the light guide 18 via total internal reflection.

In particular, light from the light source 12 is propagated in the light guide 18 by total internal reflection. However, the light guide 18 includes a plurality of extraction elements that allow light to be coupled out of the light guide 18. In one embodiment, the extraction elements are formed on the surface of the light guide 18 that faces the planar display surface 26, while in other embodiments the extraction elements are formed on the surface of the light guide 18 that is opposite the planar display surface 26. Regardless of their position with respect to the planar display surface 26, the extraction elements are configured to allow a portion of the light propagating in the light guide 18 to be coupled from the light guide, and to be redirected toward the planar display surface 26. In one embodiment, the extraction elements provide a portion of the surface of the light guide 18 having an increased surface roughness. The extractor elements may comprise, for example, raised or recessed micro-structures such as protrusions or dimples and ridges or grooves, as well as localized material differences or other surface or volume perturbations. The extractors may refract, reflect, diffract, and/or scatter light. The extractors may be arranged in any pattern. For example, the extraction elements may be provided with a spatially varying pattern to enhance spatial uniformity of the out-coupled light. In a modified embodiment, the light guide 18 is replaced with a planar light source capable of generating a substantially uniform light field. In an alternative embodiment, the light guide can be replaced with an electroluminescent light source.

As illustrated in FIG. 1, a rear reflector 16 is disposed rearward of the light guide 18. The rear reflector 16 may have a shape that matches the rear shape of the light guide 18, although other shapes are possible. This rear reflector 16 may comprise a reflective layer such a metal layer or a diffuse paint. Dielectric coatings or other reflective layers may also be used.

Also as illustrated in FIG. 1, a planar diffuser 20 is positioned over or forward of the light guide 18, such that light coupled from the extraction elements passes through the planar diffuser 20. The planar diffuser 20 is configured to diffuse light. For example, the diffuser may comprise surface or volume features that symmetrically or asymmetrically scatter light passing therethrough. Such scattering may be substantially random from location to location across the diffuser 20. This diffusing effect reduces or eliminates the appearance of the light extractors as seen by the viewer, and generally enhances the spatial uniformity of the illumination of the planar display surface 26. Periodic illumination patterns at the planar display surface 26, such as possibly produced by the light extractors, may disadvantageously result in Moiré patterns being created when the display surface 26 forms part of a pixilated display comprising an ordered array of pixels. In one embodiment, the planar diffuser 20 is an optically transmissive element having a surface feature variation capable of randomly redirecting light in a wide range of angles, such as up to ±90° with respect to the incident angle. The planar diffuser 20 is optional, and is omitted from the backlit display 10 in certain embodiments.

A planar light enhancing film or light recycling film (LRF) 22, is positioned over or forward of the light guide 18. As described above, the terms light enhancing film and light recycling films may be used herein interchangeably. Additionally, the terms light enhancing film and light recycling films are used even though the light enhancing film or light recycling film is not solely responsible for the enhancing or recycling process. (For example, other components are used to redirect that light back to the light enhancing film or light recycling film to enable recycling and enhancement.) In embodiments wherein a diffuser 20 is used to scatter light coupled out of the light guide 18, the light recycling film 22 is generally positioned over or forward the diffuser 20. The light recycling film 22 is rearward of the planar display surface 26 and controls the angular distribution of light from the light guide 18 directed toward the planar display surface. In particular, the light recycling film 22 is configured to transmit light into a substantially limited range of angles ±θ. The light recycling film 22 permits only a relatively small amount of the light transmitted therethrough to be directed outside the range of angles ±θ. In general, the light recycling film 22 is designed such that light is back reflected toward the rear reflector 16 and into the light guide 18 rather than be directed outside the range of angles ±θ. In one embodiment θ is less than about 60°, in another embodiment θ is less than about 45°, in another embodiment θ is less than about 30°, and in another embodiment θ is less than about 20°. In one embodiment θ is between about 10° and about 70°, in another embodiment θ is between about 15° and about 50°, and in another embodiment θ is between about 20° and about 40°. The angle θ is about 22° in some embodiments. This angle θ may be less than 15° in some embodiments.

This configuration reduces losses associated with the light recycling film 22, since the light not transmitted by the light recycling film 22 is "recycled" into the light guide 18. The light may be reflected by the rear reflector 16 and/or circulated with the light guide. The light may be deflected, for example, scattered, by one or more extractor elements. The light may be incident on the light recycling film 22 one or more times and is thereafter capable of being transmitted by the light recycling film 22. In certain modified embodiments, the backlit display 10 comprises more than one light recycling film.

In certain embodiments the light recycling film 22 comprises material that is substantially optically transmissive to the wavelengths of operation, for example, to one or more wavelengths used for illumination. As described herein, the light recycling film 22 is configured to transmit a portion of the light incident thereon. For example, in one embodiment the light recycling film 22 transmits between about 70% and about 50% of the light incident thereon from a Lambertian source, and reflects between about 30% and about 50% of the light from the Lambertian source incident thereon. In another embodiment the light recycling film 22 transmits between about 65% and about 45% (for example, about 60%) of the light incident thereon, and reflects between about 35% and about 55% (for example, about 40%) of the light incident thereon. These values of transmission and reflection assume no recycling and negligible absorption by the light recycling film. The light recycling film 22 may comprise glass or plastic or other polymeric material in certain preferred embodiments. In one preferred embodiment, the light recycling film 22 comprises polycarbonate such as homogeneous polycarbonate or PMMA. Other materials, however, may be used.

Still referring to FIG. 1, a planar spatial light modulator 24 is positioned forward of the light guide 18 and light recycling film 22 to receive light passed through the light recycling film 22. In one embodiment, the spatial light modulator 24 is a liquid crystal display, such as those commonly used in products such as flat panels displays, telephone displays, and flat screen video displays. Such a spatial light modulator may comprise a plurality of pixels that are selectively activated to form an image or pattern, such as a text or symbols. In some embodiments, the spatial light modulator comprises a non-emissive device and may be transmissive device. Reflective or transreflective devices may also be employed in different configurations. Other apparatuses capable of spatially modulating light are used in other embodiments. In various preferred embodiments, a portion of the spatial light modulator 24 forms the planar display surface 26. In certain embodiments, a layer or coating, such as, for example, one or more polarizing layers or coatings, may be disposed on the planar display surface 26.

Thus, the example backlit display 10 illustrated in FIG. 1 is usable as a flat panel display screen. As described herein, the light recycling film efficiently increases the directionality of the display screen. The light recycling film may, for example, reduce or prevent light from exiting the display screen at certain angles, such as at steep angles with respect to the normal through the display screen. The non-transmitted light is "recycling" back into the system to be redirected and subsequently transmitted at an angle within the desired range. Accordingly, the display is more efficient as light that would otherwise be directed at undesirable angles is redirected into the desired range of angles thereby enhancing the luminance in this angular range. Angles closer to normal are often advantageous in certain type of display devices. For example, in embodiments wherein the spatial light modulator 24 comprises a liquid crystal display, light passing through the display at angles closer to $\theta=0°$ provides improved display color and contrast as compared to light passing through the display at larger angles.

This performance feature is advantageous because in many applications light exiting the display screen at steep angles is not useful, unwanted, or both. For example, in a display screen used as a desktop computer display, light exiting the display screen at a steep vertical angle (that is, toward the floor or toward the ceiling) is usually not useful. Additionally, in a display screen used as a video display in an automated teller machine, light exiting the display screen at a steep horizontal angle (that is, toward the user's right or left) presents a security risk by allowing unauthorized users to view the contents of the display. The light recycling film may at least somewhat attenuate these off-axes rays. Additionally, by recycling the non-transmitted light back into the system, the light recycling film allows a less powerful light source to be used with the system without compromising the display luminance. This feature is a particularly important advantage for display screens that are battery-powered, such as laptop displays, mobile phone displays, and handheld computer displays.

Figure 2A:
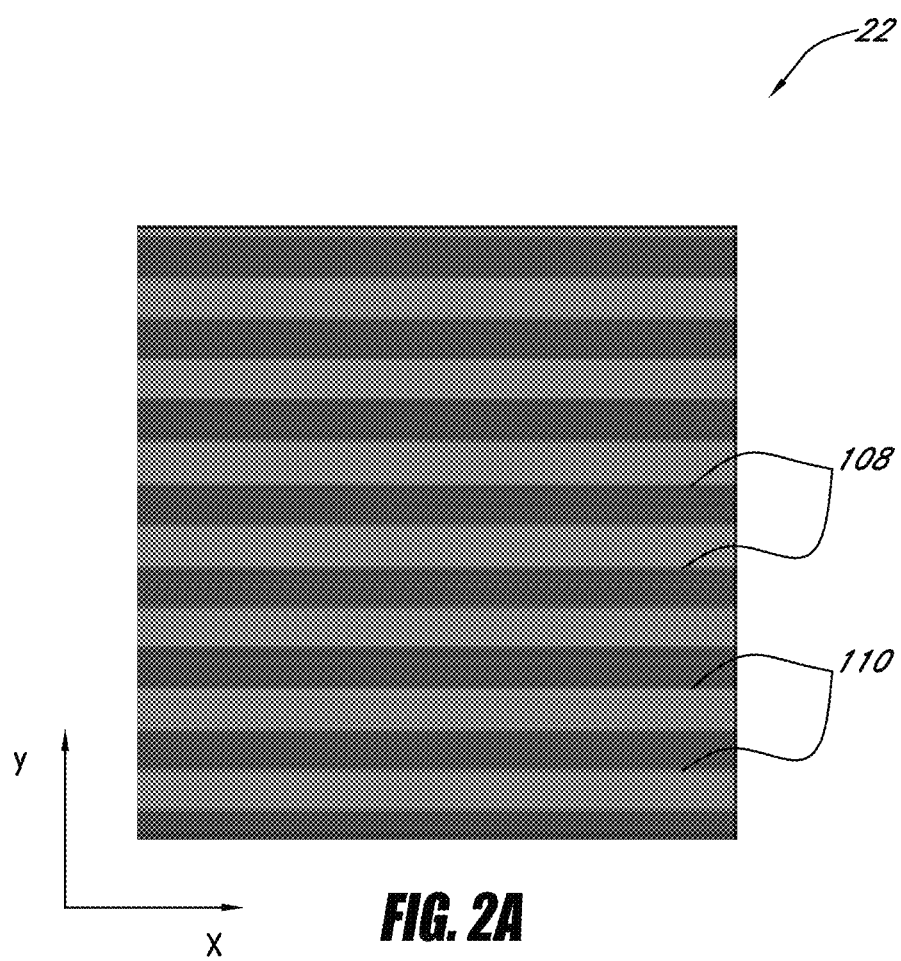
FIG. 2A is a top surface view (parallel to the xy plane) of an example embodiment of a light recycling film comprising a plurality of total internal reflection structures.
Figure 2B:
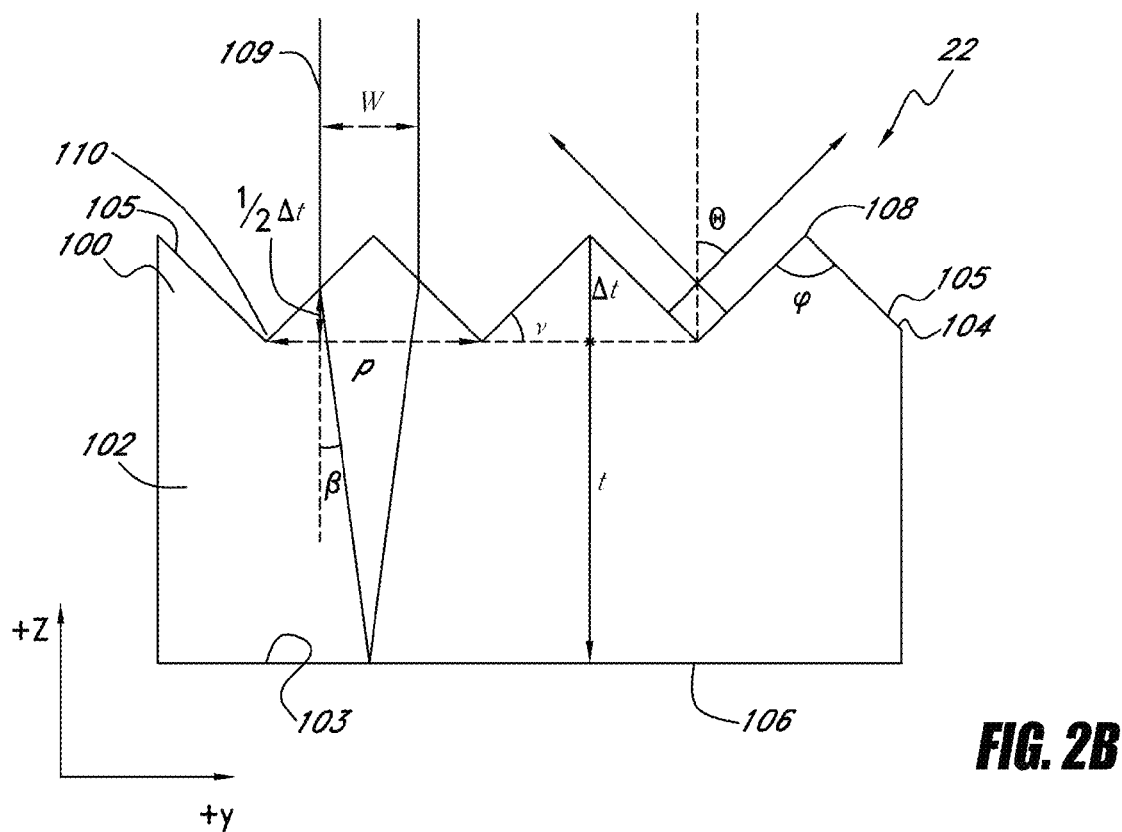
FIG. 2B is a cross-sectional view (parallel to yz plane) of the light recycling film of FIG. 2A.

As described herein, the light recycling film 22 is configured to transmit light within a certain range of angles $\pm\theta$ from a normal through the light recycling film (that is parallel to the z axis). FIG. 2A schematically illustrates a top surface view (parallel to xy plane) of an example light recycling film 22, and FIG. 2B schematically illustrates a cross-sectional view (parallel to yz plane) of the film illustrated in FIG. 2A. FIGS. 2A and 2B show that the light recycling film 22 includes an array of elongate prisms 100, also referred to as "microprisms" or more generally "micro-structures", that are formed on a film body portion 102. These structures may be more generally referred to as total internal reflection (TIR) structures. As illustrated in FIG. 2B, the film body portion 102 has a first surface 104 in which the prisms 100 are formed, and a second surface 106 that is substantially planar, and that is opposite the first surface 104. The array of elongate prisms 100 forms a periodic structure of alternating parallel ridges 108 and grooves 110. Each period of the array includes two facets 105, or faces, from which light can be reflected. FIG. 2A is a top surface view of the light recycling film 22 illustrated in FIG. 2B, showing the ridges 108 and the grooves 110.

In an example embodiment, the elongate prisms 100 have an apex angle $\phi$, the full included angle, that is typically about 90°, but that ranges from about 70° to about 120° in one embodiment, and from about 80° to about 100° in another embodiment. Values outside these ranges are also possible. The ridges 108 need not be symmetrical. Similarly the grooves 110 need not be symmetrical. The apex angle $\phi$ for adjacent prisms 100 also need not be identical. The height and periodicity may also vary.

In yet another modified embodiment, the elongate prisms 100 are provided with curved surfaces instead of sharp angles, such that the cross-section illustrated in FIG. 2B has the shape of a smooth oscillating waveform instead of a jagged triangle waveform. The elongate prisms 100 may also be blunted on top. For example, instead of ridges 108 with sharply pointed apexes, a substantially flat portion may be disposed at the top of the ridge. Such a flat portion may assist in contacting the light recycling film 22 with another film or other structure disposed thereon. The elongate prisms 100 in the light recycling film 22 are formed using one or more of a wide variety of fabrication techniques including, for example molding or embossing techniques for fabricating sheets and diamond turning techniques for fabricating tools.

The light recycling film 22 may be oriented such that the elongate prisms 100 are facing toward the planar display surface 26. However, in modified embodiments the light recycling film 22 are oriented differently, for example, such that the elongate prisms 100 face away from the planar display surface 26, and toward the light guide 18.

Figure 2C:
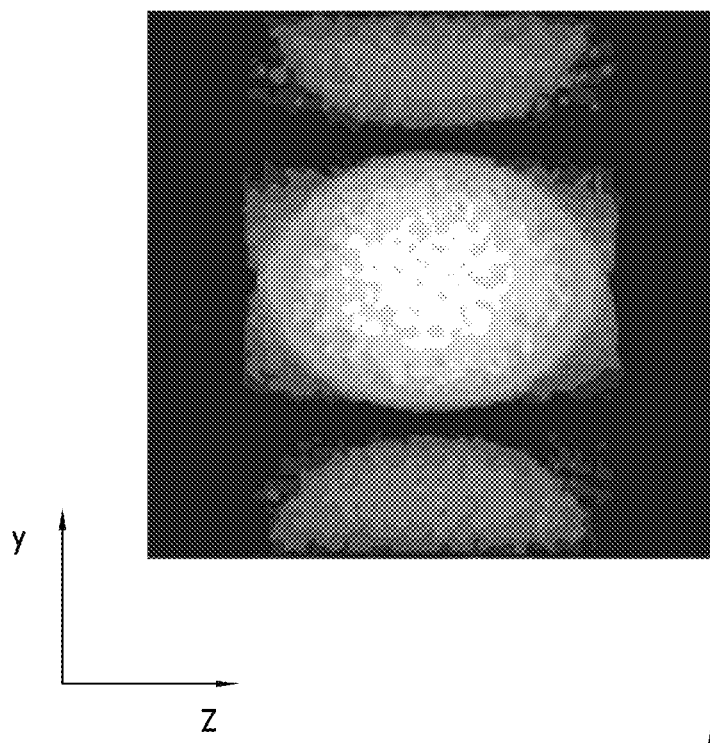
FIG. 2C is a plot of the intensity of the light transmitted by the light recycling film of FIG. 2A.

As described herein, when the light recycling film 22 illustrated in FIGS. 2A and 2B is placed in the backlit display 10 light distributed in a range of angles, for example, Lambertian, is incident thereon. The light recycling film 22 transmits a portion of the light that will exit the light recycling film 22 in a certain range of angles $\pm\theta$. The light recycling film 22 reflects light that would otherwise not exit the light recycling film in the range of angles $\pm\theta$. The result is a modified, for example, narrower and more concentrated angular distribution for light transmitted through the light recycling film 22 relative to the angular distribution of light incident on the light recycling film. FIG. 2C is a plot of intensity versus angle in the vertical and horizontal directions (parallel to the x and y axes, respectively) of the transmitted light distribution for the light recycling film 22 illustrated in FIGS. 2A and 2B. In this plot, light with higher intensity is indicated by lighter shading, and light with lower intensity is indicated by darker shading. FIG. 2C shows that the light recycling film 22 illustrated in FIGS. 2A and 2B concentrates the transmitted light in a central lobe, and reduces or substantially eliminates the transmission of light at wider angles.

Figure 3A:
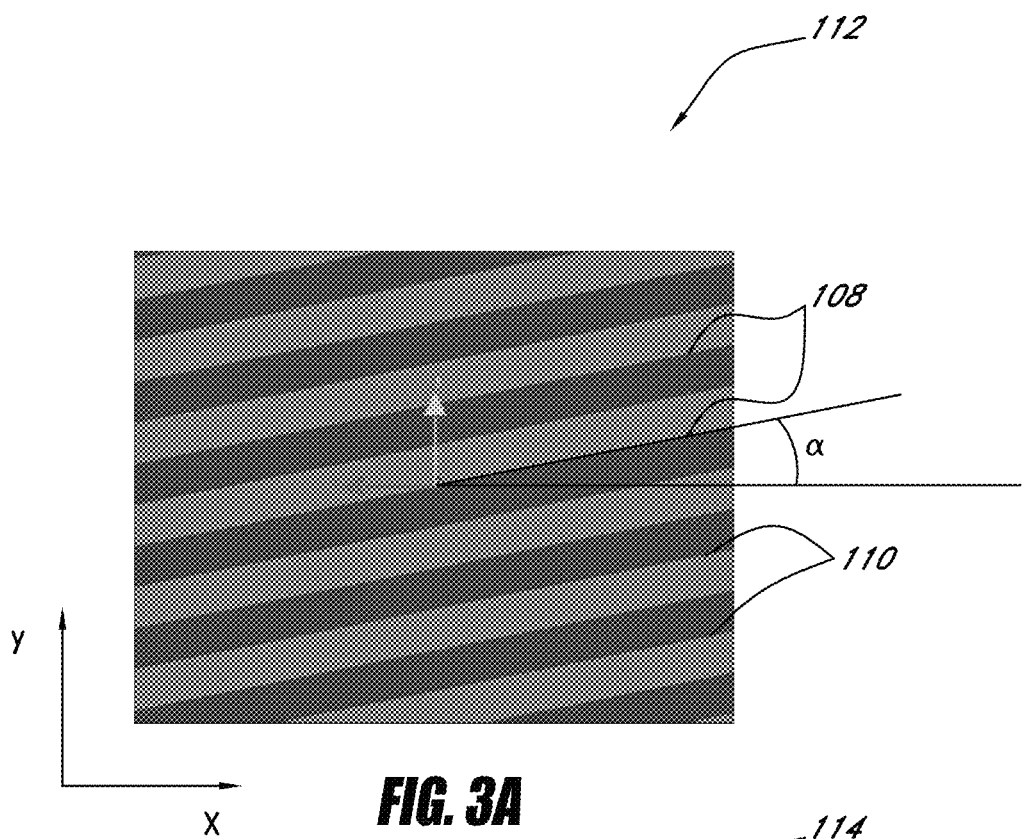
FIG. 3A is a top surface view (parallel to xy plane) of a modified light recycling film comprising an array of parallel ridges and grooves that are rotated with respect to the x axis by an angle $\alpha$.
Figure 3B:
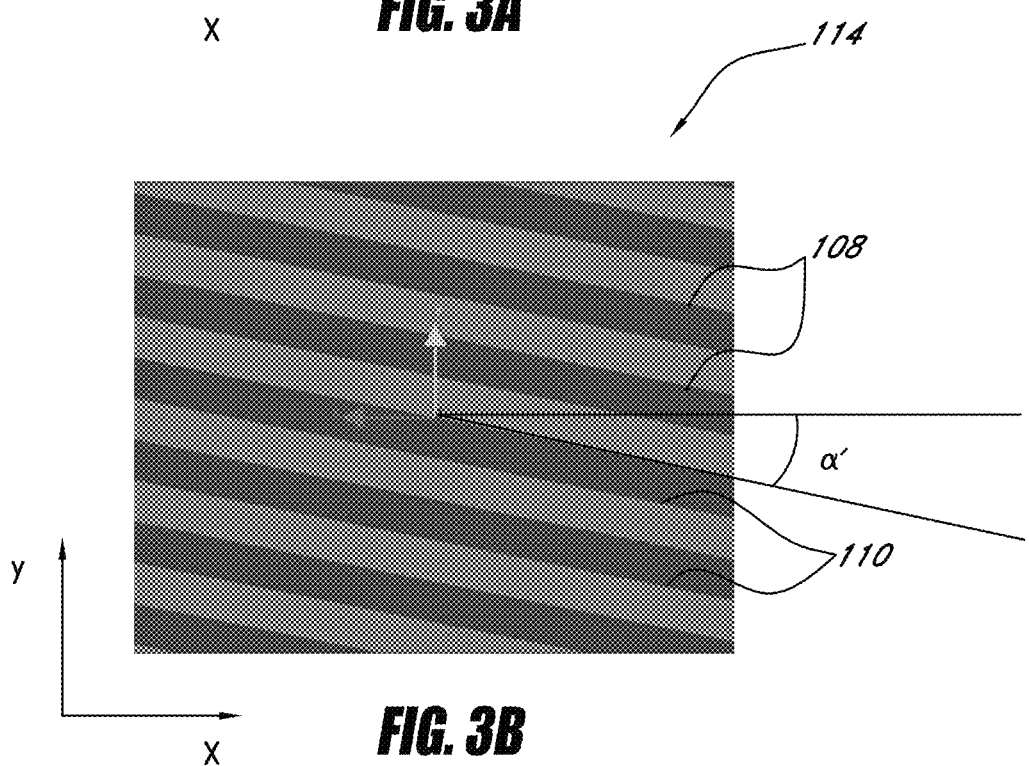
FIG. 3B is a top surface view (parallel to xy plane) of a modified light recycling film having an array of parallel ridges and grooves that are rotated with respect to the x axis by an angle $\alpha'$.

In the light recycling film 22 illustrated in FIGS. 2A and 2B, the ridges 108 and grooves 110 are substantially parallel to the x axis. In modified embodiments of a light recycling film, the array of parallel ridges 108 and grooves 110 is rotated with respect to the x axis. For example, FIG. 3A schematically illustrates a modified light recycling film 112 wherein the ridges 108 and the grooves 110 are rotated with respect to the x axis by an angle $\alpha$, where $\alpha>0$. Similarly, FIG. 3B schematically illustrates a modified light recycling film 114 wherein the ridges 108 and the grooves 110 are rotated with respect to the x axis by an angle $\alpha'$, where $\alpha'<0$. In another embodiment the angles $\alpha$ and $|\alpha'|$ are less than about 30°, in another embodiment the angles $\alpha$ and $|\alpha'|$ are less than about 20°, and in another embodiment the angles $\alpha$ and $|\alpha'|$ are less than about 10°. In one embodiment the angles $\alpha$ and $|\alpha'|$ are between about 5° and about 30°, in another embodiment the angles $\alpha$ and $|\alpha'|$ are between about 7.5° and about 27.5°, and in another embodiment the angles $\alpha$ and $|\alpha'|$ are between about 10° and about 25°. While in certain embodiments $\alpha=|\alpha'|$, in other embodiments $\alpha\neq|\alpha'|$. Likewise, while in certain embodiments $\alpha>0$ and $\alpha'<0$, in other embodiments $\alpha>0$ and $\alpha'>0$, and in yet other embodiments $\alpha<0$ and $\alpha'<0$.

Figure 3C:
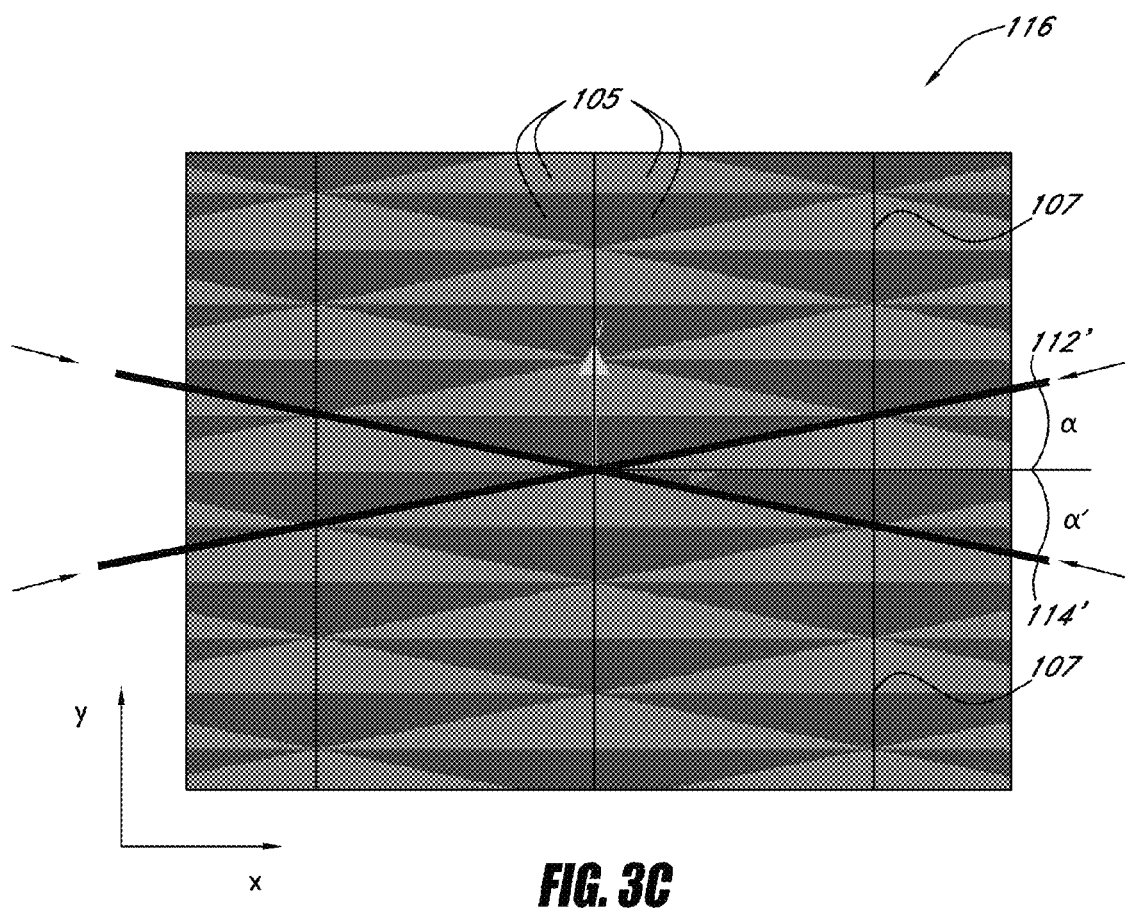
FIG. 3C is a top surface view (parallel to xy plane) of a composite light recycling film formed by combining the pattern of parallel grooves rotated by an angle $\alpha$ (FIG. 3A) with the pattern of parallel grooves rotated by an angle $\alpha'$ (FIG. 3B) to form a plurality of pyramid-shaped total internal reflection structures.
Figure 3D:
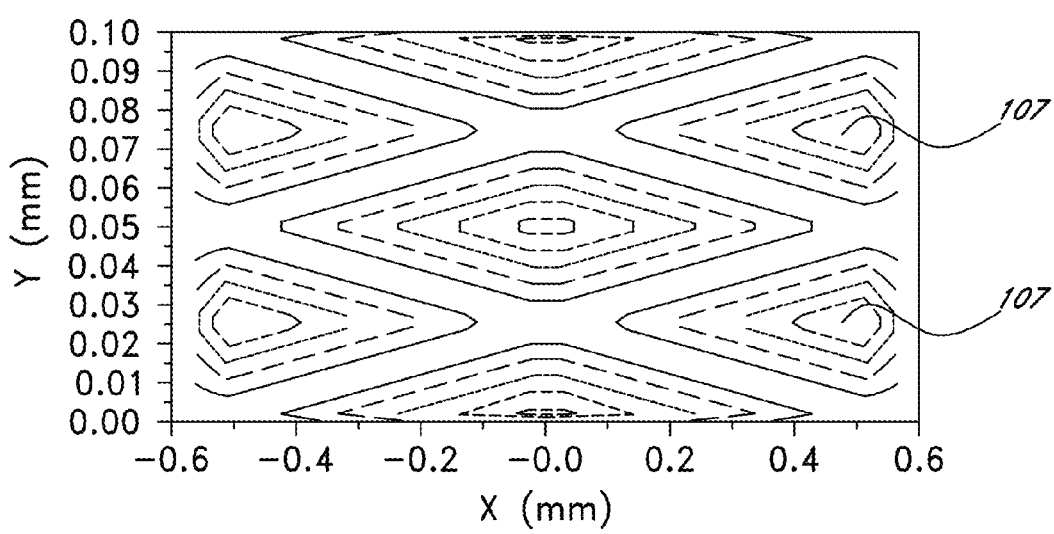
FIG. 3D is a contour plot illustrating the surface profile of the composite light recycling film illustrated in FIG. 3C.

In an example embodiment, the patterns of grooves 110 used to form the modified light recycling films 112, 114 illustrated in FIGS. 3A and 3B are combined to form a composite light recycling film. FIG. 3C schematically illustrates a two-array composite light recycling film 116 formed by combining the pattern of parallel grooves 110 rotated by an angle $\alpha$ (FIG. 3A) with the pattern of parallel grooves rotated by an angle $\alpha'$ (FIG. 3B). In FIG. 3C, line 112' is parallel to the array of grooves 110 corresponding to modified light recycling film 112, and line 114' is parallel to the array of grooves corresponding to the modified light recycling film 114. FIG. 3D is a contour plot illustrating the surface profile of the composite light recycling film 114 illustrated in FIG. 3C. The first and second sets of grooves form pyramid shaped prism structures or total internal reflection structures. These pyramid shapes prism structures may have rounded or pointed/sharp edges or corners. In the example embodiment illustrated in FIG. 3D, the distance between grooves 110 is approximately 0.05 mm (in the y dimension). In other embodiments, the separation of grooves 110 are between approximately 0.02 mm wide and approximately 0.10 mm wide. In embodiments wherein the apex angle $\phi$ is 90°, the groove 110 have a depth (in the z dimension) that is approximately half the groove width. In certain embodiments, the distance between the grooves and ridges is smaller than a pixel size in the spatial light modulator. Other dimensions are used in other embodiments. These grooves 100 may more generally be referred to as elongate features or in this particular example, substantially parallel linear features. In this embodiment, two sets of parallel linear features are used to form the total internal reflection structures. Note in this embodiment, a given groove in the first set intersects another groove in the second set only once.

Figure 3E:
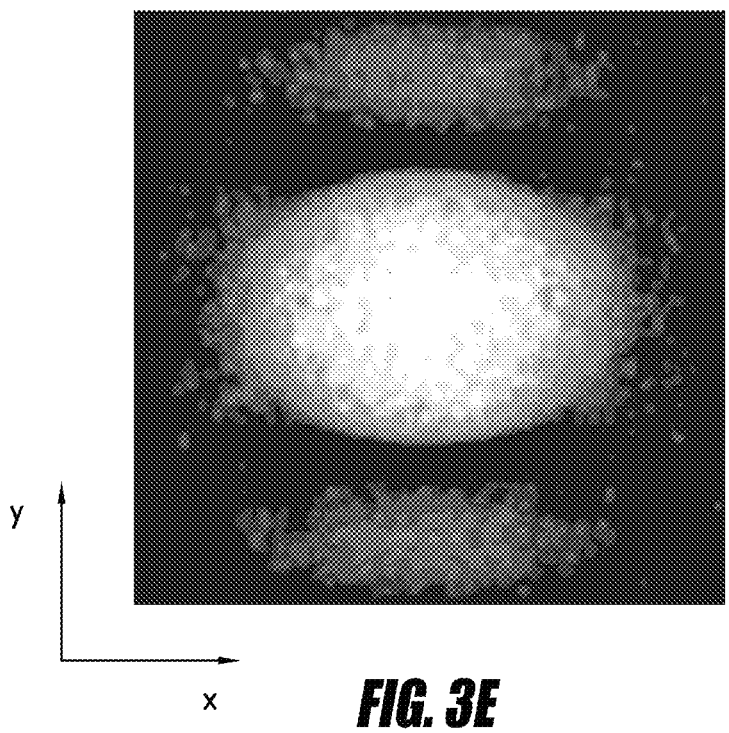
FIG. 3E is a plot of the intensity of the light transmitted by the composite light recycling film of FIG. 3C.
Figure 3F:
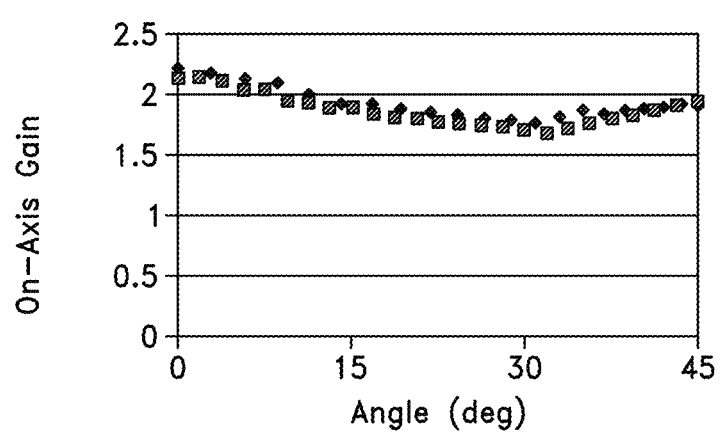
FIG. 3F is a plot of the gain as a function of the half angle $\frac{1}{2}(\alpha-\alpha')$ for the composite light recycling film of FIG. 3C.

When light distributed in a range of angles, for example, Lambertian, is incident on the composite light recycling film 116 illustrated in FIG. 3C, the resulting angular distribution of transmitted light is shown in the light intensity plot of FIG. 3E. The luminance of the light transmitted in the central lobe depends at least partially on the half angle $\frac{1}{2}(\alpha-\alpha')$ between the modified light recycling films 112, 114. FIG. 3F is a plot of the gain, or luminance enhancement measured on axis, for the composite light recycling film 116 illustrated in FIG. 3C as a function of the half angle $\frac{1}{2}(\alpha-\alpha')$ between the angled light recycling film patterns 112, 114. As illustrated in FIG. 3F, the gain can be increased by reducing the half angle $\frac{1}{2}(\alpha-\alpha')$ to less than approximately 30° or increasing the half angle above approximately 30°. The plot shown in FIG. 3F, however, is a plot of data points (squares connected by lines) from specific Monte Carlo simulations and, includes some noise resulting from variation between different simulations. The on-axis gain depends on many factors, including, e.g., thickness of the film, index of the film, light source reflectivity, extent of the cone angle used to define 'on-axis', shape of the edges of the film, etc. Variations in these factors as well as statistical variation of the Monte Carlo simulation produce variations in the simulations. One example Monte Carlo simulation (data points represented by diamonds) is shown as a reference to provide an indication of the variation in test runs.

Figure 3I:
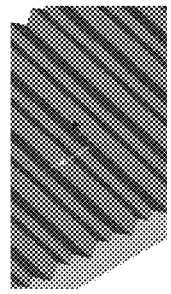
FIG. 3I is a perspective view of a modified light recycling film of FIG. 3G.
Figure 3L:
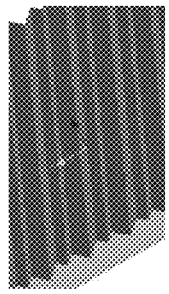
FIG. 3L is a perspective view of a modified light recycling film of FIG. 3J.
Figure 3N:
FIG. 3N is a perspective view of the composite light recycling film of FIG. 3M.
Figure 3H:
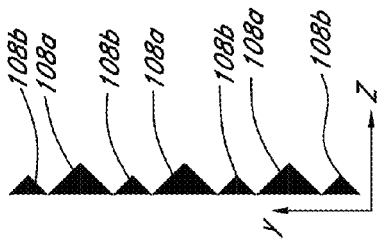
FIG. 3H is a cross-sectional view (parallel to yz plane) of the modified light recycling film of FIG. 3G.
Figure 3K:
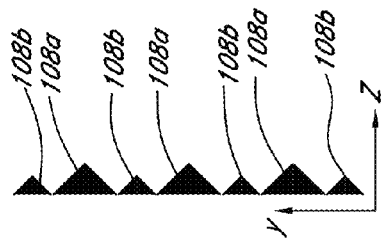
FIG. 3K is a cross-sectional view (parallel to yz plane) of the modified light recycling film of FIG. 3J.
Figure 3G:
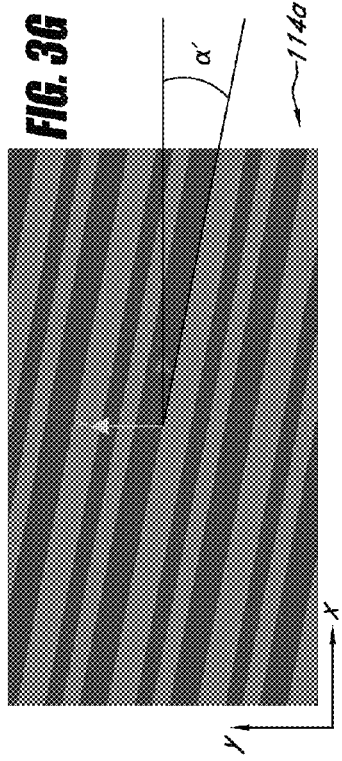
FIG. 3G is a top surface view (parallel to xy plane) of a modified light recycling film having alternating deep grooves and shallow grooves that are rotated with respect to the x axis by an angle $\alpha'$.
Figure 3J:
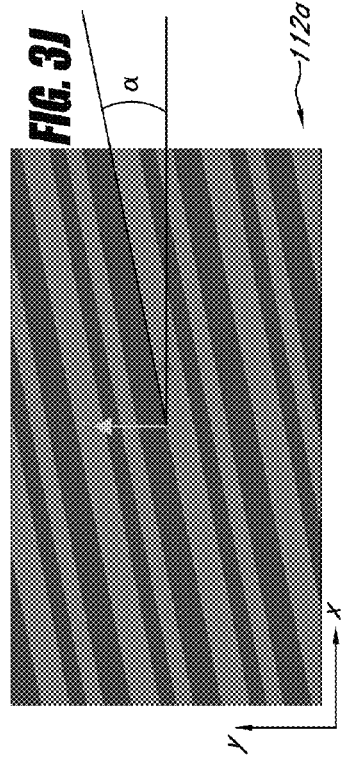
FIG. 3J is a top surface view (parallel to xy plane) of a modified light recycling film having alternating deep and shallow grooves that are rotated with respect to the x axis by an angle α.

FIGS. 3A and 3B illustrate modified light recycling films 112, 114 having arrays of ridges and grooves rotated by angles $\alpha$ and $\alpha'$ with respect to the x axis, respectively. In such embodiments, the array features that define each light recycling film (for example, the ridges and grooves) are of equal dimension throughout each film. In contrast, in certain modified embodiments, the array features that define a light recycling film are not constant throughout the film. For example, FIG. 3G schematically illustrates a modified light recycling film 114a wherein the array features are rotated with respect to the x axis by an angle $\alpha'$, where $\alpha'<0$. However, as illustrated in the cross-sectional view provided in FIG. 3H, the modified light recycling film 114a comprises alternating deep grooves 108a and shallow groove 108b. FIG. 3I provides a perspective view of the modified light recycling film 114a illustrated in FIGS. 3G and 3H. Likewise, FIG. 3J schematically illustrates a modified light recycling film 112a wherein the array features are rotated with respect to the x axis by an angle $\alpha$, where $\alpha>0$. However, as illustrated in the cross-sectional view provided in FIG. 3K, the modified light recycling film 112a comprises alternating deep grooves 108a and shallow grooves 108b. FIG. 3L provides a perspective view of the modified light recycling film 112a illustrated in FIGS. 3J and 3K.

Figure 3M:
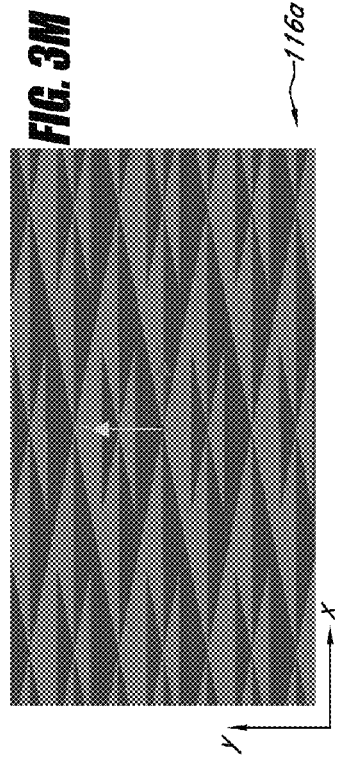
FIG. 3M is a top surface view (parallel to xy plane) of a composite light recycling film formed by combining the set of parallel grooves having alternating depths and rotated by an angle α (FIG. 3J) with the set of grooves having alternating depths and rotated by an angle α' (FIG. 3G).

FIG. 3M schematically illustrates a two-array composite light recycling film 116a formed by combining the pattern of parallel deep and shallow grooves rotated by an angle $\alpha$ (FIG. 3L) with the pattern of parallel deep and shallow ridges rotated by an angle $\alpha'$ (FIG. 3I). FIG. 3N provides a perspective view of the modified light recycling film 116a illustrated in FIG. 3M. The composite light recycling film 116a is described here as being formed by the two modified light recycling films 112a and 114a. However, the composite light recycling film 116a is alternatively described as being formed by four modified light recycling arrays A, B, C, D, each having an array of parallel grooves. Under this framework, arrays A and B are rotated by an angle $\alpha$ with respect to the x axis, arrays C and D are rotated by an angle $\alpha'$ with respect to the x axis, arrays A and C have elongate features with a first dimension, and arrays B and D have elongate features with a second dimension.

In yet another modified embodiment, the array of total internal reflection structures that define the light recycling film have curved surfaces, instead of the planar facets defining prismatic elements as illustrated in FIG. 2A. For example, FIG. 3O is a perspective view of a composite light recycling film 150 formed by combining a pattern of parallel cylindrical elongate features having curved sides, for example, grooves in the shape of 140° arc circular cylinders, rotated by an angle $\alpha$ with a pattern of parallel cylindrical elongate features rotated by an angle $\alpha'$. As illustrated in FIG. 3O, an array of total internal reflection structures having curved shapes are produced. As shown, the composite light recycling film 150 has a cross-section that includes a plurality of 140° circular arcs 152. In modified embodiments, the diameter of the cylindrical elongate features used to form the composite light recycling film 150 are tuned to produce an angular light distribution pattern having certain properties. For example, FIG. 3P illustrates an example angular light distribution pattern produced using the composite light recycling film 150 illustrated in FIG. 3O. FIG. 3Q is a histogram of the relative luminous intensity (measured in candela) for the intensity plot of FIG. 3O. In other embodiments, more than or fewer than two sets of parallel cylindrical elongate features can be combined to form a composite light recycling film. However, the number of sets that are combined to form the composite light recycling film may effect the resulting gain of the composite light recycling film. For example, in an embodiment wherein light is passed through a light recycling film comprising one set of parallel grooves compromising right circular cylinders, the gain is approximately 1.22, while in an embodiment wherein light is passed through a composite light recycling film comprising two sets of parallel grooves comprising right circular cylinders, the gain is approximately 1.33. Advantageously, the crossed cylinder light recycling film provides a smooth transition between the central region of high gain and the outer regions of low gain.

Figure 3R:
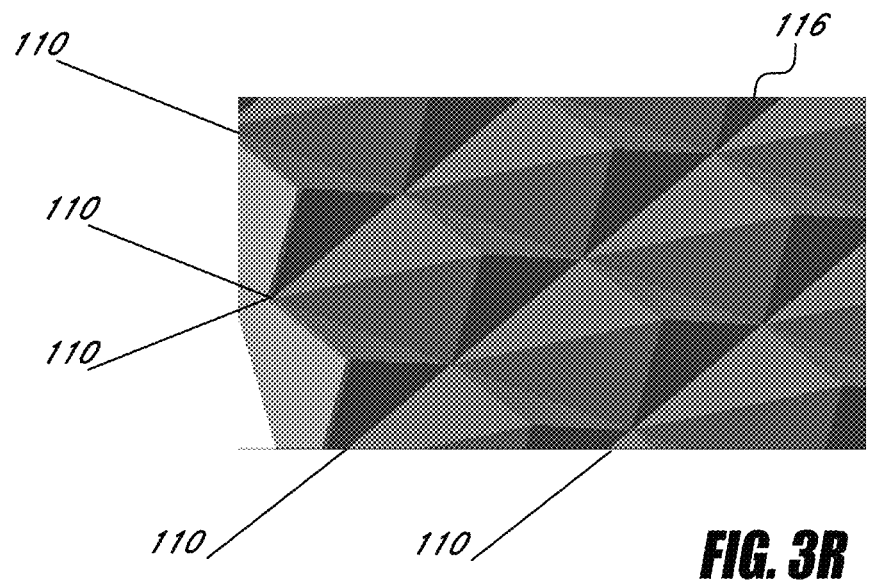
FIG. 3R is a perspective view of the composite light recycling film of FIG. 3C comprising a plurality of pyramid-shaped prism structures and referred to herein as an upright (or "everted") configuration.
Figure 3S:
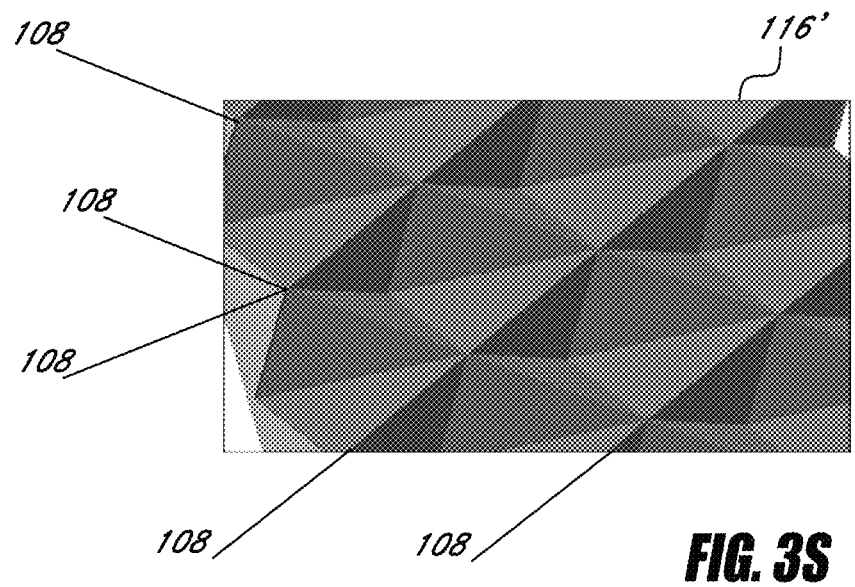
FIG. 3S is a perspective view of an inverted composite light recycling film comprising a set of parallel ridges rotated by an angle α and a set of parallel ridges rotated by an angle α' that form inverted pyramid-shaped structures.

In certain embodiments, the composite light recycling films disclosed herein comprises a plurality of total internal reflection structures having an upright ("everted") configuration, while in other embodiments an inverted configuration is used. FIG. 3R is a perspective view of the composite light recycling film 116 illustrated in FIG. 3C, which has upright ("everted") total internal reflection structures, in this case upright pyramid shape prisms. In the upright ("everted") configuration, a viewer looking down one of the grooves 110 sees a line of constant elevation across the light recycling film, and there are no ridgelines of constant elevation in the light recycling film. In contrast to the upright ("everted") configuration, FIG. 3S is a perspective view of a composite light recycling film 116' comprising a plurality of inverted total internal reflection structures. In the inverted configuration, a viewer looking down one of the ridges 108 sees a line of constant elevation across the light recycling film, and there are no grooves of constant elevation in the light recycling film. While both the upright ("everted") and inverted configurations are usable with the systems disclosed herein, the inverted configuration provides a stiffer structure for a given weight, volume, or thickness of plastic. Additionally the inverted configuration may have reduced potential to trap long, thin contaminants and, thus, may be less susceptible to damage. Additionally, the inverted configuration facilitates reduced contact with neighboring surfaces by allowing the introduction of small variations in the height of the ridges 108. For example, a given ridge may vary in height along its length or different ridges can have different heights as discussed more fully below. In some embodiments, these height variations may be small compared to the height of the ridge. Other advantages may also result.

Figure 3T:
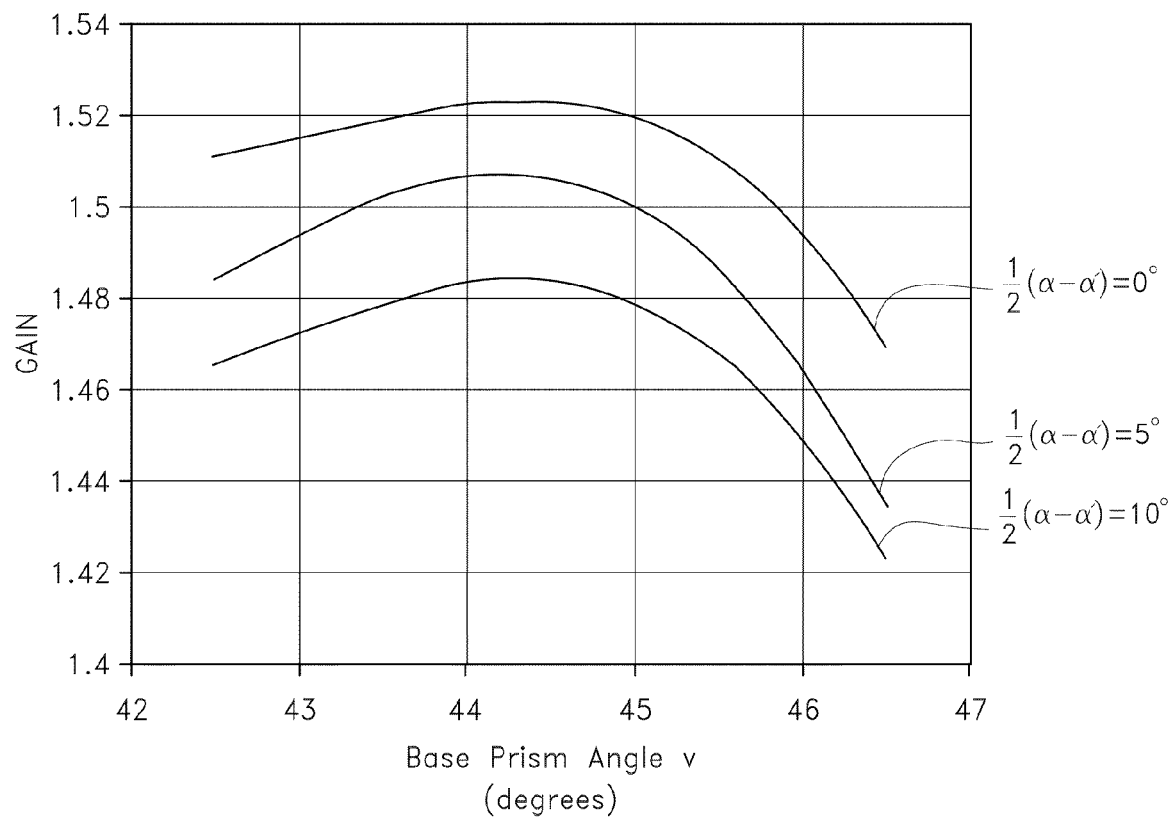
FIG. 3T is a plot of the gain of an example light recycling film as a function of the shape of elongate features that comprise the light recycling film, as defined by a base angle ν.

Referring again to the example light recycling film 22 illustrated in FIG. 2B, the two facets 105 form acute base angles $v_1$ and $v_2$ with respect to the xy plane, such that $v_1+v_2+\phi=180°$. FIG. 3T is a plot of the gain of an example light recycling film as a function of v, wherein $v=v_1=v_2$. In particular, FIG. 3T illustrates the gain for the light recycling film 22 illustrated in FIG. 2A (wherein the half angle ½[α-α']=0°), as well as for the composite light recycling film 116 illustrated in FIG. 3C (wherein the half angle ½[α-α']=5° and ½[α-α']=10°). In the illustrated embodiment, to increase or maximize the gain of the light recycling film, v may be between about 44° and about 44.5°, and is more preferably about 44.25°.

The on-axis luminance enhancement of light passing through the light recycling film 22, also referred to herein as the gain, depends on, among other things, the thickness t of the light recycling film 22, as illustrated in FIG. 2B. Specifically, reflections from the inner planar surface 103 of the light recycling film 22, and optionally from other planar surfaces of optical components included in the backlit display 10, can cause reduced transmission and create interference patterns that alter the gain of the system by up to approximately ±2%. Such interference patterns can create or amplify Moiré patterns evident in the planar display surface 26. Therefore, in certain embodiments the thickness t of the light recycling film 22 is tuned to reduce or minimize these effects.

Figure 3U:
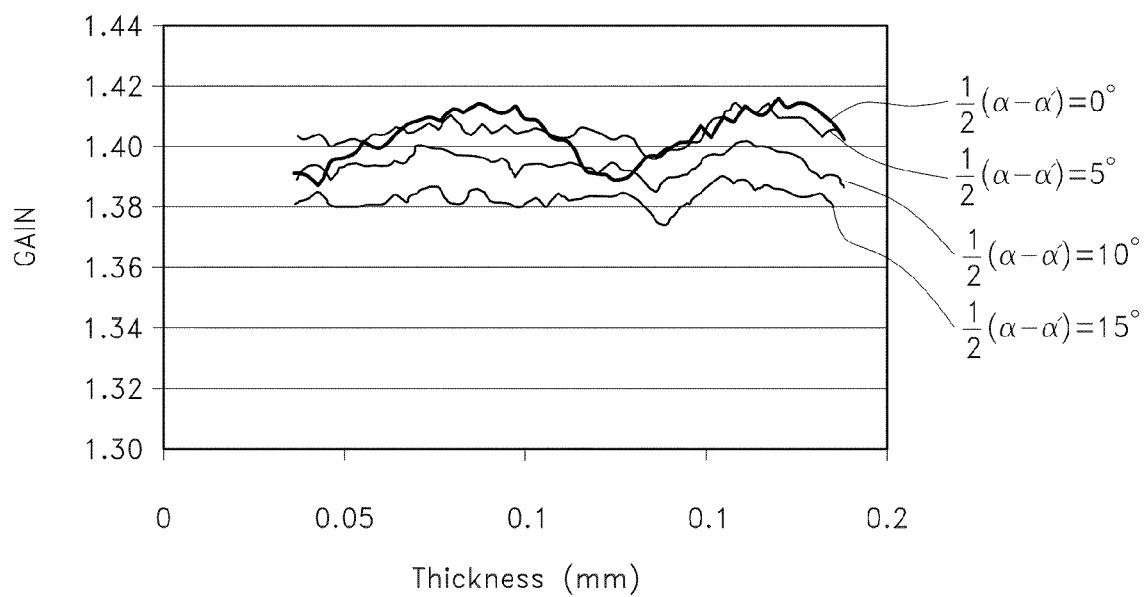
FIG. 3U is a plot of the gain of an example light recycling film as a function of film thickness t.

Certain embodiments of a composite light recycling film 116, such as that illustrated in FIG. 3C, advantageously reduce the dependency of on-axis gain on thickness. For example, FIG. 3U is a plot of the gain of an example light recycling film as a function of film thickness t where the index of refraction of the film is 1.485 As illustrated, both the gain and the variance in gain depend on the half angle ½(α-α') of the composite light recycling film 116. In FIG. 3U, the gain variance is highest for ½[α-α']=0°. FIG. 3U also illustrates that for certain film thicknesses t, a composite light recycling film 116 has a higher gain than a single array light recycling film 22 (wherein the half angle ½[α-α']=0°).

FIG. 3U also illustrates that in certain embodiments there exist gain maxima and minima for certain film thicknesses. Referring again to FIG. 2B, a collimated light beam 109 is illustrated as being refracted and reflected by the light recycling film 22. From Snell's Law and the geometry illustrated in FIG. 2B, $$\sin(\beta) = \frac{\sin(90-v)}{n}$$

and $$w = 2(t + \Delta t)\tan(\beta)$$

where β is the angle at which the collimated light beam propagating normally into the light recycling film is refracted upon entering the light recycling film, v is the base angle formed between the facet 105 and the plane of the light recycling film (parallel to the xy plane), n is the index of refraction of the material comprising the light recycling film 22, t is the thickness of the body portion of the film, and Δt is the thickness of the ridge 108. Thus, the quantity tan(β) is independent of film thickness. As illustrated in FIG. 2B, p is the pitch of the array of ridges 108. Gain maxima occur where the ratio w/p is an integer, and gain minima occur where the ratio w/p is an integer +0.5. Accordingly, the thickness can be selected for a given pitch to provide increased gain. In certain embodiments the thickness is varied across the film to reduce interference effects. In some cases, this thickness may undulate across the film. Also as described herein, the height of the elongate features, e.g., ridges, can vary from ridge to ridge or along a given ridge.

In the example above, a single pitch is shown. The composite light recycling film 116 illustrated in FIG. 3C, for example, is formed by combining the array of parallel grooves 110 inclined by an angle α (FIG. 3A) with the array of parallel grooves inclined by an angle α' (FIG. 3B). In this example, the light recycling films illustrated in FIG. 3A and FIG. 3B have equal pitches, as measured along the y axis. The resulting composite light recycling film 116 illustrated in FIG. 3C includes a plurality of pyramid centers 107 that are positioned in an array that is parallel to the x and y axes. In a modified embodiment, a composite light recycling film is formed using subcomponent light recycling films with different pitches.

Figure 3V:
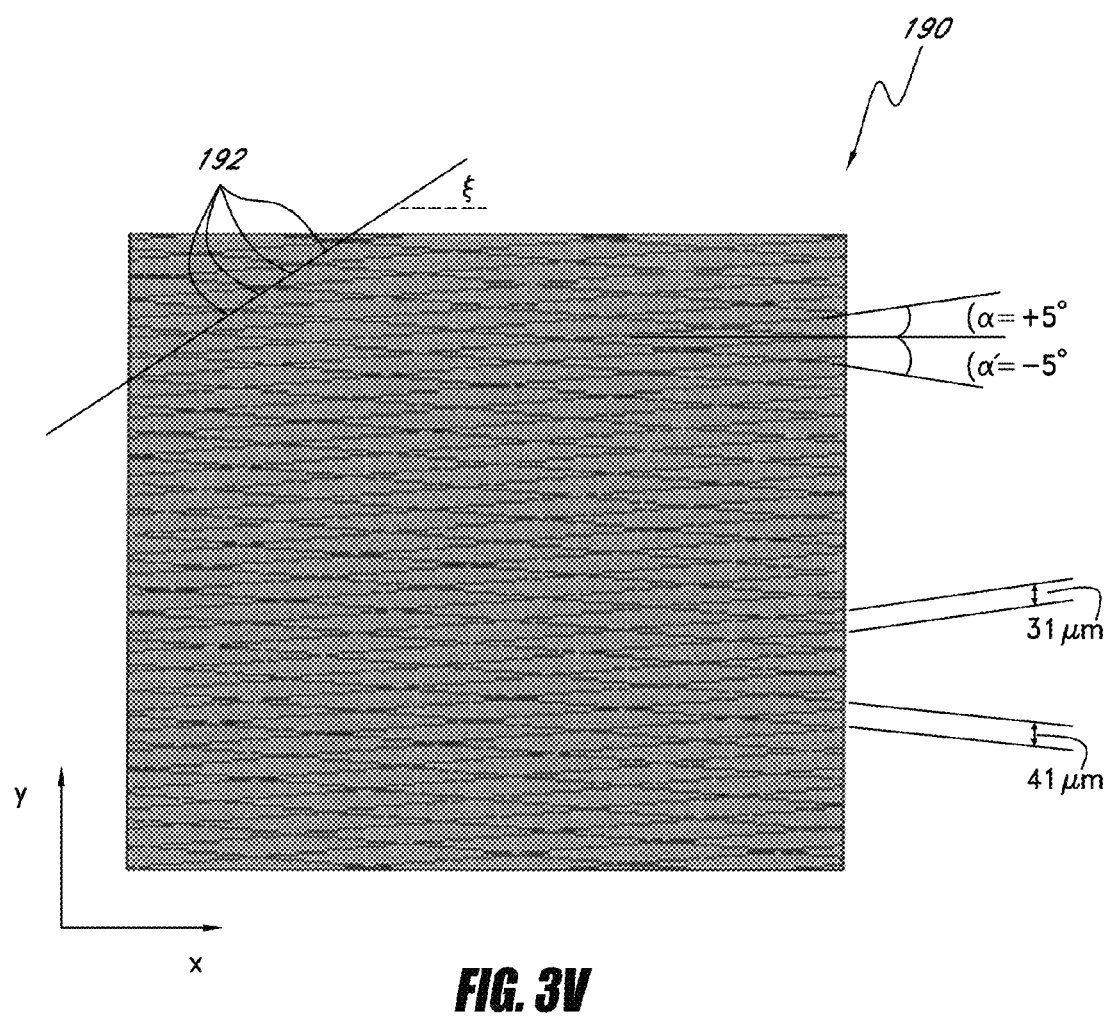
FIG. 3V schematically illustrates an example composite light recycling film formed by combining a first array of parallel grooves that have a pitch of 31 μm and that are inclined by an angle +5° with a second array of parallel grooves that have a pitch of 41 μm and that are inclined by an angle −5°.

For example, FIG. 3V schematically illustrates a composite light recycling film 190 formed by combining a first array of parallel grooves that have a pitch of 31 μm and that are inclined by an angle α=+5° with a second array of parallel grooves that have a pitch of 41 μm and that are inclined by an angle α=−5°. In other embodiments, the pitches may be 40 and 50 microns respectively. Other values of pitches may be used as well.

The composite light recycling film 190 includes a plurality of pyramid centers 192 that are positioned in an array that is rotated with respect to the x axis by an angle ζ. The pattern has a rotated appearance without rotating the film and without rotating the gain distribution. Gain is also not reduced. In certain configurations, this effect is used to reduce correlation with a pattern of extractor elements used to extract light from the light recycling film or pixels in the spatial light modulator. Thus, by varying the pitch of the two patterns of parallel ridges and grooves that comprise the composite light recycling film, the patterns can be crossed at a smaller half angle $\frac{1}{2}(\alpha-\alpha')$ without the increase in pixel correlation that might occur when the half angle $\frac{1}{2}(\alpha-\alpha')$ is reduced.

Figure 3W:
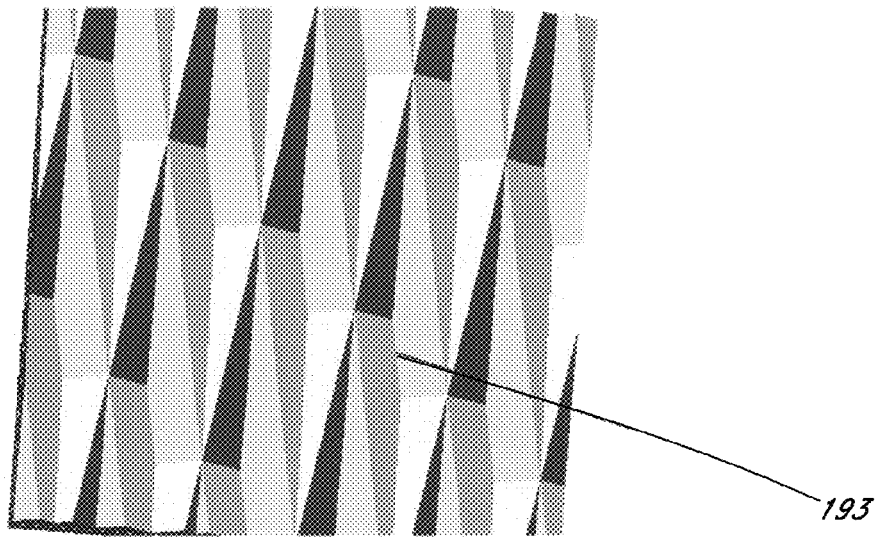
FIG. 3W schematically illustrates a micro-prism having planar faces that intersect to form peak that is a line rather than a point.

In addition, the prisms formed are asymmetric. The prisms may also comprise sides that come together to form a peak that is a line 193 rather than a point as shown in FIG. 3W.

Figure 3X:
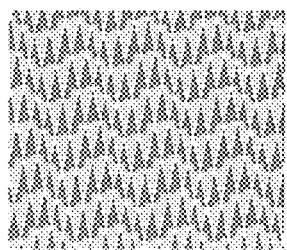
FIGS. 3X, 3Y, and 3Z schematically illustrates a composite light recycling films having pitches that vary.
Figure 3Y:
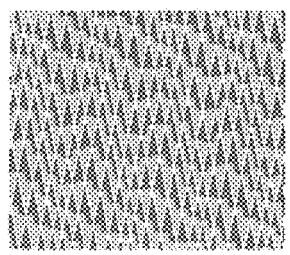
Figure 3Z:
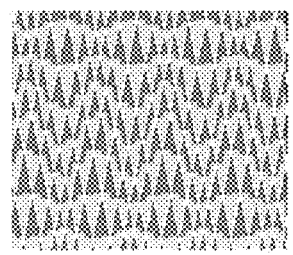

In modified embodiments, the pitch of a pattern of ridges and grooves is varied across the surface of a of single-pattern light recycling film, such as illustrated in FIGS. 3X, 3Y, and 3Z. In such embodiments, the pitch variation is linear, oscillation, random and pseudo-random. Accordingly, in some embodiments, the pitch may increase and decrease along a direction across the light recycling film. Still other pitch variations are possible.

Although various embodiments are described herein as having sets of elongate feature with the same pitch, alternatively the pitches of two or more of the sets may be different. In some composite light recycling films 116 comprising more than two sets of elongate features a first and second set may have the same pitch while a third set may have a pitch different from the first and second set. In other embodiments, all three sets have different pitches. In a film 116 with four sets, two, three, or four of the sets may be different and two or three of the sets may be the same. Various other combinations are possible. The number of combinations increases with increasing number of sets of parallel elongate features.

Similarly, although various embodiments are described herein as having a constant pitch, alternatively the pitch need not be constant but may vary. In some embodiments only one of the sets has a pitch that varies. In other embodiments, a some but not all of the sets have a pitch that varies. In other embodiments, each of the sets have pitches that vary. In some embodiments, the pitch may vary over portions of the film or over the entire film. The pitch may vary but have some pattern. A large range of variation and combinations are possible.

Figure 4A:
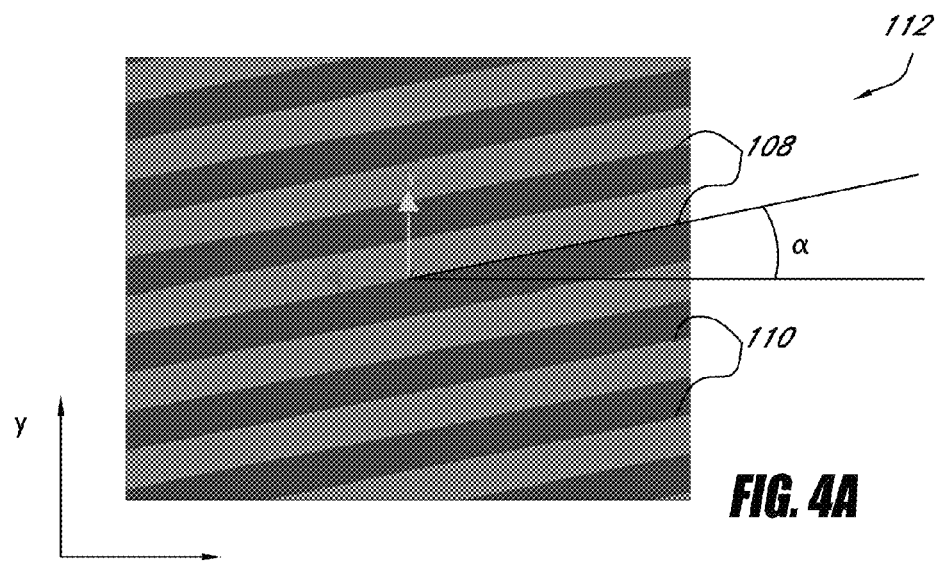
FIG. 4A is a top surface view (parallel to xy plane) of a modified light recycling film having an array of parallel ridges and grooves that are rotated with respect to the x axis by an angle α.
Figure 4B:
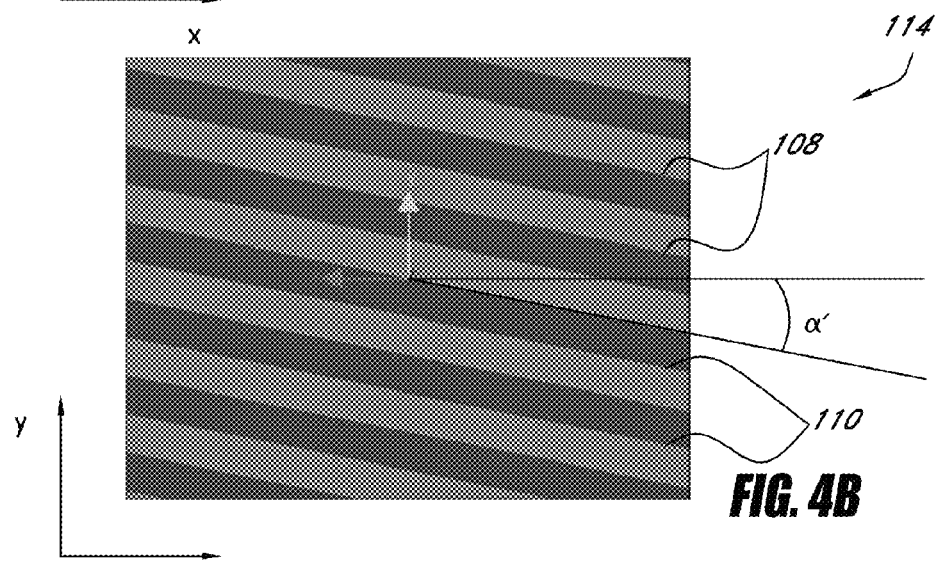
FIG. 4B is a top surface view (parallel to xy plane) of a modified light recycling film having an array of parallel ridges and grooves that are rotated with respect to the x axis by an angle α'.
Figure 4C:
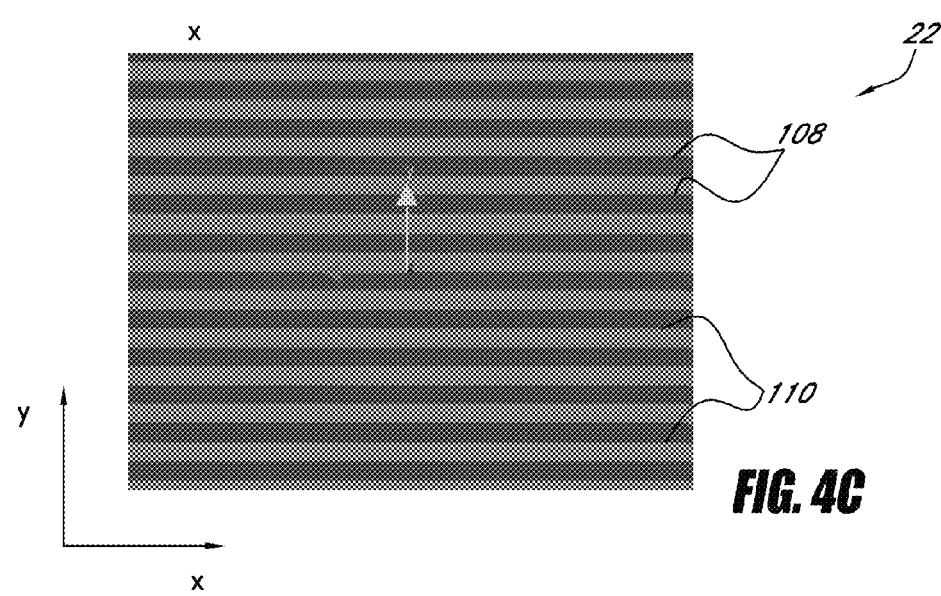
FIG. 4C is a top surface view (parallel to xy plane) of an example embodiment of a light recycling film having ridges and grooves parallel to the x-axis.

The composite light recycling film 116 illustrated in FIG. 3C is formed by combining the array of parallel grooves 110 inclined by a first angle α (FIG. 3A) with the array of parallel grooves inclined by an angle α' (FIG. 3B). In certain modified embodiments, composite light recycling films are formed by combining more than two arrays of relatively parallel ridges or grooves. For example, FIG. 4A schematically illustrates a modified light recycling film 112 wherein the ridges 108 and the grooves 110 are angled with respect to the x axis by an angle α, where α>0. FIG. 4B schematically illustrates a modified light recycling film 114 wherein the ridges 108 and the grooves 110 are angled with respect to the x axis by an angle α', where α'<0. FIG. 4C schematically illustrates a light recycling film 22 wherein the ridges 108 and the grooves 110 are substantially parallel to the x axis. In one embodiment, the composite pattern of these three light recycling films is used to form a composite light recycling film.

Figure 4D:
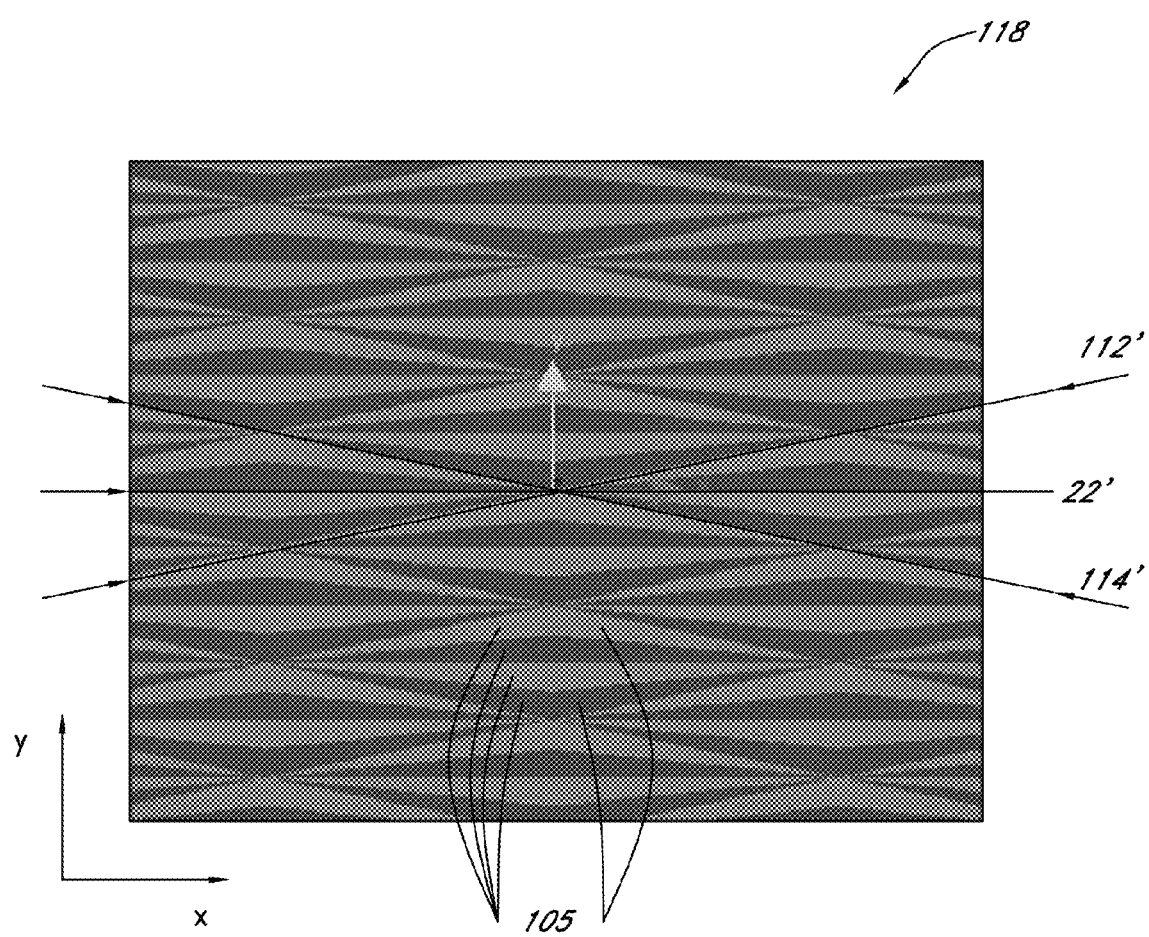
FIG. 4D is a top surface view (parallel to xy plane) of a composite light recycling film formed by combining the pattern of parallel grooves rotated by an angle α (FIG. 4A) with the pattern of parallel grooves rotated by an angle α' (FIG. 4B) and the pattern of parallel grooves that is parallel to the x axis (FIG. 4C).
Figure 4E:
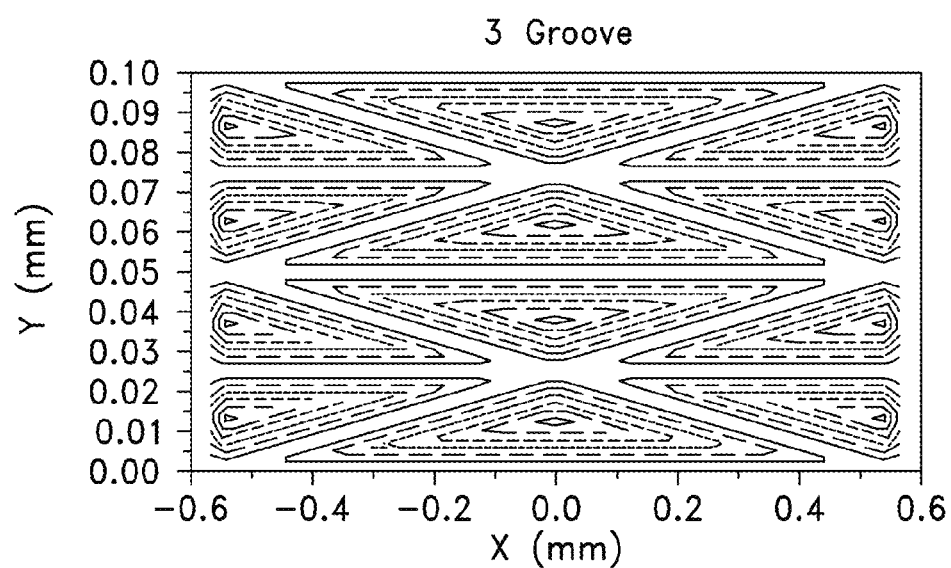
FIG. 4E is a contour plot illustrating the surface profile of the composite light recycling film illustrated in FIG. 4D.
Figure 4K:
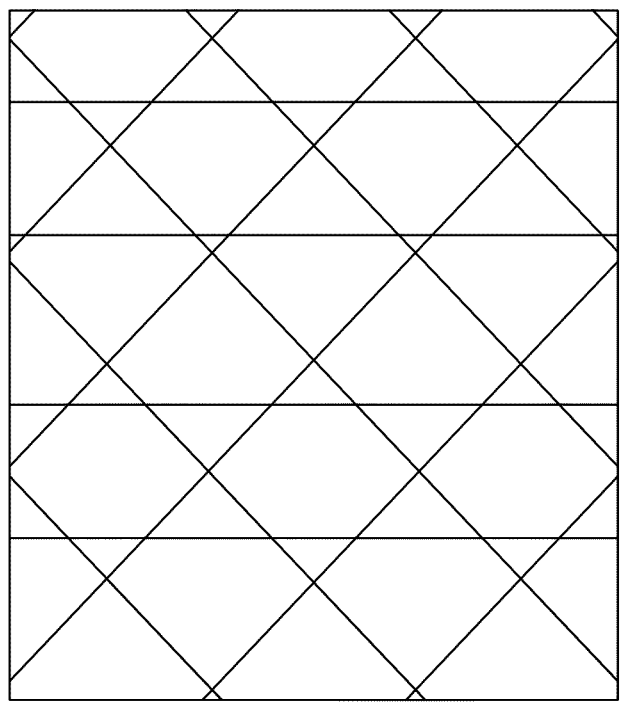
FIG. 4K schematically illustrates a composite light recycling films comprising a plurality of sets of parallel elongate features that do not intersect each other at a single common point.

FIG. 4D schematically illustrates a three-array composite light recycling film 118 formed by combining the pattern of parallel grooves 110 rotated by an angle α (FIG. 4A), the pattern of parallel grooves rotated by an angle α' (FIG. 4B), and the pattern of parallel grooves that is parallel to the x axis (FIG. 4C). Line 112' is parallel to the array of grooves 112 corresponding to modified light recycling film 112, line 114' is parallel to the array of grooves corresponding to the modified light recycling film 114, and line 22' is parallel to the array of grooves corresponding to the light recycling film 22. Note in this embodiment, a given groove in intersects another groove only once. FIG. 4E is a contour plot illustrating the surface profile of the composite light recycling film 118 illustrated in FIG. 4D. FIGS. 4D and 4E show total internal reflection structures comprising pyramid shaped prisms. FIGS. 4D and 4E also illustrate that the composite light recycling film 118 includes six facets 105 in each period of the composite array.

When light distributed in a range of angles, for example, Lambertian, is incident on the composite light recycling film 118 illustrated in FIG. 4D, the resulting angular distribution of transmitted light is shown in the light intensity plot of FIG. 4F. FIG. 4H is a histogram of the luminous intensity (measured in candela) for the spatial intensity plot of FIG. 4F. This histogram illustrates that the luminous intensity of the transmitted light field is relatively evenly distributed across a wide range of luminous intensities. The luminance of the light transmitted in the central lobe, as well as the shape of the central lobe, depends at least partially on the half angle $\frac{1}{2}(\alpha-\alpha')$ between the modified light recycling films 112, 114. FIG. 4G is a plot of the gain, or luminance enhancement within the lobe, of two crossed two-array and three-array composite light recycling films 116, 118 illustrated in FIGS. 3C and 4D, respectively, as a function of the half angle $\frac{1}{2}(\alpha-\alpha')$ between the angled light recycling film patterns 112, 114. FIG. 4G indicates that more light is coupled through the two crossed composite light recycling films when the films are formed with three arrays of parallel grooves 110 instead of two when the half angle $\frac{1}{2}(\alpha-\alpha')$ is less than approximately 30°. FIG. 4G also indicates that the light recycling film comprising two arrays of parallel grooves 110 has higher gain for half angles above approximately 30°. Accordingly, light recycling films having three arrays of parallel grooves 110 may be more advantageous than light recycling films having two arrays of parallel grooves 110 for a given half angle $\frac{1}{2}(\alpha-\alpha')$ less than approximately 30°. However, outside this regime, that is, for half angles $\frac{1}{2}(\alpha-\alpha')$ greater than approximately 30°, light recycling films having two arrays of parallel grooves 110 may be more advantageous than light recycling films having three arrays of parallel grooves 110.

FIG. 4I is a perspective view of the composite light recycling film 118 illustrated in FIG. 4D, which has an upright ("everted") configuration. In the upright ("everted") configuration, a viewer looking down one of the grooves 110 sees a line of constant elevation across the light recycling film, and there are no ridgelines of constant elevation in the light recycling film. In contrast to the upright ("everted") configuration, FIG. 4J is a perspective view of an inverted composite light recycling film 118'. In the inverted configuration, a viewer looking down one of the ridges 108 sees a line of constant elevation across the light recycling film, and there are no grooves of constant elevation in the light recycling film.

FIG. 4I schematically illustrates a composite light recycling films comprising a plurality of sets of parallel elongate features (e.g., first, second, and third sets of elongate features) that do not intersect each other at a single common point. The first and second sets intersect at set of points. However, the third set of elongate features does not intersect this set of point but is offset therefrom.

Figure 5A:
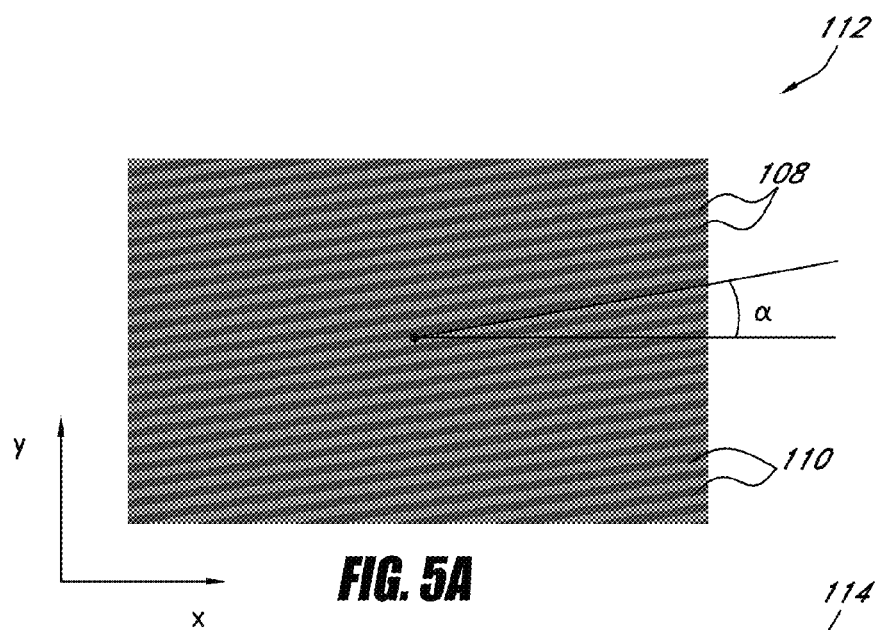
FIG. 5A is a top surface view (parallel to xy plane) of a modified light recycling film having an array of parallel ridges and grooves that are angled with respect to the x axis by an angle α.
Figure 5B:
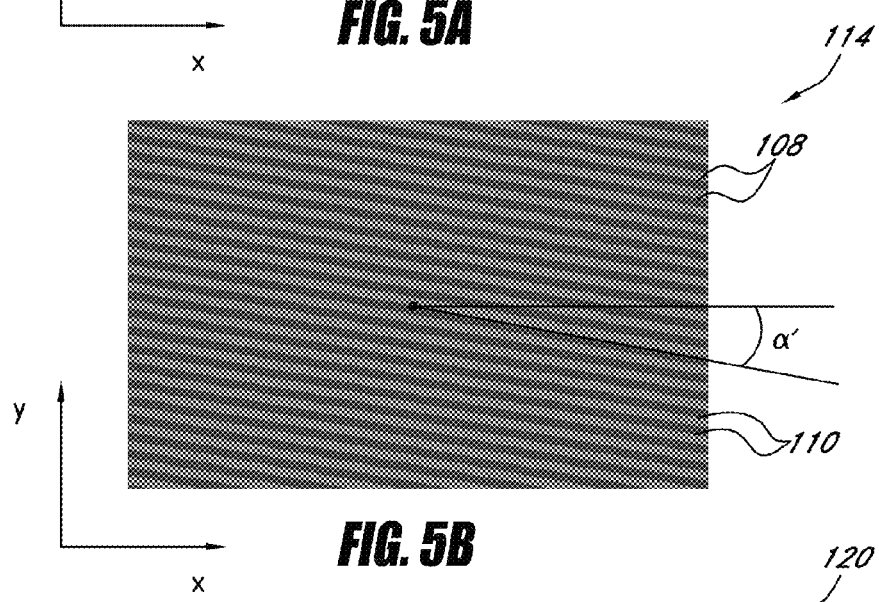
FIG. 5B is a top surface view (parallel to xy plane) of a modified light recycling film having an array of parallel ridges and grooves that are angled with respect to the x axis by an angle α'.
Figure 5C:
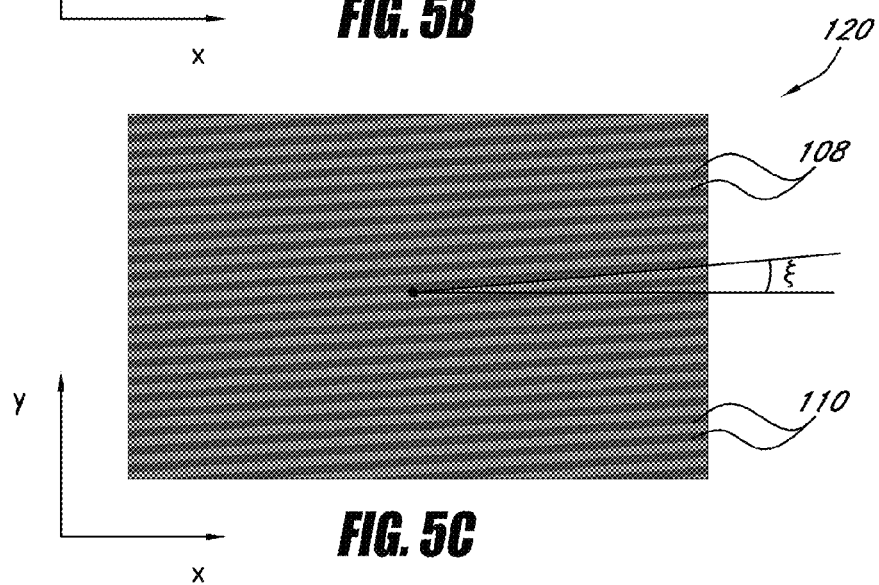
FIG. 5C is a top surface view (parallel to xy plane) of a modified light recycling film having an array of parallel ridges and grooves that are angled with respect to the x axis by an angle ξ.

The composite light recycling film 118 illustrated in FIG. 4D is formed by combining the array of parallel grooves 110 inclined by an angle α (FIG. 4A) with the array of parallel grooves inclined by an angle α' (FIG. 4B) and the array of parallel grooves parallel to the x axis (FIG. 4C). In this example, as measured along the y axis, the pitch of the array of parallel grooves parallel to the x axis is half the pitch of the array of parallel grooves inclined by angle α. In certain modified embodiments, composite light recycling films are formed without using an array of elongate features (e.g., parallel grooves 110) that is parallel to the x axis. For example, FIG. 5A schematically illustrates a modified light recycling film 112 wherein the ridges 108 and the grooves 110 are angled with respect to the x axis by an angle α, where α>0. FIG. 5B schematically illustrates a modified light recycling film 114 wherein the ridges 108 and the grooves 110 are angled with respect to the x axis by an angle α', where α'<0. FIG. 5C schematically illustrates a modified light recycling film 120 wherein the ridges 108 and the grooves 110 are angled with respect to the x axis by an angle ξ, where α>ξ>α' and ξ≠0. In one embodiment, the composite pattern of these three light recycling arrays is used to form a composite light recycling film.

Figure 5D:
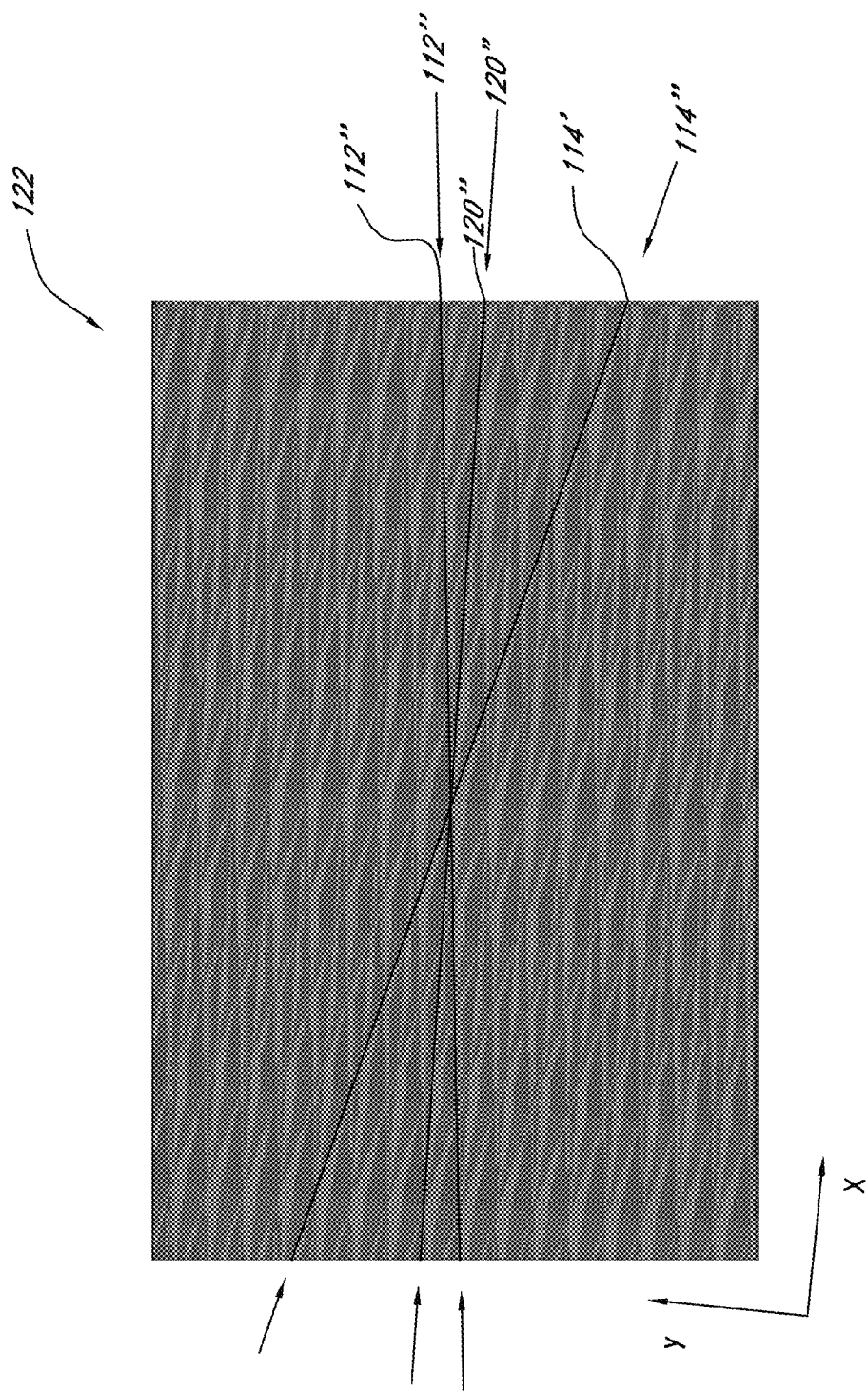
FIG. 5D is a top surface view (parallel to xy plane) of a composite light recycling film formed by combining the pattern of parallel grooves rotated by an angle α (FIG. 5A) with the pattern of parallel grooves rotated by an angle α' (FIG. 5B) and the pattern of parallel grooves rotated by an angle ξ (FIG. 5C).

FIG. 5D schematically illustrates a three-array composite light recycling film 122 formed by combining the pattern of parallel grooves 110 rotated by an angle α (FIG. 5A), the pattern of parallel grooves rotated by an angle α' (FIG. 5B), and the pattern of parallel grooves rotated by an angle ξ (FIG. 5C). In FIG. 5D, line 112' is parallel to the array of grooves corresponding to modified light recycling film 112, line 114' is parallel to the array of grooves corresponding to the modified light recycling film 114, and line 120' is parallel to the array of grooves corresponding to the modified light recycling film 120.

Accordingly, arrow 112" is directed along one of the grooves 110 in the array corresponding to the modified recycling film 112. A viewer looking along the direction of arrow 112" would look down this groove 110. Arrow 114" is directed along one of the grooves 110 in the array corresponding to the modified recycling film 114. Likewise, a viewer looking along the direction of arrow 114" would look down this groove 110. Similarly, arrow 120" is directed along one of the grooves 110 in the array corresponding to the modified recycling film 120. Accordingly, a viewer looking along the direction of arrow 120" would look down this groove 110.

In certain modified embodiments, composite light recycling films are formed by combining more than three patterns of parallel ridges 108 or grooves 110. For example, FIG. 6A schematically illustrates a modified light recycling film 112 wherein the ridges 108 and the grooves 110 are angled with respect to the x axis by an angle α, where α>0. FIG. 6B schematically illustrates a modified light recycling film 114 wherein the ridges 108 and the grooves 110 are angled with respect to the x axis by an angle α', where α'<0. FIG. 6C schematically illustrates a modified light recycling film 120 wherein the ridges 108 and the grooves 110 are angled with respect to the x axis by an angle ξ, where ξ>0. FIG. 6D schematically illustrates a modified light recycling film 124 wherein the ridges 108 and the grooves 110 are angled with respect to the x axis by an angle ξ', where ξ'<0. In one embodiment, the composite pattern of these four light recycling arrays is used to form a composite light recycling film.

Figure 6E:
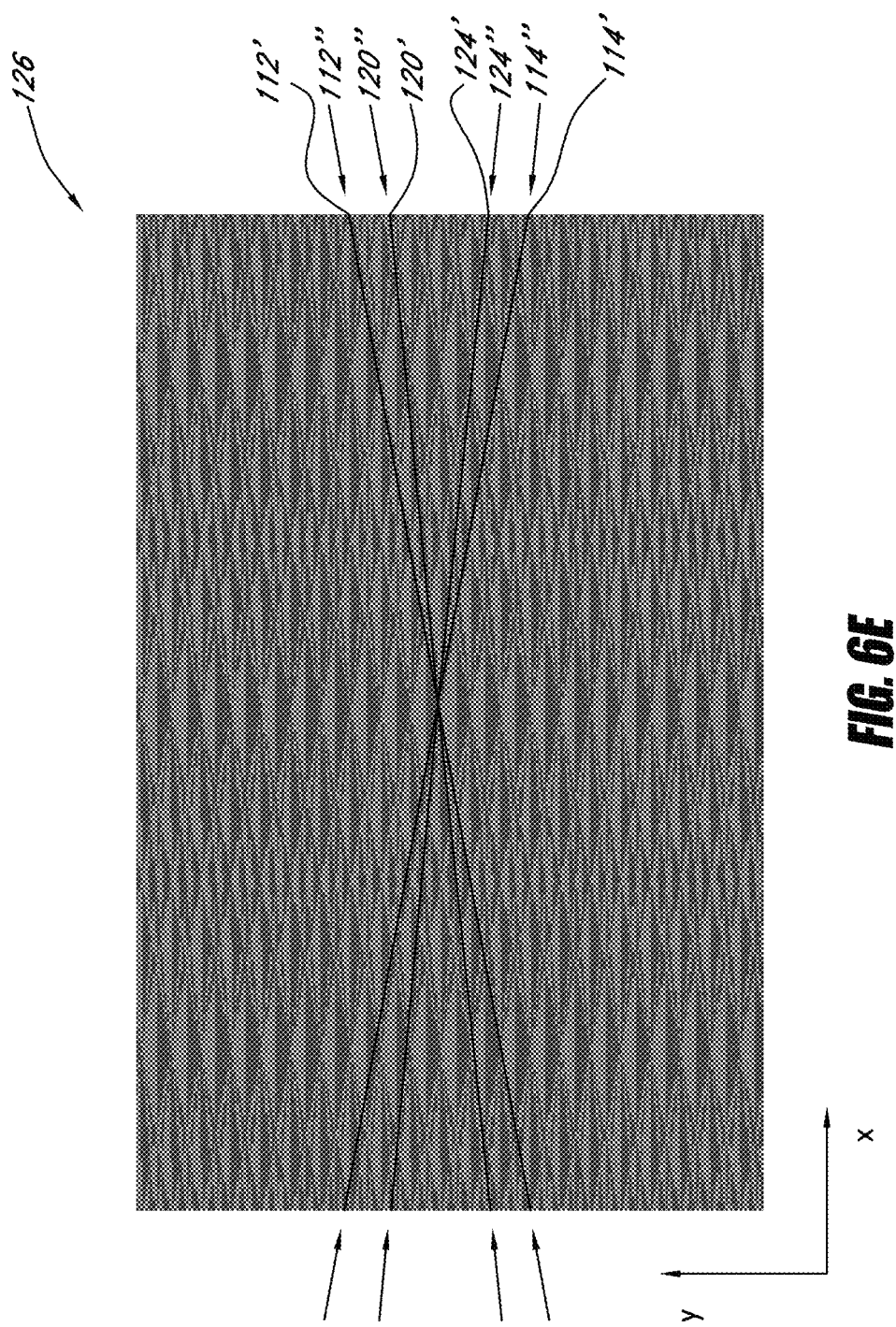
FIG. 6E is a top surface view (parallel to xy plane) of a composite light recycling film formed by combining the pattern of parallel ridges and grooves rotated by an angle α (FIG. 6A) with the pattern of parallel grooves rotated by an angle α' (FIG. 6B), the pattern of parallel grooves rotated by an angle ξ (FIG. 6C), and the pattern of parallel grooves rotated by an angle ξ' (FIG. 6D).

FIG. 6E schematically illustrates a four-array composite light recycling film 126 formed by combining the array of parallel grooves 110 rotated by an angle α (FIG. 6A), the array of parallel grooves rotated by an angle α' (FIG. 6B), the array of parallel grooves rotated by an angle ξ (FIG. 6C), and the array of parallel grooves rotated by an angle ξ' (FIG. 6D). In FIG. 6E, line 112' is parallel to the array of grooves 110 corresponding to angled light recycling pattern 112, line 114' is parallel to the array of grooves corresponding to the angled light recycling pattern 114, line 120' is parallel to the array of grooves corresponding to the angled light recycling pattern 120, and line 124' is parallel to the array of grooves corresponding to the angled light recycling pattern 124.

Accordingly, arrow 112" is directed along one of the grooves 110 in the array corresponding to the modified recycling film 112. A viewer looking along the direction of arrow 112" would look down this groove 110. Arrow 114" is directed along one of the grooves 110 in the array corresponding to the modified recycling film 114. Likewise, a viewer looking along the direction of arrow 114" would look down this groove 110. Arrow 120" is directed along one of the grooves 110 in the array corresponding to the modified recycling film 120. Accordingly, a viewer looking along the direction of arrow 120" would look down this groove 110. Similarly, arrow 124" is directed along one of the grooves 110 in the array corresponding to the modified recycling film 124. Likewise, a viewer looking along the direction of arrow 124" would look down this groove 110. The composite light recycling film 126 includes eight facets in each period of the composite array.

Figure 6F:
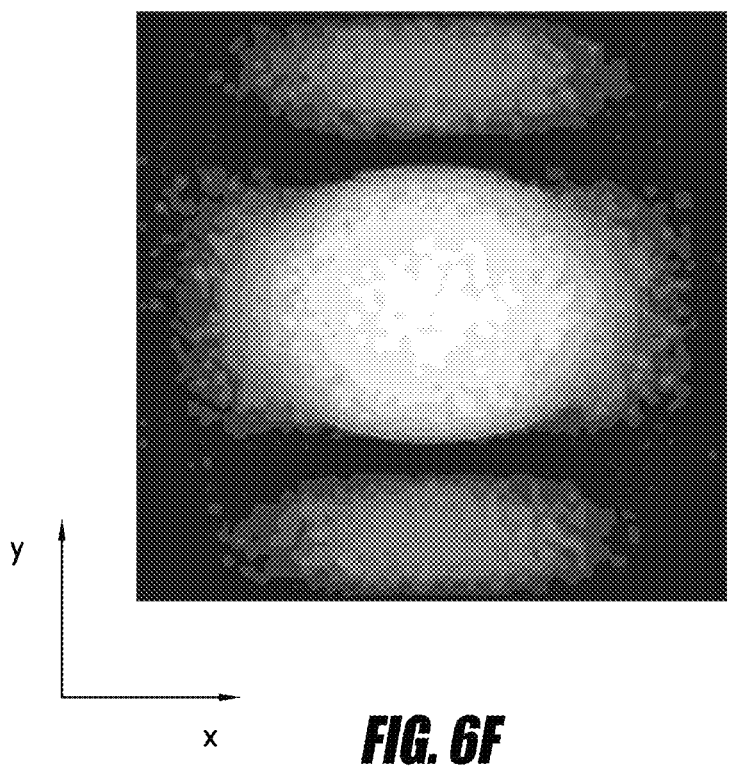
FIG. 6F is a plot of the intensity of the light transmitted by the composite light recycling film of FIG. 6E.

When light distributed in a range of angles, for example, Lambertian, is incident on the composite light recycling film 126 illustrated in FIG. 6E, the resulting pattern of transmitted light is shown in the light intensity plot of FIG. 6F. The luminance of the light transmitted in the central lobe, as well as the shape of the central lobe depends on a variety of factors. Such factors include but are not limited to (i) the half angle ½(α-α') between the modified light recycling film patterns 112, 114; and (ii) the angle (α-ξ) between the modified light recycling film patterns 112, 120.

Figure 7A:
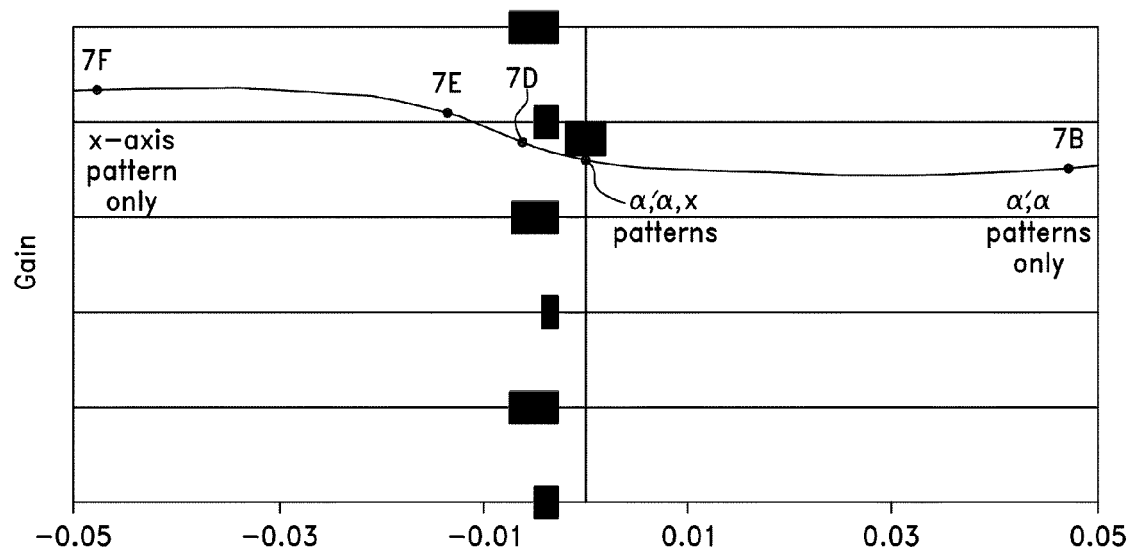
FIG. 7A is a plot of the gain as a function of the relative depth Δz of the grooves parallel to the x axis as compared to grooves rotated by the angle α and the grooves rotated by the angle α'.

As described herein, FIG. 4D illustrates a composite light recycling film 118 formed by combining the pattern of parallel grooves rotated by an angle α (illustrated in FIG. 4A; referred to herein as "the α pattern") with the pattern of parallel grooves rotated by an angle α' (illustrated in FIG. 4B; referred to herein as "the α' pattern") and the pattern of parallel grooves that is parallel to the x axis (illustrated in FIG. 4C; referred to herein as "the x axis pattern"). The gain (luminance enhancement on-axis) of the light transmitted through the composite three-array light recycling film 118 illustrated in FIG. 4D depends on the depth of the x axis pattern relative to the α pattern and the α' pattern. FIG. 7A is a plot of the gain as a function of the relative depth Δz of the x axis pattern relative to the α pattern and the α' pattern. This plot is for half angle ½(α-α') of 15° although the value of half angle ½(α-α') may be different in different embodiments.

In embodiments wherein the x axis pattern has the same depth as the α pattern and the α' pattern, that is when Δz=0, the structure and optical properties of the resulting composite light recycling film are identical to the composite light recycling film 118 illustrated in FIG. 4D. In embodiments wherein the x axis pattern is sufficiently deep, that is when Δz<<0, the α pattern and the α' pattern are effectively eliminated, and the structure and optical properties of the resulting composite light recycling film are identical to the light recycling film 22 illustrated in FIG. 2A. In embodiments wherein the α pattern and the α' pattern are sufficiently deep, that is when Δz>>0, the x axis pattern is effectively eliminated, and the structure and optical properties of the resulting composite light recycling film are identical to the composite light recycling film 116 illustrated in FIG. 3C.

FIG. 7A indicates that more light is coupled through a composite light recycling film in the case wherein the film is formed with the x axis pattern only, as compared to composite light recycling films having contributions from the α pattern and the α' pattern. More significantly, FIG. 7A indicates that the gain of the composite light recycling film 118 can be manipulated by adjusting the depth of the x axis pattern.

Figure 7B:
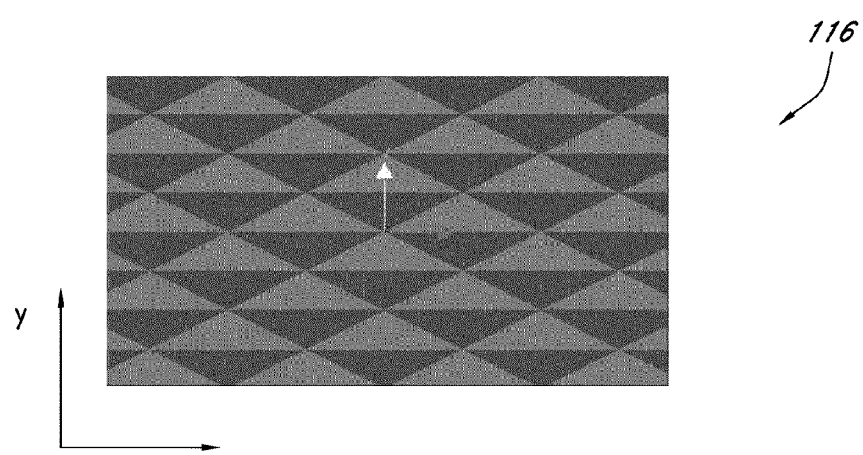
FIG. 7B is a top surface view (parallel to xy plane) of a composite light recycling film formed by combining the pattern of parallel grooves rotated by an angle α with the pattern of parallel grooves rotated by an angle α'.
Figure 7C:
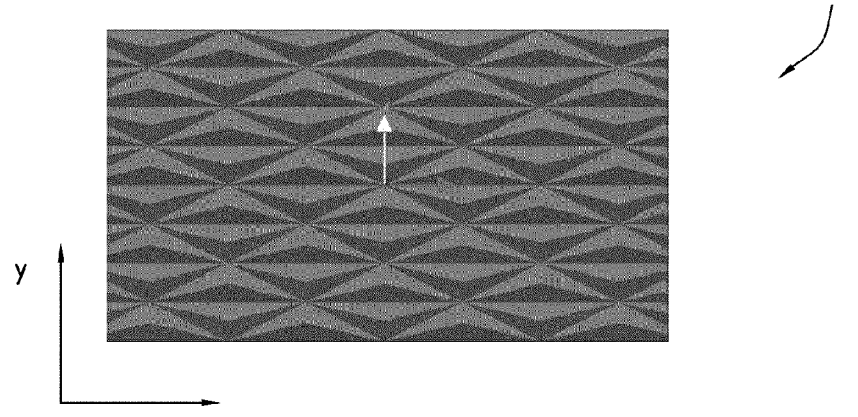
FIG. 7C is a top surface view (parallel to xy plane) of a composite light recycling film wherein a third set of grooves is added to the pattern of FIG. 7B; the third set of grooves are parallel to the x axis and have the same depth as the grooves of FIG. 7B, but are more closely spaced than the grooves of FIG. 7B.
Figure 7D:
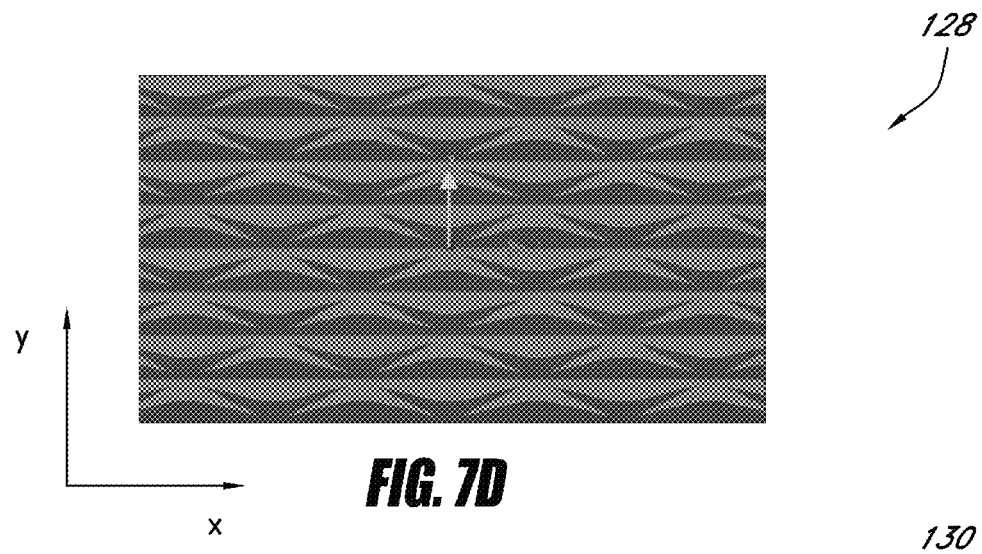
FIG. 7D is a top surface view (parallel to xy plane) of a composite light recycling film corresponding to data point 7D in FIG. 7A, wherein the grooves parallel to the x axis are deeper than the grooves rotated by the angle α and the grooves rotated by the angle α'.
Figure 7E:
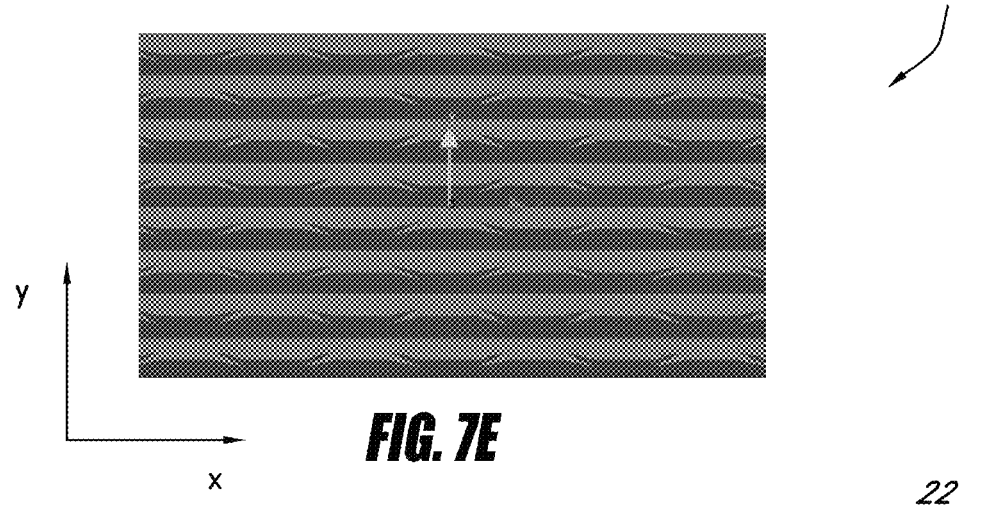
FIG. 7E is a top surface view (parallel to xy plane) of a composite light recycling film corresponding to data point 7E in FIG. 7A, wherein the grooves parallel to the x axis are deeper than the grooves rotated by the angle α and the grooves rotated by the angle α'.
Figure 7F:
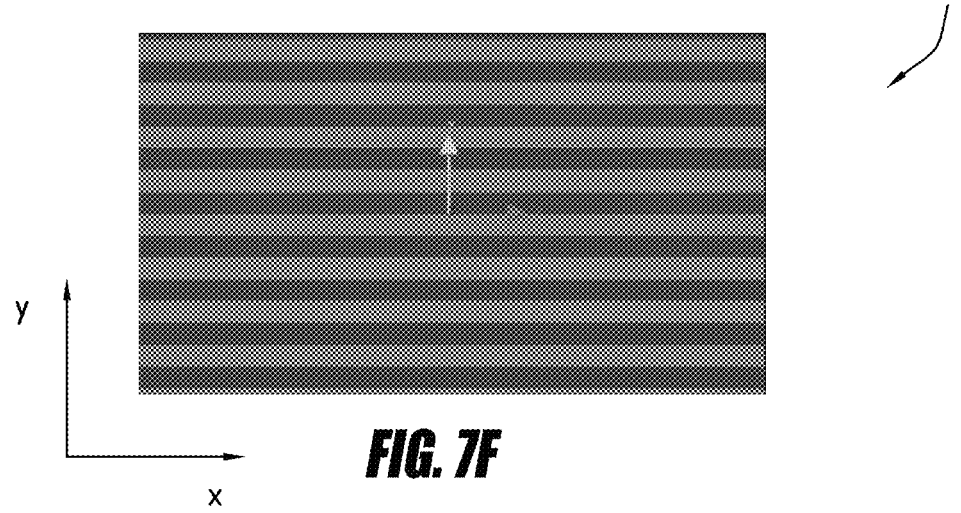
FIG. 7F is a top surface view (parallel to xy plane) of a light recycling film wherein the grooves parallel to the x axis are cut sufficiently deep to remove the grooves created by the grooves rotated by the angle α and the grooves rotated by the angle α'.

FIGS. 7B through 7F provide top surface views of composite light recycling films 116, 118, 128, 130, 22 corresponding to selected data points illustrated in FIG. 7A. In particular, FIG. 7B is a top surface view of a composite light recycling film 116 wherein the α pattern and the α' pattern are sufficiently deep so that the x axis pattern is effectively eliminated in the composite light recycling film 116. FIG. 7C is a top surface view of a composite light recycling film 118 wherein the x axis pattern has the same depth as the α pattern and the α' pattern, such that all three patterns are evident in the composite light recycling film 118. FIG. 7D is a top surface view of a composite light recycling film 128 corresponding to data point 7D in FIG. 7A, wherein the x axis pattern is deeper than the α pattern and the α' pattern, such that all three patterns are evident in the composite light recycling film 128. FIG. 7E is a top surface view of a composite light recycling film 130 corresponding to data point 7E in FIG. 7A, wherein the x axis pattern is deeper than the α pattern and the α' pattern, such that all three patterns are evident in the composite light recycling film 130. FIG. 7F is a top surface view of a light recycling film 22 wherein the x axis pattern is sufficiently deep so that the α pattern and the α' pattern are effectively eliminated in the light recycling film 22.

Figure 8A:
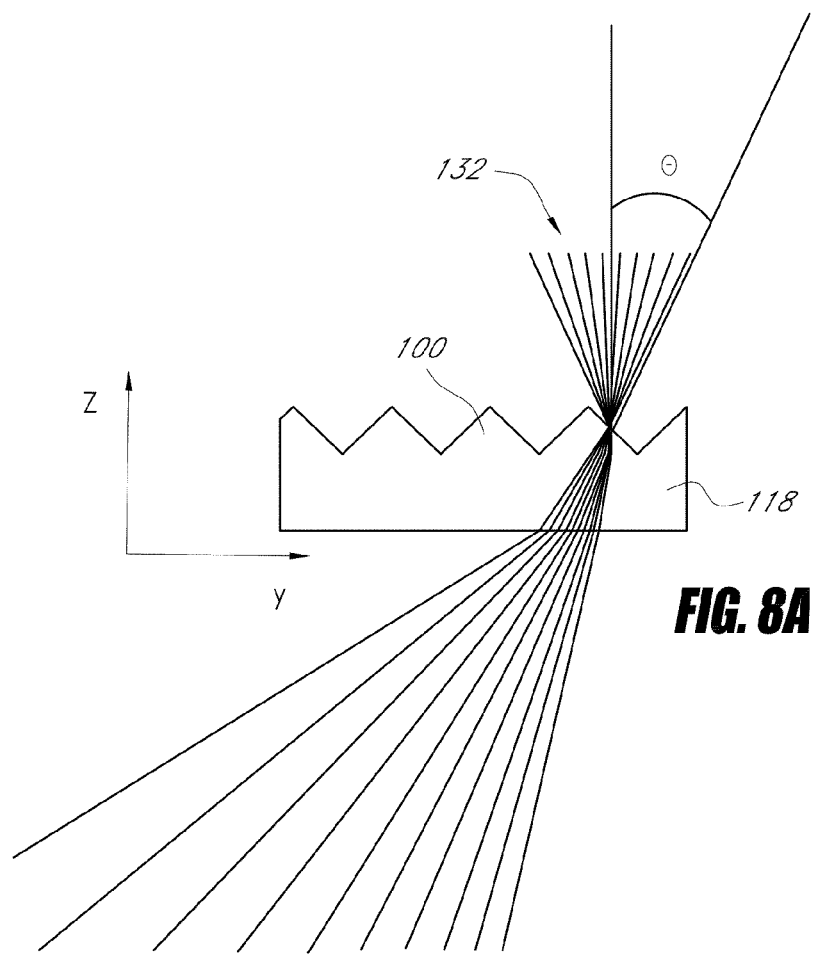
FIG. 8A is a cross-sectional view (parallel to yz plane) of a portion of the composite light recycling film similar to that illustrated in FIG. 4D, including back ray traces of light propagated through the film.
Figure 8B:
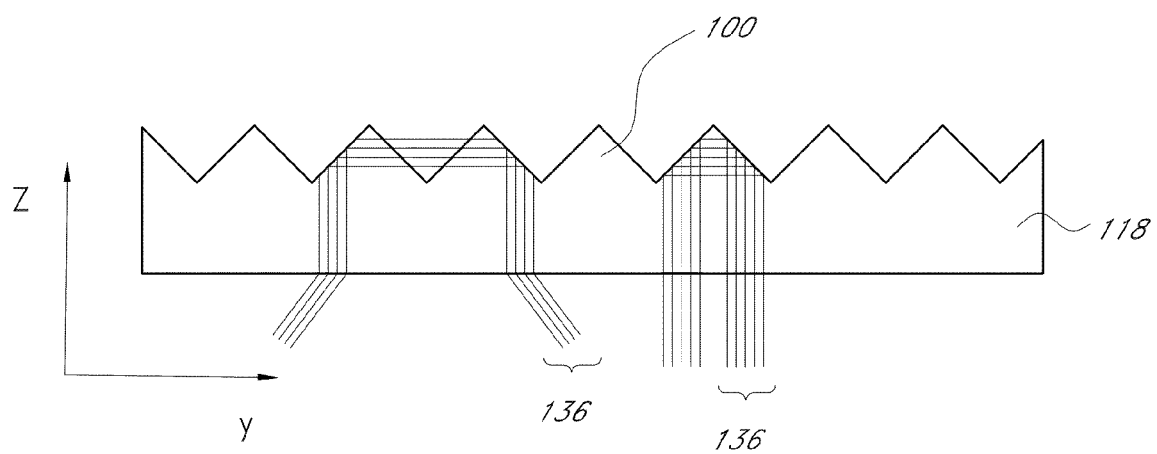
FIG. 8B is a cross-sectional view (parallel to yz plane) of a portion of the composite light recycling film similar to that illustrated in FIG. 4D, including forward ray traces of light reflected by the film.
Figure 8C:
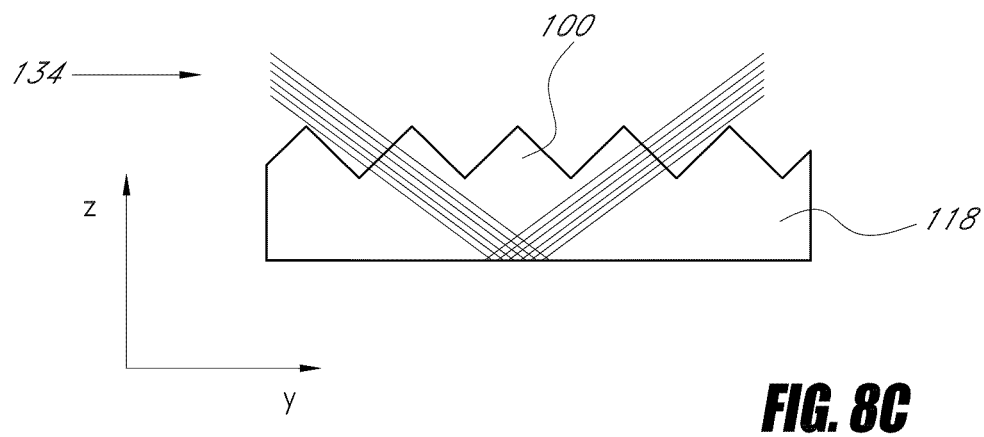
FIG. 8C is a cross-sectional view (parallel to yz plane) of a portion of the composite light recycling film similar to that illustrated in FIG. 4D, including back ray traces of light reflected by the film.

FIGS. 8A through 8C are schematic cross-sectional views (parallel to yz plane) of portions of the composite light recycling film 118 similar to the light recycling film illustrated in FIG. 4D. In the example embodiments illustrated in FIGS. 8A through 8C, $\alpha = +11.3°$ and $\alpha' = -\alpha$. FIGS. 8A through 8C illustrate a plurality of example ray traces that demonstrate how light incident on the light recycling film 118 is either transmitted through the composite light recycling film 118, or is reflected back towards the light guide 18. For example, in FIG. 8A, ray traces of light rays 132 indicate that the composite light recycling film 118 transmits light that exits the film within a range of angles $\pm\theta$. While selective rays traces are shown in FIG. 8A for illustrative purposes, other ray paths are possible.

In contrast, FIG. 8B illustrates ray traces of example light rays 136 that are not transmitted through the composite light recycling film 118, but that are instead reflected back toward the light guide 18. After being reflected to the light guide 18, the light rays 136 may scatter from an extractor and possibly be reflected by the rear reflector 16, thereby enabling them to return to the composite light recycling film 118 at a different incident angle. In embodiments wherein most or all of the light transmitted by the composite light recycling film 118 is transmitted within a range of angles $\pm\theta$, the transmitted light intensity pattern illustrated in FIG. 4F may result. As stated above, while selective rays traces are shown in FIG. 8A for illustrative purposes, other ray paths are possible.

In FIG. 8C, ray traces of light rays 134 indicate that the composite light recycling film 118 does not transmit light at certain angles. Accordingly, a viewer viewing the display 10 from such angles would not see features such as the extractor elements rearward of the light recycling film 118. As stated above, while selective rays traces are shown in FIG. 8A for illustrative purposes, other ray paths are possible.

Figure 8D:
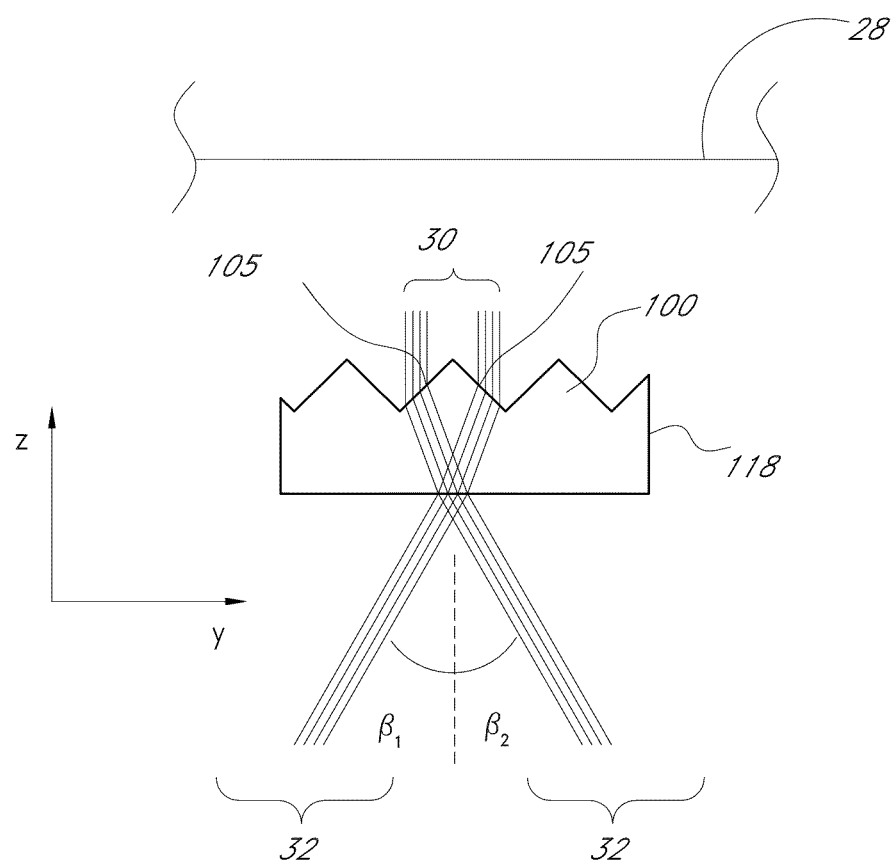
FIG. 8D is a cross-sectional view (parallel to yz plane) of a portion of the light recycling film of FIG. 4D, including back ray traces of light originating from a selected portion of a pixel of the spatial light modulator.

As described above, in various embodiments the spatial light modulator 24 is pixilated. In such embodiments, an individual pixel in the spatial light modulator 24 receives light from particular portions of the light guide 18. The portions of the light guide 18 that illuminate a particular pixel are determined by back tracing rays from the pixel, through the light recycling film 22 and to the light guide 18. FIG. 8D is a schematic cross-sectional view (parallel to yz plane) of a portion of the light recycling film 118, illustrating a plurality of collimated light rays 30 that have been traced from a selected pixel 28 of the spatial light modulator 24, through the light recycling film 118, and toward the light guide 18. As illustrated in FIG. 8D, the back ray traces of a cross-section through the light recycling film 118 for light originating from the pixel 28 are traced at two distinct angles $\beta_1$ and $\beta_2$ to two distinct spatial regions 32 of the light guide 18. Because the facets 105 are also tilted in the x axis (not visible in FIG. 8D), the number of distinct angles through which light is traced is greater than that illustrated in the yz plane of FIG. 8D. The relative area of the facets, as projected in the xy plane, will determine the relative magnitude of light at each of the distinct angles. More particularly, the projected area, the area projected onto a surface such as the front or rear surface of the light guide, determines this magnitude. In various embodiments, the total internal reflection structure comprises facets of substantially equal area so as to increase the uniformity of the illuminance of the display. In modified embodiments, curved facets, curved surface, and/or curved ridgelines may blur the distinct angles. When curved surfaces are used, these surfaces may have substantially similar projected area values so as to reduce non-uniformity in the illuminance of the display. Tuning the angles and the projected area of the different facets provides an ability to control the correlation between the light recycling film, the light guide extractor pattern, and the pixels in the spatial light modulator.

Figure 9A:
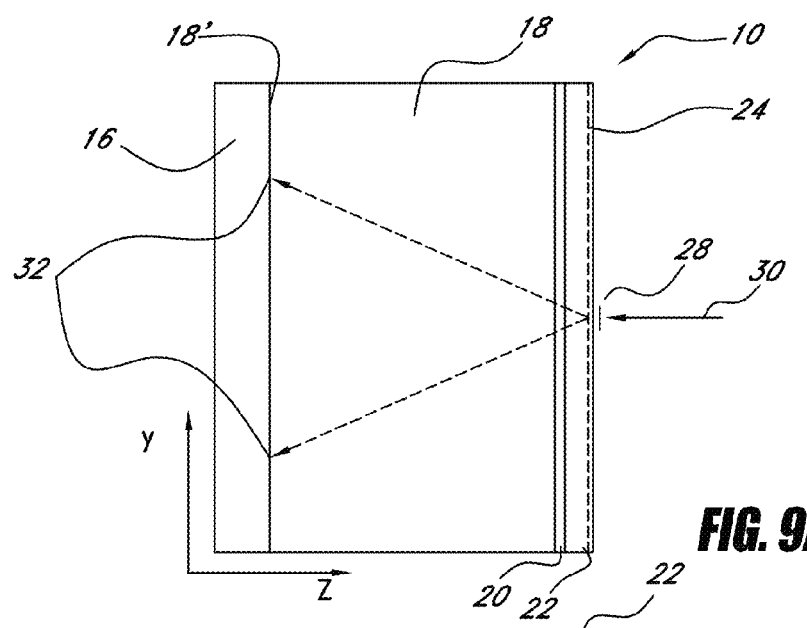
FIG. 9A is a cross-sectional view (parallel to yz plane) of the backlit display showing the back ray traces of FIG. 8D; the display includes (from left to right) a planar reflector, a light guide, a diffuser, and a light recycling film.
Figure 9B:
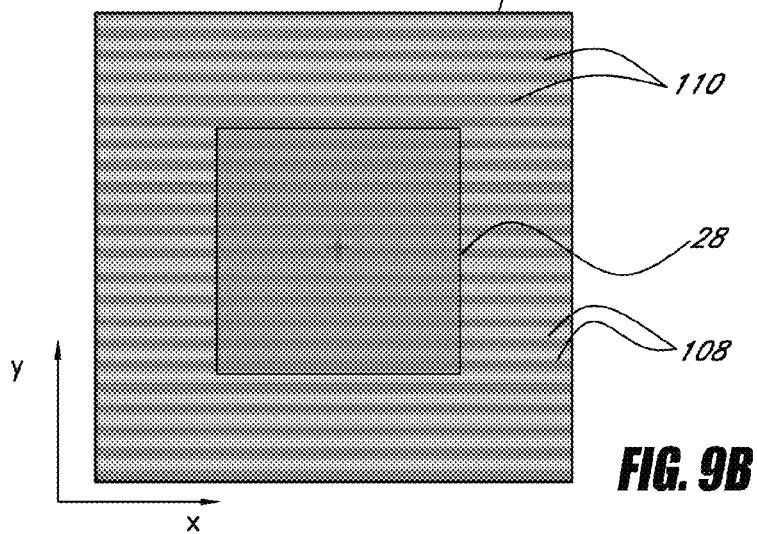
FIG. 9B is a top surface view (parallel to xy plane) of an example light recycling film, showing the relative dimensions of the pattern of parallel ridges and grooves and a selected pixel of the spatial light modulator.
Figure 9C:
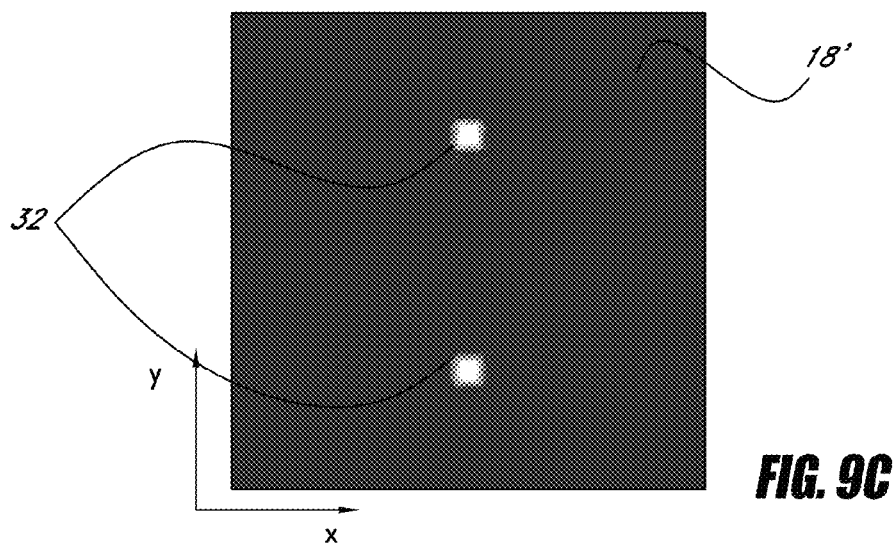
FIG. 9C is a plot of the illuminance of the light projected onto the rear surface of the light guide by the collimated light rays illustrated in FIG. 9A.
Figure 9D:
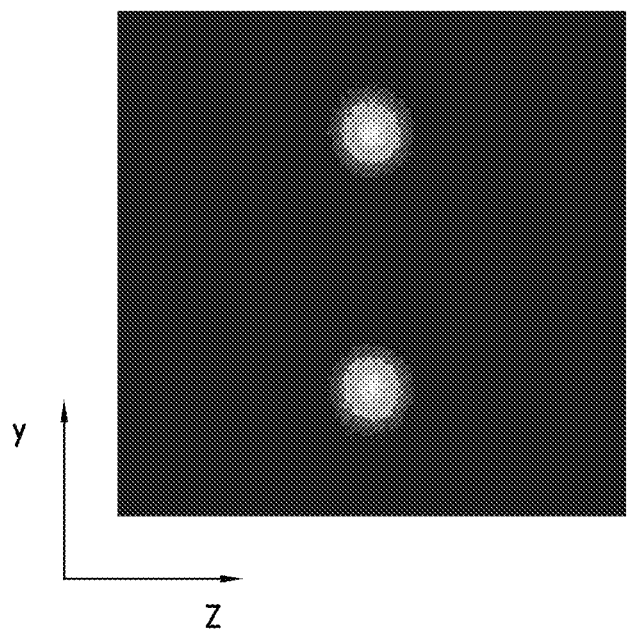
FIG. 9D is a plot of the illuminance of light projected onto the rear surface of the light guide by the collimated light rays illustrated in FIG. 9A when a 3° diffuser is included in the backlit display.

FIG. 9A is a schematic cross-sectional view (parallel to yz plane) of the backlit display 10 illustrating the ray traces shown in FIG. 8D. As expounded herein, the back ray traces of light originating from the pixel 28 are traced to two distinct spatial regions 32 on the rear surface 18' of the light guide 18. FIG. 9B schematically illustrates the relative size of the pixel 28 and the array of parallel ridges 108 and grooves 110 comprising the light recycling film 22 in an example embodiment. As illustrated, the dimensions of the pixel 28 are significantly larger than the dimensions of the ridges 108 and grooves 110 parallel to the y axis. FIG. 9C is a plot of the illuminance of light projected onto the rear surface 18' of the light guide 18, illustrating the two spatial regions 32 which are illuminated by the back traced collimated light rays 30. In modified embodiments, the area of the two spatial regions is increased by including a diffuser 20 in the backlit display 10. FIG. 9D is a plot of the illuminance of light projected onto the rear surface 18' of the light guide 18 when a 3° Gaussian diffuser is included in the backlit display 10. The shape of the Gaussian scatter distribution, Scatter(η), is defined by $$\text{Scatter}(\eta) \propto \exp\left(-\frac{1}{2}\left(\frac{\eta^2}{\sigma^2}\right)\right),$$

where η is the scatter angle measured with respect to the specular direction.

Figure 9E:
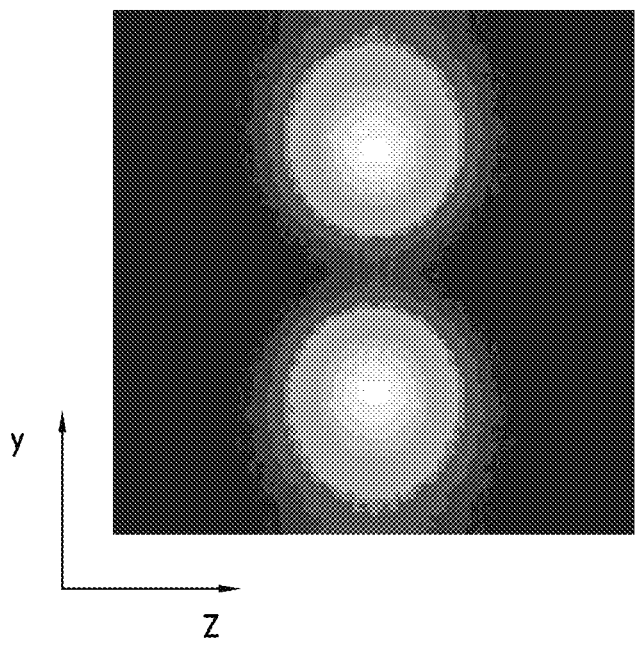
FIG. 9E is a plot of the illuminance of light projected onto the rear surface of the light guide by the collimated light rays illustrated in FIG. 9A when 10° diffuser is included in the backlit display.

FIG. 9E is a plot of the illuminance of light projected onto the rear surface 18' of the light guide 18 when a 10° diffuser is included in the backlit display 10. In modified embodiments, the diffuser 20 is optionally incorporated into the light recycling film 22, such as by applying the diffuser 20 to the light recycling film first surface 104 or second surface 106, or by incorporating scattering materials within the film to form volume diffusing features. The scatter produced by the diffuser can be asymmetric with more or less scatter along the axis of the ridges and grooves than along the axis perpendicular to the ridges and grooves. In certain embodiments, the light recycling film first surface 104 and/or second surface 106 are provided with a roughened surface. The roughened surface can be achieved by subjecting the light recycling film to a surface treatment, such as sanding. The roughened surface can also be achieved by cutting the ridges 108 and grooves 110 using a modified cutting tool, such as cutting tool with a diamond microstructure on the cutting edge. In still other embodiments, the roughened surface is achieved by cutting the ridges 108 and the grooves 110 using a modified cutting technique that produces a greater surface roughness, such as a laser cutting technique. Surface roughness can be added to individual light recycling films or to a master die or mold used to form individual light recycling films.

Figure 10A:
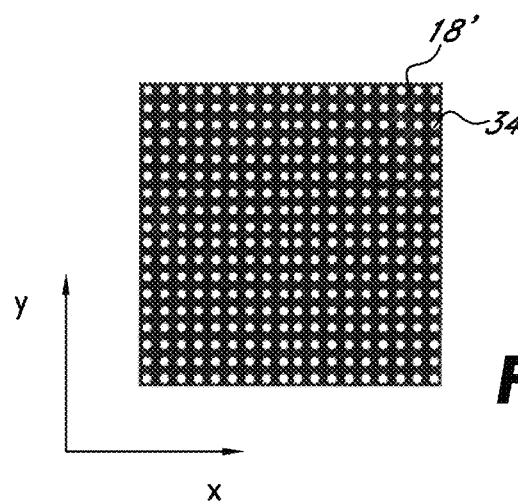
FIG. 10A is an example array of extraction elements formed on a rear surface of the light guide included in the display.

As described herein, in various embodiments, at least one surface of the light guide 18 includes a plurality of extraction elements that are configured to allow a portion of the light propagating in the light guide 18 to be coupled from the light guide 18. In one embodiment, the extraction elements comprise an array of raised or recessed features such as bumps or dimples formed on the rear surface 18' of the light guide 18. FIG. 10A schematically illustrates an example embodiment of an example array of extraction elements 34. By projecting the two illuminated spatial regions 32 onto the array of extraction elements 34 it is possible to determine which extraction elements contribute to the illumination of the selected pixel 28.

Figure 10B:
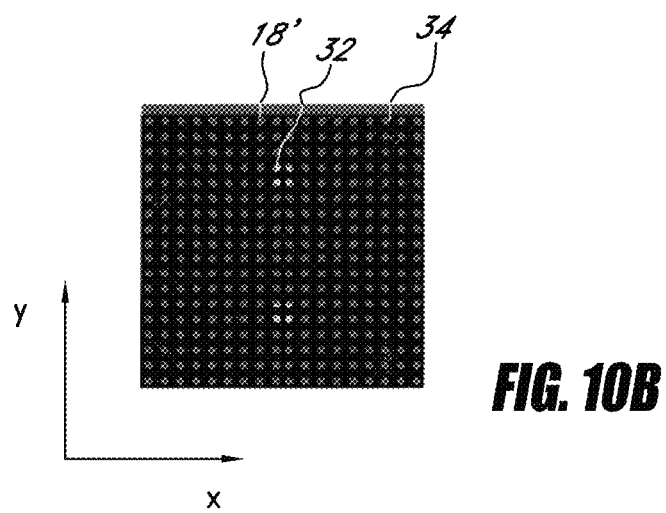
FIG. 10B is a projection of the illuminated spatial regions of FIG. 9B onto the array of extraction elements of FIG. 10A, wherein the projection results in an under-illuminated pixel.
Figure 10C:
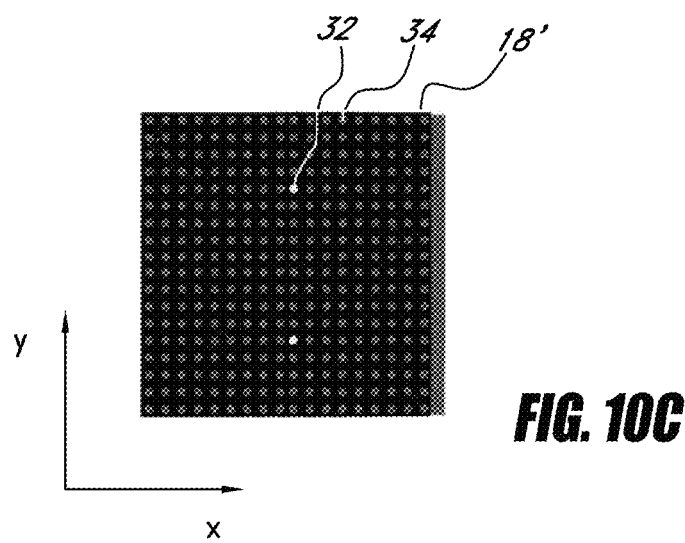
FIG. 10C is a projection of the illuminated spatial regions of FIG. 9B onto a translated array of extraction elements, wherein the projection results in an over-illuminated pixel.

FIG. 10B schematically illustrates the projection of the illuminated spatial regions 32 (illustrated in FIG. 9B) onto the array of extraction elements 34 (illustrated in FIG. 10A). In certain embodiments, the illumination of the selected pixel 28 depends on how the extraction elements 34 are aligned with the illuminated spatial regions 32 that correspond to the selected pixel 28. For example, in the projection illustrated in FIG. 10B, the selected pixel 28 will be relatively under-illuminated because the extraction elements 34 are not well-aligned with the illuminated spatial regions 32 corresponding to the selected pixel 28. In contrast, FIG. 10C schematically illustrates the effect of translating the array of extraction elements 34, such that the extraction elements 34 are well-aligned with the illuminated spatial regions 32. Specifically, in the projection illustrated in FIG. 10C, the selected pixel 28 is relatively over-illuminated because the extraction elements 34 are well-aligned with the illuminated spatial regions 32 corresponding to the selected pixel 28.

Figure 11A:
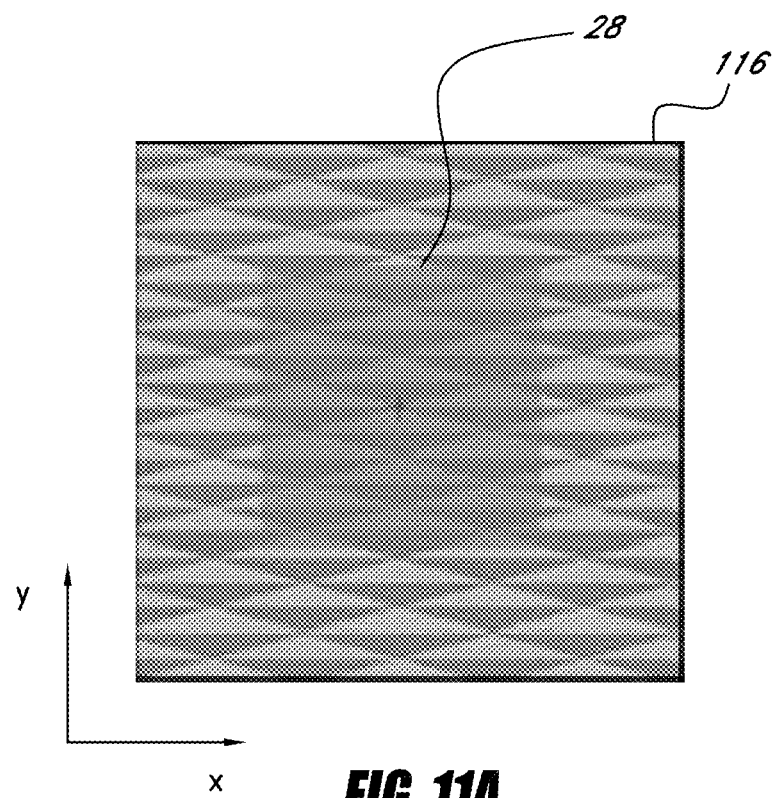
FIG. 11A illustrates the projection of a selected pixel onto the composite light recycling film of FIG. 3C.
Figure 11B:
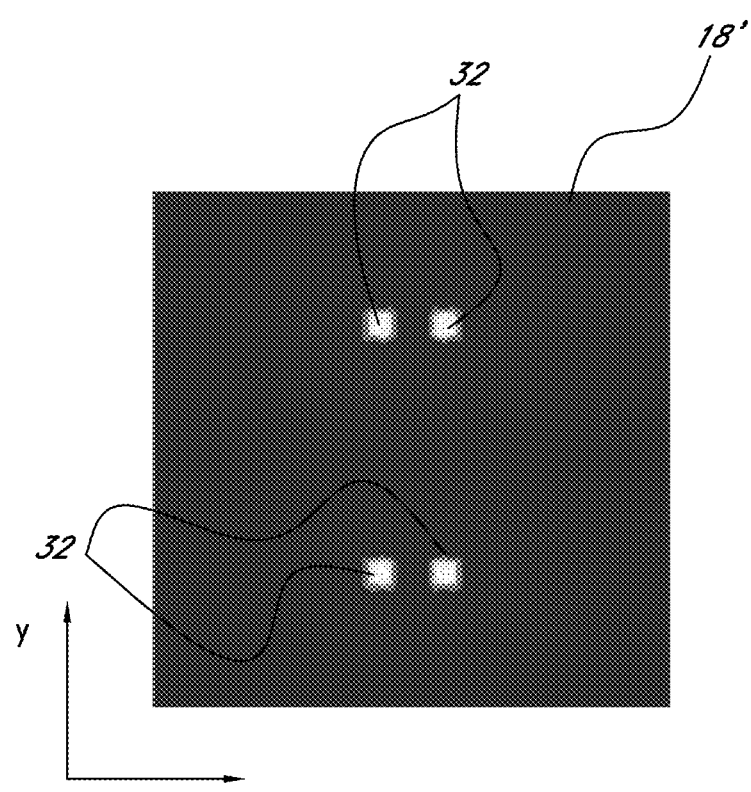
FIG. 11B is a plot of the illuminance of light projected onto the rear surface of the light guide when the collimated light rays such as illustrated in FIG. 9A are transmitted through the composite light recycling film of FIG. 3C.

The projection illustrated in FIG. 9C of the selected pixel 28 on the rear surface 18' of the light guide 18 was obtained using the light recycling film 22 illustrated in FIG. 2A. This projection is modified when the light recycling film 22 is replaced with a composite light recycling film comprising a plurality of arrays of parallel ridges 108 and grooves 110. FIG. 11A, for example, schematically illustrates a composite light recycling film 116 comprising two-arrays such as illustrated in FIG. 3C. FIG. 11A also shows a projection of the pixel 28 over the pattern of grooves 110 that comprise the composite light recycling film 116. As described herein, composite light recycling film 116 is formed by combining the pattern of parallel grooves 110 rotated by an angle α (FIG. 3A) with the pattern of parallel grooves rotated by an angle α' (FIG. 3B). FIG. 11B is a plot of the illuminance of light projected onto the rear surface 18' of the light guide 18 when the backlit display 10 includes the composite light recycling film 116 illustrated in FIGS. 3C and 11A. As illustrated, the modified projection includes four illuminated spatial regions 32, instead of the two illumined spatial regions obtained when the light recycling film 22 comprising a single array of parallel ridges 108 and groove 110 was used.

As another example, FIG. 12A schematically shows a composite light recycling film 118 comprising three arrays of parallel grooves 110 such as illustrated in FIG. 4D. FIG. 12A also shows the projection of the pixel 28 over the pattern of grooves 110 that comprise the composite light recycling film 118. As described above, this composite light recycling film 118 is formed by combining the array of parallel grooves oriented at an angle α, referred to above as the a pattern, (FIG. 4A) with the array of parallel grooves oriented at an angle α', referred to above as the α' pattern, (FIG. 4B) and the array of grooves parallel to the x axis, referred to above as the x axis pattern, (FIG. 4C). FIG. 12B is a plot of the illuminance of light projected onto the rear surface 18' of the light guide 18 when the backlit display 10 includes the composite light recycling film 118 illustrated in FIGS. 4D and 12A. As illustrated, the modified projection includes six illuminated spatial regions 32. The six illuminated spatial regions correspond to the six facets 105 illustrated in FIGS. 4D and 4E. In general, a composite light recycling film having n facets per array period will project 2n illuminated spatial regions onto the rear surface of the light guide when rays are back-traced through the composite light recycling film.

As described herein, the gain of the light transmitted through the composite light recycling film 118 depends on the depth of the x axis pattern relative to the a pattern and the α' pattern. As a result of this effect, the relative magnitude of the illuminated spatial regions 32 is controllable by adjusting the relative depth $\Delta z$ of the x axis pattern relative to the a pattern and the α' pattern. FIG. 12C, for example, schematically illustrates the pattern of ridges and grooves that comprise a composite light recycling film 138 wherein the relative depth $\Delta z=+0.005$. FIG. 12C, also shows the projection of the pixel 28 over this composite light recycling film 138. FIG. 12D is a plot of the illuminance of light projected onto the rear surface 18' of the light guide 18 when the backlit display 10 includes the composite light recycling film 138 illustrated in FIG. 12C. As illustrated, the relative magnitude of the individual illuminated spatial regions 32 has been modified as compared to the embodiment illustrated in FIGS. 12A and 12B, wherein $\Delta z=0$. Tuning $\Delta z$ changes the relative projected are of the facets in the light recycling film, as described herein.

Figure 13A:
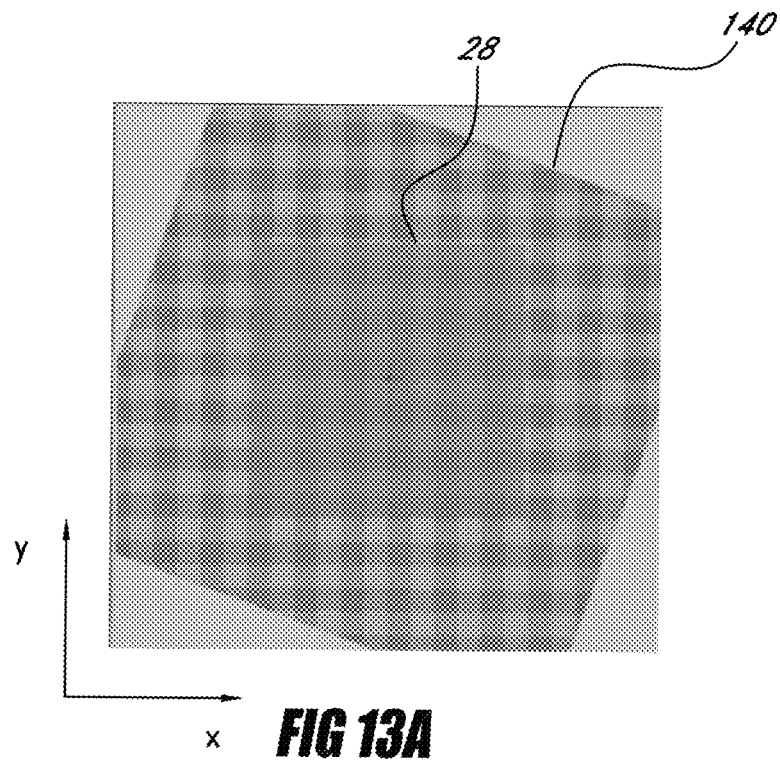
FIG. 13A illustrates the projection of a selected pixel onto two crossed light recycling films like the light recycling film of FIG. 2A.

In certain embodiments, the backlit display 10 includes a "crossed" light recycling film formed by overlaying two light recycling films at a right angle to each other. For example, FIG. 13A schematically illustrates crossed light recycling films 140 formed by overlaying a light recycling film 22 having grooves and ridges parallel to the x axis with a light recycling film 22 having grooves and ridges parallel to the y axis. FIG. 13A also shows the projection of the pixel 28 over the crossed light recycling films 140.

Figure 13B:
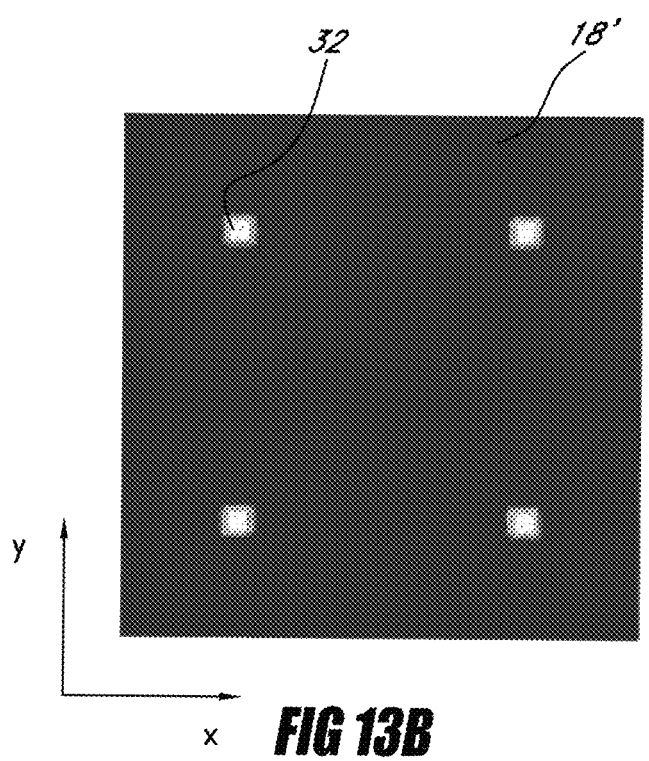
FIG. 13B is a plot of the intensity of light projected onto the rear surface of the light guide when the collimated light rays such as illustrated in FIG. 9A are transmitted through the crossed light recycling films of FIG. 13A.

FIG. 13B is a plot of the illuminance of light projected onto the rear surface 18' of the light guide 18 when the backlit display 10 includes the crossed light recycling films 140 illustrated in FIG. 13A. As illustrated, there are four illuminated spatial regions 32 on the rear surface 18'. This distribution is in contrast to the two illuminated spatial regions 32 generated when light is projected through individual (uncrossed) light recycling films, as illustrated in FIG. 9C. Generally, in some embodiments, if light projected through a selected light recycling film generates n illuminated spatial regions 32 on the rear surface 18', then light projected through crossed light recycling films comprising two orthogonal selected light recycling films will generate $n^2$ illuminated spatial regions 32 on the rear surface 18'.

Figure 14A:
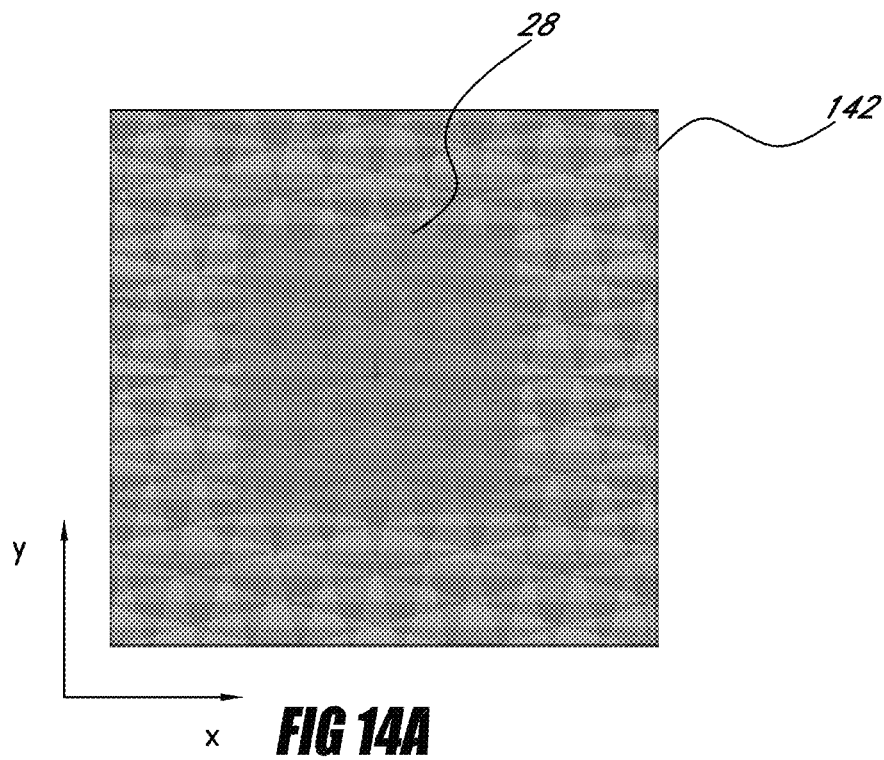
FIG. 14A illustrates the projection of a selected pixel onto two crossed light recycling films like the composite light recycling film of FIG. 3C.
Figure 14B:
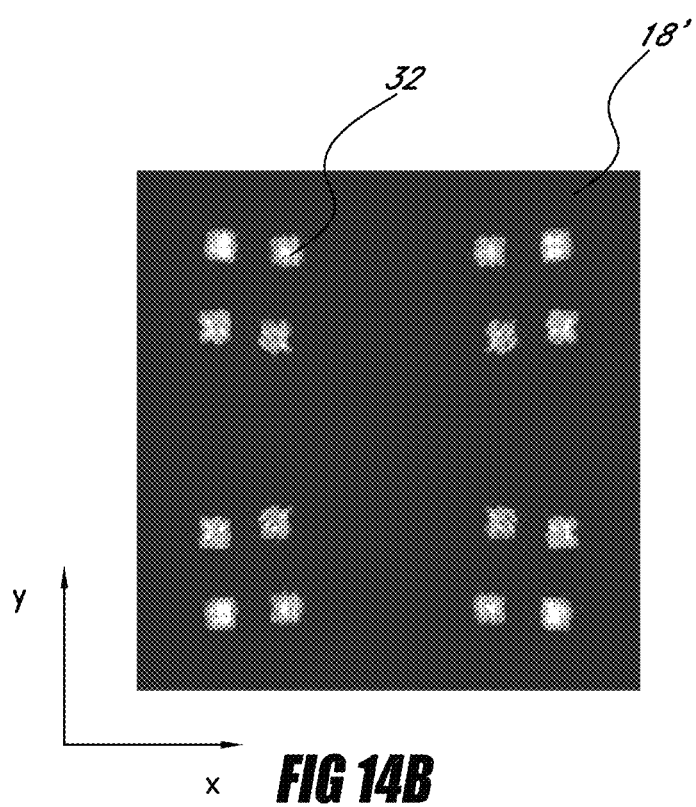
FIG. 14B is a plot of the intensity of light projected onto the rear surface of the light guide when the collimated light rays such as illustrated in FIG. 9A are transmitted through the crossed light recycling films of FIG. 14A.

As another example, FIG. 14A schematically illustrates crossed light recycling films 142 formed by overlaying two of the two-arrayed composite light recycling films 116 illustrated in FIG. 3C orthogonal to one another. As described herein, the composite two-array light recycling film 116 shown in FIG. 3C is formed by combining the pattern of parallel grooves rotated by an angle α (FIG. 3A) with the pattern of parallel grooves rotated by an angle α' (FIG. 3B). FIG. 14A also illustrates the projection of the pixel 28 over the crossed light recycling film 142. FIG. 14B is a plot of the illuminance of light projected onto the rear surface 18' of the light guide 18 when the backlit display 10 includes the crossed light recycling film 142. As explained above, and as illustrated in FIG. 11B, projecting light from the pixel 28 through a two-array composite light recycling film 116 generates four illuminated spatial regions 32 on the rear surface 18'. Therefore, projecting light through the crossed two-array light recycling films 142 generates $4^2=16$ illuminated spatial regions 32 on the rear surface 18', as illustrated in FIG. 14B.

As another example, FIG. 15A schematically illustrates crossed light recycling films 144 formed by overlaying two of the three-array composite light recycling films 118 illustrated in FIG. 4D orthogonally. As described herein, the three-array composite light recycling film 118 shown in FIG. 4D is formed by combining the α pattern (FIG. 4A) with the α' pattern (FIG. 4B) and the x axis pattern (FIG. 4C). FIG. 15A also shows the projection of the pixel 28 over the crossed light recycling film 144. FIG. 15B is a plot of the illuminance of light projected onto the rear surface 18' of the light guide 18 when the backlit display 10 includes the crossed light recycling films 144. As explained above, and as illustrated in FIG. 12B, projecting light from the pixel 28 through a three-array composite light recycling film 118 generates six illuminated spatial regions 32 on the rear surface 18'. Therefore, projecting light through the crossed light recycling films 144 generates $6^2=36$ illuminated spatial regions 32 on the rear surface 18', as illustrated in FIG. 15B.

FIG. 15C illustrates crossed light recycling films 146 formed by overlaying two of the three-array composite light recycling films 138 illustrated in FIG. 12C orthogonally. As described herein, the three-array composite light recycling film 138 shown in FIG. 12C is formed by combining the α pattern with the α' pattern and the x axis pattern, wherein the relative depth Δz of the x axis pattern relative to the α pattern and the α' pattern is +0.005. FIG. 15C also shows the projection of the pixel 28 over the crossed three-array light recycling films 146. FIG. 15D is a plot of the illuminance of light projected onto the rear surface 18' of the light guide 18 when the backlit display 10 includes the composite light recycling films 146 illustrated in FIG. 15C. As illustrated, the relative magnitude of the individual illuminated spatial regions 32 has been modified as compared to the embodiment illustrated in FIGS. 15A and 15B, wherein Δz=0.

Although identical recycling films are crossed in the examples described above, the two constituent light recycling films that are crossed need not be identical. For example, in a modified embodiment the composite light recycling film 116 illustrated in FIG. 3C (two arrays) is crossed with the composite light recycling film 118 illustrated in FIG. 4D (three arrays). In another modified embodiment, the composite light recycling film 118 illustrated in FIG. 4D (three arrays) is crossed with the composite light recycling film 126 illustrated in FIG. 6E (four arrays). Other combinations are used in other embodiments. Additionally, more than two arrays may be crossed. Similarly, in certain modified embodiments the crossed light recycling films are crossed at an angle that is less than or greater than 90°.

In modified embodiments, certain of the light recycling films disclosed herein are sequentially positioned in the backlit display 10. For example, FIG. 19A illustrates the light recycling film 22 (of FIG. 2A, the x axis pattern) positioned over the modified light recycling film 112 (of FIG. 3A, the α pattern), which is positioned over the modified light recycling film 114 (of FIG. 3B, the α' pattern). In other embodiments, these three light recycling films are sequentially positioned in a different order. The embodiment illustrated in FIG. 19A is different from the embodiment illustrated in FIG. 4D, which illustrates the same three light recycling films combined onto a single composite light recycling film 118.

Specifically, when a plurality of light recycling films are positioned sequentially, as illustrated in FIG. 19A, the resulting structure operates differently than a composite light recycling film, such as the composite light recycling film 118 illustrated in FIG. 4D. In particular, the sequentially-positioned light recycling films cause light to circulate in the region or regions between the films. For example, in the embodiment illustrated in FIG. 19A, light circulates in a region between the light recycling film 22 and the modified light recycling film 112, as well as in a region between the modified light recycling film 112 and the modified light recycling film 114. In contrast, there is no "inter-film" light circulation in the single film embodiment illustrated in FIG. 4D.

Because the sequentially-positioned light recycling films illustrated in FIG. 19A operate differently, the resulting spatial intensity of light transmitted by the films is modified as compared to the single composite light recycling film. FIG. 19B is a plot of intensity versus angle in the vertical and horizontal directions (parallel to the x and y axes, respectively) of the transmitted light distribution for the three sequentially-positioned light recycling films illustrated in FIG. 19A. As illustrated, this distribution pattern is different from that shown in FIG. 4F, which corresponds to the single composite light recycling film 118.

FIG. 19C is a histogram of the luminous intensity (measured in candela) for the spatial intensity plot of FIG. 19B. This histogram illustrates that the luminous intensity of the transmitted light field is not evenly distributed across a wide range of luminous intensities. In particular, FIG. 19C shows that more light having a relatively lower intensity is transmitted (indicated by bulge 90), as compared to light having a relatively higher intensity (indicated by recessed region 92). This intensity distribution illustrated in FIG. 19C should be contrasted with the corresponding distribution for the composite light recycling film 118, illustrated in FIG. 4H, which illustrates that the composite light recycling film 118 produces a substantially more evenly distributed intensity distribution.

In certain embodiments, a composite light recycling film is formed that includes the patterns of two or more recycling films that are crossed with respect to each other. Such composite light recycling films may resemble, for example, the crossed light recycling films in FIGS. 13A, 14A, 15A, and 15C. Other patterns may be used as well.

The various embodiments described herein allow the light illuminating the selected pixel 28 to be "collected" from a larger area of the light guide 18, and possibly from a larger number of extraction elements 34. As described above and illustrated in FIGS. 10B and 10C, collecting light for a pixel from a small number of extraction elements 34 causes under-illumination of some pixels and over-illumination of other pixels. When more extractors contribute light to each of the pixels, the different pixels in the spatial light modulator are more uniformly illuminated as a consequence. Other Moiré effects are also attenuated as well. In particular, Moiré effects may be generated or enhanced when periodic illumination patterns are produced at the spatial light modulator, which comprises a periodic array of pixels. Such periodic illumination patterns may result from under-illumination of some pixels and over-illumination of other pixels. Causing the array of pixels to be more uniformly illuminated reduces the periodicity in the illumination pattern that contributes to the Moiré effect.

While a diffuser can also be used to reduce Moiré effects, use of diffusers, and especially high angle diffusers, can disadvantageously reduce the luminance of light transmitted through the backlit display 10 at usable angles. Therefore, employing the techniques disclosed herein to collect light from a larger number of extraction elements allow the diffuser to be eliminated, or allow a lower-angle diffuser to be used, thereby increasing the luminance at the most desirable angles.

Figures 16A, 16B:
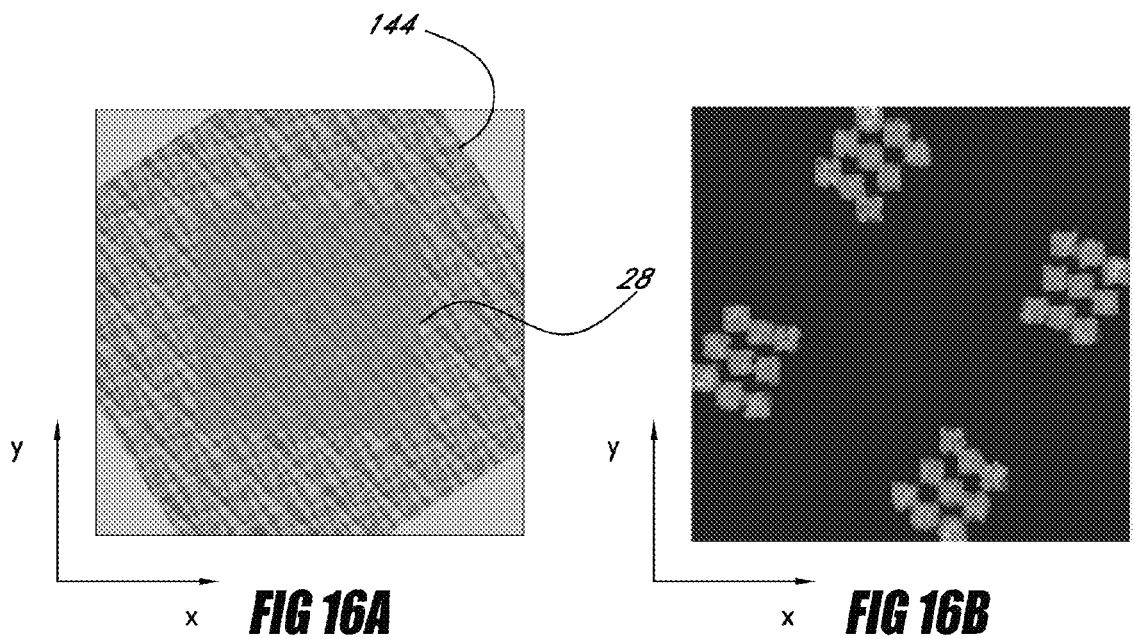
FIG. 16A illustrates the projection of a selected pixel onto two crossed light recycling films like the composite light recycling film of FIG. 4D, wherein the pixel and the films are rotated with respect to each other.
FIG. 16B is a plot of the intensity of light projected onto the rear surface of the light guide when the collimated light rays such as illustrated in FIG. 9A are transmitted through the crossed light recycling films of FIG. 16A.
Figure 16C:
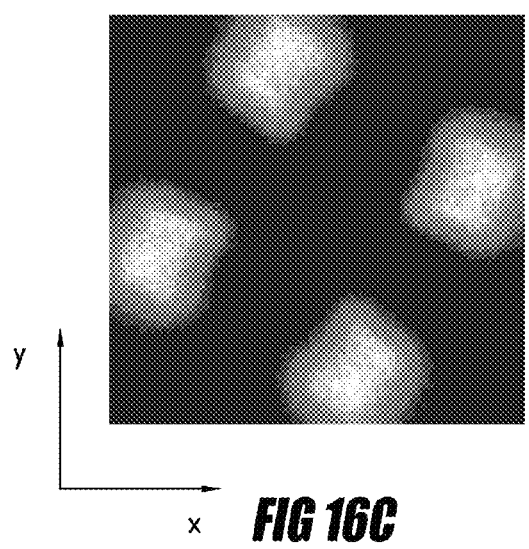
FIG. 16C is a plot of the intensity of light projected onto the rear surface of the light guide when the collimated light rays such as illustrated in FIG. 9A are transmitted through a diffuser and the crossed light recycling films of FIG. 16A.

Another technique for collecting light from a larger number of extraction elements 34, thereby providing more uniform illumination and reducing Moiré effects, is to rotate the light recycling film with respect to the selected pixel 28 and the array of extractor elements. For example, FIG. 16A schematically illustrates the projection of the selected pixel 28 on the crossed three-array light recycling films 144, wherein the pixel and the films have been rotated with respect to each other. When light is projected through the rotated and crossed light recycling films 144 onto the rear surface 18' of the light guide 18, the resulting pattern of illuminated spatial regions 32 is rotated, as illustrated in FIG. 16B. The rotated pattern illustrated in FIG. 16B advantageously reduces the correlation between the illuminated spatial regions 32 and the pattern of extraction elements 34. If the extraction elements 34 are arranged in a linear grid pattern, then increased Moiré effects can disadvantageously occur if the illuminated spatial regions 32 are well-aligned with the pattern of extraction elements 34. The number of extraction elements 34 from which light is drawn is further increased by including a diffuser 20 in the backlit display 10, as illustrated in FIG. 16C.

As described above, by increasing the spatial area of the portion of the light guide from which light is extracted to illuminate a selected pixel, more uniform illumination can be provided at the spatial light modulator and Moiré effects are reduced. In an embodiment wherein the extraction elements are arranged in a rectangular grid, such as illustrated in FIG. 10A, the illumination patterns of FIGS. 16B and 16C advantageously draw light from every row and every column of extraction elements. This advantageously provides another degree of freedom to reduce Moiré effects. By illuminating a greater number of extraction elements, correlation between the illuminated spatial regions and the pattern of extraction elements is reduced. Specifically, by drawing light from a larger number of extraction elements, and from extraction elements that are more spatially distributed, the spatial variance in the extracted light is less pronounced. Rotating further reduces the correlations with extractors that are placed on a grid pattern. A similar effect can be achieved by rotating the array of extraction elements with respect to the light recycling film.

As described above, the light recycling films may be disposed between the light guide and the spatial light modulator to control the field-of-view of the display and provide luminance enhancement within that field-of-view. Additionally, the light recycling films described herein can increase the uniformity of illumination of the display and reduce Moiré effects.

In other embodiments, the light recycling films can be disposed between the light source and the light guide to provide mixing of the light source. For example, light sources that generate substantially monochromatic light at one or more selected wavelengths, such as RGB LED arrays, generally can benefit from mixing to produce white light or colors formed by combinations the monochromatic light, for example, red, green, or blue. Because certain of the light recycling films disclosed herein collect light from a variety of locations and direct this light into a localized area (for example, a pixel), these light recycling films advantageously provide the additional mixing required when a plurality of separate monochromatic light emitters are used. The light recycling of the light recycling film may add to this mixing process.

Figure 17:
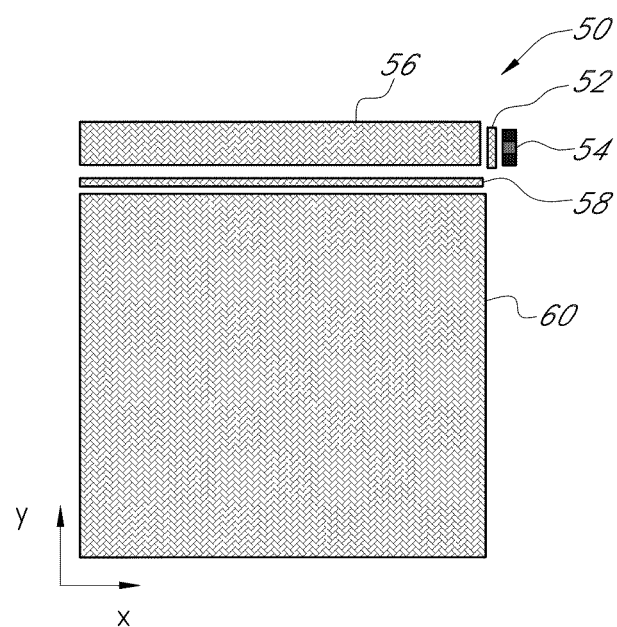
FIG. 17 is a schematic illustration of selected components of a color backlit display that includes multiple light recycling films.

FIG. 17 illustrates selected components of a color backlit display 50, wherein a first light recycling film 52, such as one or more of the light recycling films disclosed herein, including the composite light recycling films and crossed light recycling films described above, is positioned between a light source 54 having a plurality of monochromatic elements and a light rod 56. In such embodiments, a second light recycling film 58, such as one or more of the light recycling films disclosed herein, including the composite light recycling films and crossed light recycling films described above, is positioned between the light rod 56 and a planar light guide 60. Other components may be placed above the planar light guide 60 (in the +z dimension). Such optional components may include other light recycling films, optional diffusers, and spatial light modulators; these components, however, are omitted from FIG. 17 for clarity.

The color backlit display 50 illustrated in FIG. 17 advantageously provides enhanced mixing of the colors generated by the light source 54 comprising a plurality of monochromatic light emitters. The first light recycling film 52 causes each location on the end of the light rod 56 to receive light from a plurality of separated sites on the light source 54. These sites may include, for example, different dies in an RGB LED array. Similarly, the second light recycling film 58 causes each location on the edge of the light guide 60 to receive light from a plurality of separated sites on the edge of light rod 56. More extensive color mixing is thereby provided. For example, in embodiments wherein individual rows of extractor elements correspond to different color emitters, certain of the light recycling films disclosed herein will advantageously and substantially increase the number of colors supplied to an individual pixel in the spatial light modulator.

More or less light recycling films may be included in other embodiments. For example, in alternative embodiments, only one of the first and second light recycling films 52, 58 may be included. Also, the light rod 56 may be excluded in certain embodiments.

In one example embodiment, an array of light sources is disposed at an edge of the light guide. A light recycling film disposed between the array of light sources and the light guide causes mixing of the light directed into the light guide. In the case where the array of light sources comprises an array of different color light emitters, the light recycling film provides color mixing. Additional elements may be included in the display and the configuration may vary.

Figure 18:
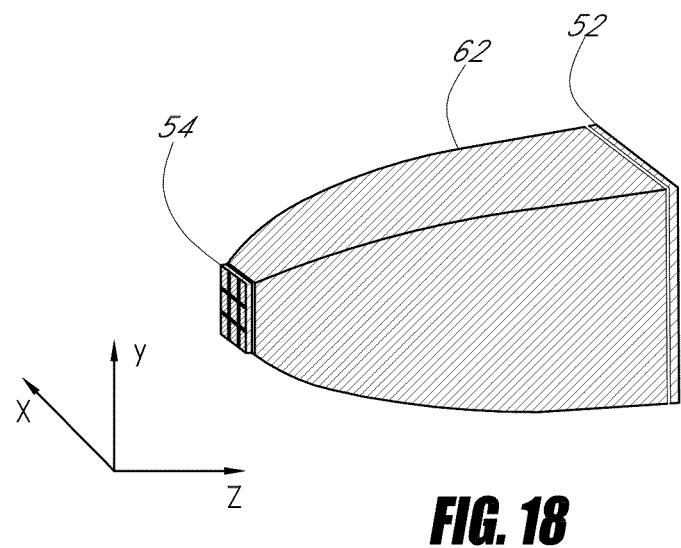
FIG. 18 is a perspective view of selected components of a color backlit display that includes a compound parabolic collector configured to couple light from a light source into a light recycling film.

In another embodiment, for example, a compound parabolic type collector is used to couple light from the array of light sources 54 to the first light recycling film 52. FIG. 18 illustrates an example embodiment of selected components of a color backlit display 50 that includes an array of colored light sources 54 that is configured to couple light into a compound parabolic collector 62. The compound parabolic type collector 62 is configured to efficiently distribute light to a first light recycling film 52, such as one or more of the light recycling films described herein, including but not limited to the composite light recycling films and crossed light recycling films described above. In an example embodiment, the compound parabolic type collector 62 is an optically transmissive non-imaging optical element wetted to a high refractive index material covering the array of light sources 54. The angular distribution of light exiting the non-imaging optical element is large, and therefore the non-imaging optical element efficiently couples light from the array of light sources 54 to the first light recycling film 52. The non-imaging optical element can be made to provide more collimation by wetting the light recycling film to the output face of the non-imaging optical element. In certain embodiments, the compound parabolic type collector 62 as well as the light-recycling film 52 advantageously mixes the light generated by the array of light sources 54. Other types of non-imaging optical elements (as well as imaging optical elements) may be used in different embodiments. Additionally, additional components such as a light guide, a diffuser, one or more additional light recycling films and a spatial light modulator may also be included.

Although light sources comprising a plurality of different color may benefit from the use of light recycling films, light sources that emit a single color as well as white light sources may also benefit. For example, the light recycling film may advantageously mix the light from the light source to produce a more uniform intensity output.

Although specific examples have been described above, wide variation in design is contemplated. For example, the number, size, dimension, shape, configuration, arrangement, and order of the various components can vary. For example, the light recycling structure, also referred to herein as an optical member having a plurality of total internal reflection structures formed thereon, need not be limited to a film. In addition to being a sheet or layer, the light recycling structure more generally can have any other length, width, thickness or shape. The light recycling structure can be rigid or flexible. A film may be flexible and may rely on another structure such as a substrate for support and/or to provide rigidity. As used herein a film may be 0.2 mm or thinner. In contrast, a sheet is thicker. The light recycling structure can be integrated together with another element. For example, the prisms may be formed on a diffuser or light guide. Accordingly, the functionality of the diffuser or light guide as described above can be combined in a single component with the light recycling structure. The prisms forming the light recycling structure may also be integrated on filters, lenses, or other optical or non-optical components.

Additionally, the light recycling structures can be included together with any one or combination of the components described herein such as the light sources, the light guide, reflector, the diffuser, and the spatial light modulators. Accordingly, any of these components can be excluded. Similarly, additional components may be added. The components themselves may be different than specifically disclosed herein. For example, although the shape of the light guide, reflector, diffuser, light recycling structure and spatial light modulator have been described as planar, other shapes, sizes, and configurations are possible. The order of the components may also vary. Similarly, the different components can be assembled together in different ways. For example, some or all of the elements may be laminated together. The components may be otherwise mechanically secured in position with respect to each other.

Similarly, although the light recycling structures have been described for use in displays, the light recycling structures can be used in other applications as well. For example, the light recycling structures may be used in lighting such as for portable lights including flashlights, for display lighting, down lighting, architectural lighting, automobile, nautical, aviation lighting, and signage.

Figure 20:
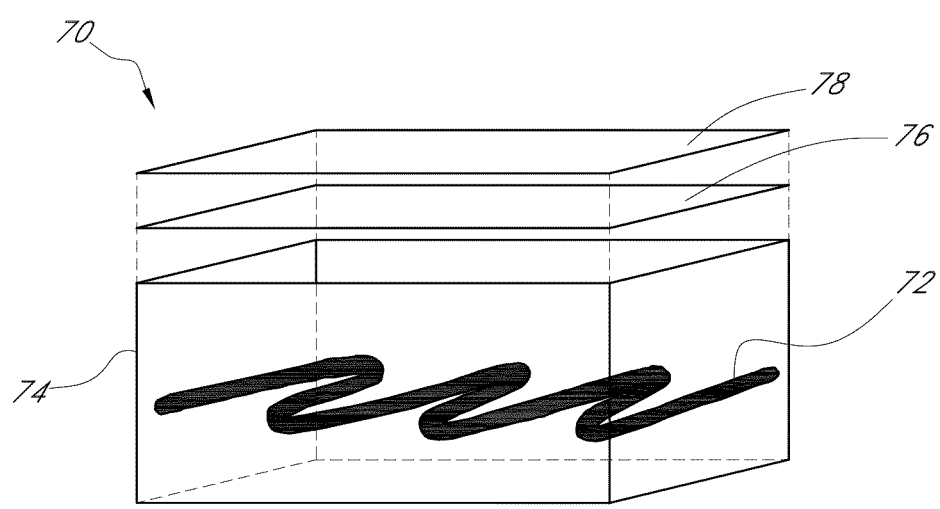
FIG. 20 is an exploded view of selected components of an example embodiment of a lighting apparatus that includes a light emitter in a hollow light box, a diffuser, and a light recycling film.

Certain of the light recycling structures disclosed herein may also be used in other types of light apparatus. Such lighting apparatus may be used, for example, for down lighting, display case lighting, outdoor lighting, architectural lighting, and the like. For example, such lighting apparatus may be used in applications where a more focused beam of light is to be directed to a target. Such lighting apparatus may comprise one or more light emitters, a light box, a diffuser, and a light recycling film. FIG. 20 is an exploded view of selected components of an example embodiment of lighting apparatus 70 that includes a light emitter 72 positioned within a hollow light box 74. In an example embodiment, the interior walls of the hollow light box 74 are provided with a light colored or reflective surface to decrease the amount of light absorbed by the walls of the walls 74. These wall may for example be painted white. These walls may form a highly reflecting diffuse surface. In an example embodiment, the light emitter 72 is a fluorescent light bulb, although other light emitters are used in other embodiments, such as incandescent light bulbs, gas discharge lamps, arrays of light emitting diodes and the like. In certain embodiments, the lighting apparatus 70 includes a combination of different types of light sources.

Still referring to FIG. 20, an optional diffuser 76 is positioned over one side of the light box 74, and a light recycling film 78 is positioned over the diffuser 76. These components 76, 78 are arranged such that light generated by the light emitter 72 passes through the optional diffuser 76 and the light recycling film 78 as it exits the light box 74. In certain embodiments the diffuser 76 is excluded as the light box 74 is effectively a diffuser. For example, the interior walls may be diffusely reflecting and my diffuse the light from the light emitter 72. The light recycling film 78 may alternatively comprise a plurality of light recycling films and may include any of the light recycling films disclosed herein, or an equivalent thereof. Such a light recycling film 78 used with a light apparatus 70 such as shown may have ridges and grooves with larger dimensions than with a light recycling film used with a spatial light modulator, as disclosed in certain of the other embodiments described herein.

Figure 21:
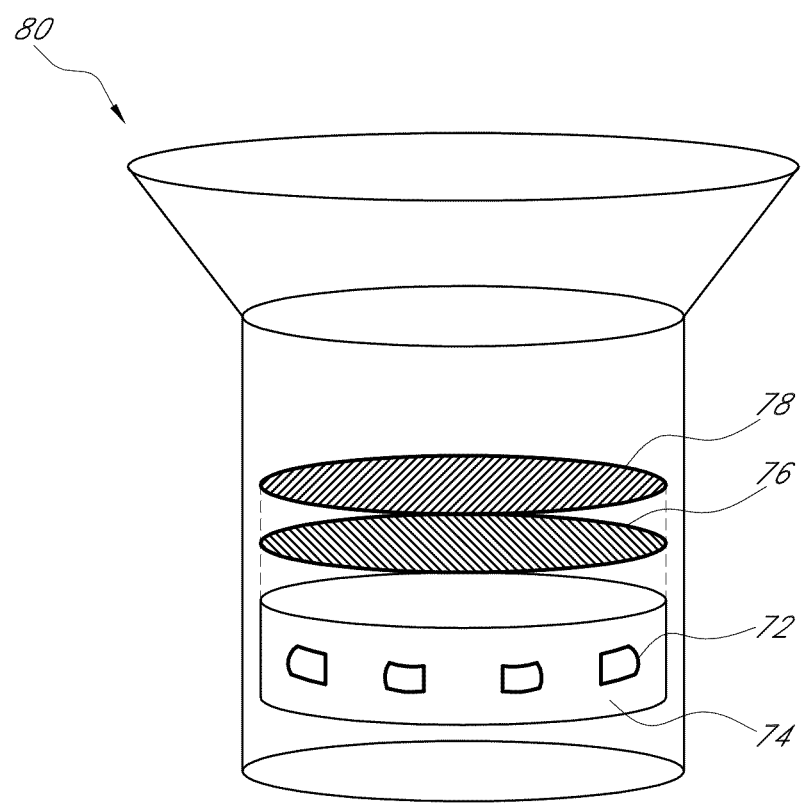
FIG. 21 is an exploded view of selected components of an example embodiment of a lighting apparatus comprising a plurality of light emitters disposed about a light guide, a diffuser, and a light recycling film.

The lighting apparatus light 70 may have a wide variety of different configurations, and is not limited to boxlike shapes or other rectangular forms. For example, FIG. 21 illustrates a light apparatus 80 that is cylindrical. This lighting apparatus 80 includes certain of the components of the lighting apparatus 70 illustrated in FIG. 20. In the embodiments shown in FIG. 21, however, the hollow light box is replaced with a solid light guide 74, configured to transmit light from light emitters disposed about the edges of the light guide 72. The light guide 74 may comprise a solid material that is substantially optically transmissive to the wavelength of light output by the emitters. The light guide 72 in FIG. 21, as well as the hollow light box shown in FIG. 20 may be generally referred to as light boxes.

Figure 22A:
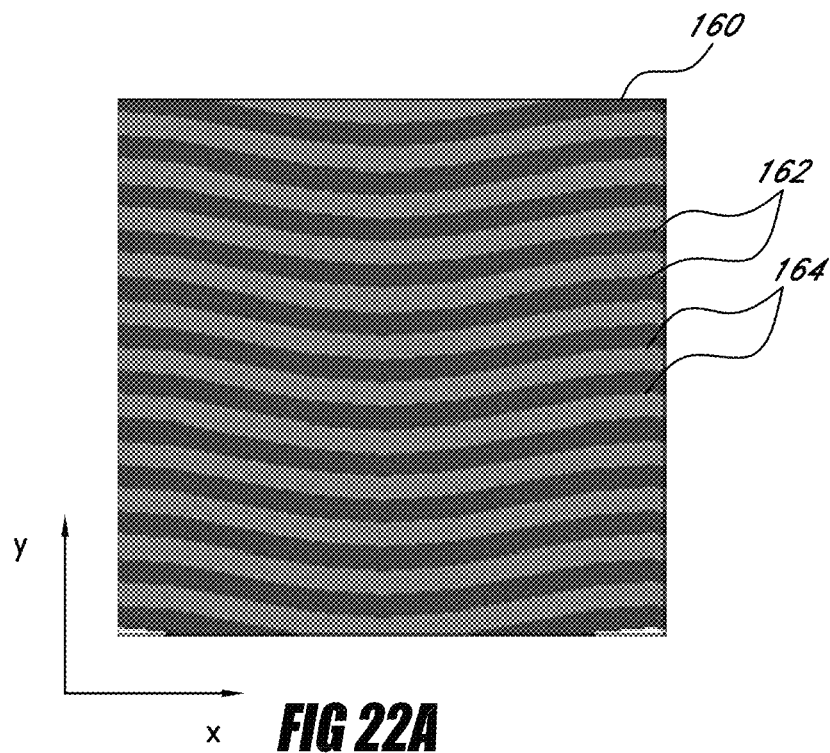
FIG. 22A is a top surface view (parallel to the xy plane) of an example embodiment of a light recycling film having a sinusoidal pattern.
Figure 22B:
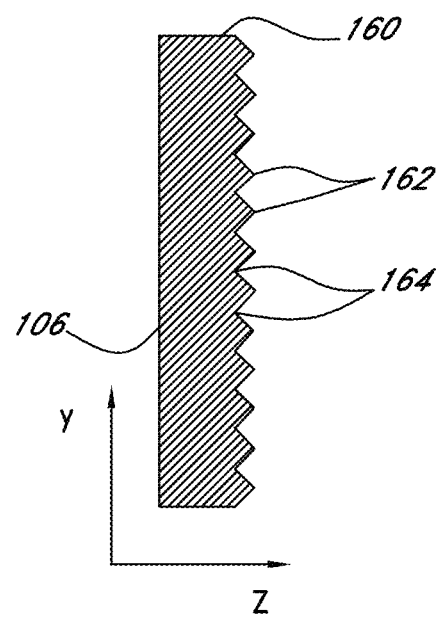
FIG. 22B is a cross-sectional view (parallel to yz plane) of the light recycling film of FIG. 22A.

Other designs for the lighting apparatus as well as for the light recycling film are possible. For example, in certain embodiments, the elongate features in the light recycling films described herein may comprise nonlinear elongated features. FIG. 22A is a top surface view (parallel to the xy plane) of such an example embodiment comprising a light recycling film 160 having a nonlinear pattern of elongated features. In this example embodiment, the light recycling film includes a plurality of nonlinear, nonintersecting ridges 162 and grooves 164. Each ridge 162 and groove 164 extends longitudinally in a direction parallel to the x axis. The ridges 162 and grooves 164, however, simultaneously oscillate in a lateral direction that is parallel to the y axis in this example. As shown, ridges 162 and grooves 164 are laterally displaced in an undulating manner, up and down in the +y and −y direction as the ridge 162 and groove 164 progresses left to right along the x direction. The amount off lateral displacement of the ridges substantially matches that of the grooves such that the width of the ridges and grooves as well as their periodicity is unchanging with position, e.g., from left to right or along the x axis. The width and periodicity need not be so limited in different embodiments. FIG. 22B is a cross-sectional view (parallel to yz plane) of the light recycling film 160 of FIG. 22A.

While the example light recycling film 160 illustrated in FIG. 22A includes a pattern of ridges and grooves having a sinusoidal oscillation pattern, other nonlinear spatially varying patterns are used in other embodiments. These non-linear patterns may be oscillating and may have a period oscillation that is constant or that varies. In some embodiments, the pattern may have sharper turns upward and downward along the y direction, and may for example, be characterized more as "zig-zag". The turns may, however, be smooth in some embodiments. Random and pseudo random patterns are also possible.

Figure 22C:
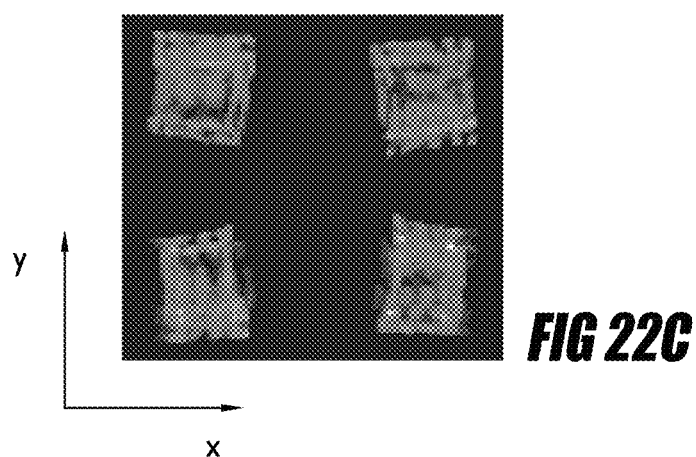
FIG. 22C is a plot of the illuminance of the light projected through two of the light recycling films of FIG. 22A that have been crossed at a 90° angle, and onto the rear surface of the light guide.
Figure 22D:
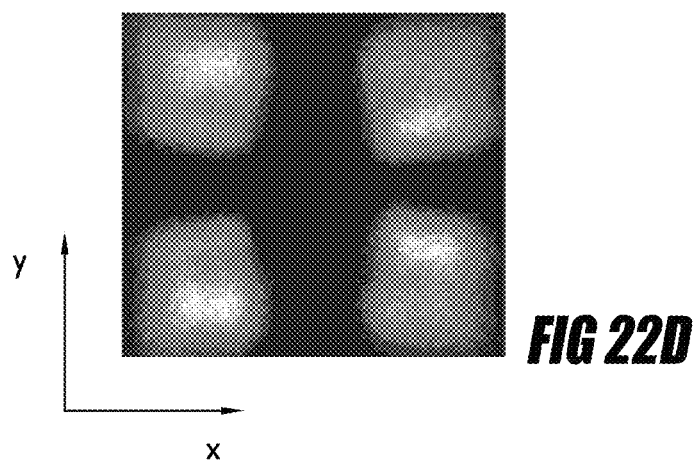
FIG. 22D is a plot of the illuminance of light projected through a 3° diffuser, through two of the light recycling films of FIG. 22A that have been crossed at a 90° angle, and onto the rear surface of the light guide.

When used with a backlit display, the light recycling film 160 illustrated in FIGS. 22A and 22B is advantageously capable of collecting light from a larger spatial area of the light guide 18. For example, when light rays are traced through two sequential light recycling films 160 that are crossed perpendicular to each other, the resulting pattern of illuminated spatial regions on the rear surface 18' of the light guide 18 are illustrated in FIG. 22C. As illustrated, this pattern of illuminated regions is substantially larger than the pattern associated with two sequential linear light recycling films 22, as illustrated in FIG. 13B. Moiré effects resulting from periodic extractor patterns may be reduced with this larger pattern as described above. While the light recycling films 160 used to obtain the pattern illustrated in FIG. 22C were crossed at a 90° angle, the films are crossed at other angles in other embodiments. A diffuser is optionally used to diffuse the light from the light guide 18 and further reduce the Moiré effect; FIG. 22D is a plot of the illuminance of light projected onto the rear surface 18' of the light guide 18 when a 3° Gaussian diffuser is included.

In a modified embodiment, multiple nonlinear arrays of elongate features illustrated in FIG. 22A are combined on a single light recycling film. For example, FIG. 22E illustrates a composite nonlinear light recycling film 160' formed by combining two of the light recycling films 160 depicted in FIG. 22A oriented at a right angle. This combination produces an array of pyramids with nonlinear sides.

In this example embodiment, the light recycling film includes a first set of nonlinear, non-intersecting grooves 164*a* as well as a second set of nonlinear, non-intersecting grooves 164*b*. In this particular embodiment, the first and second sets of grooves 164*a*, 164*b*, are oriented substantially orthogonal to each other.

In the embodiment shown, for example, each groove 164*a* in the first set extends longitudinally in a direction parallel to the x axis. The grooves 164*a*, however, simultaneously oscillate in a lateral direction that is parallel to the y axis in this example. As shown, grooves 164*a* are laterally displaced in an undulating manner, up and down in the +y and −y direction as the groove 164*a* progresses left to right along the x direction. The width of the grooves 164*a* as well as their periodicity is unchanging with position, e.g., from left to right or along the x axis.

Additionally, each groove 164*b* in the second set extends longitudinally in a direction parallel to the y axis. The grooves 164*b*, however, simultaneously oscillate in a lateral direction that is parallel to the x axis in this example. As shown, the grooves 164*b* are laterally displaced in an undulating manner, left and right in the −x and +x direction as the grooves 164*b* progresses upward along the y direction. The width of the grooves 164*b* as well as their periodicity is unchanging with position, e.g., with movement upward or along the y axis, although in other embodiments the width and periodicity may change.

While the example light recycling film 160 illustrated in FIG. 22A includes first and second patterns of grooves having a sinusoidal oscillation pattern, other nonlinear spatially varying patterns are used in other embodiments. These non-linear patterns may be oscillating and may have a period oscillation that is constant or that varies. In some embodiments, the pattern may have sharper turns upward and downward along the y direction or left and right along the x direction and may for example, be characterized more as "zig-zag". The turns may, however, be smooth in some embodiments. Random and pseudo random patterns are also possible.

Non-linear rows and columns of pyramids result as shown in FIG. 22E. As with certain of the other embodiments disclosed herein, the pyramids have an upright ("everted") or inverted configuration. The grooves 164*a* and 164*b*, however, may be replaced with ridges to produce an array of inverted pyramids. In other modified embodiments, a composite array is formed by combining the patterns of more than two arrays of nonlinear light recycling films, and/or a composite array is formed by combining the patterns of two nonlinear light recycling films at an angle other than 90°.

Use of a nonlinear light recycling film 160 to collect light from a larger spatial portion of the light guide advantageously provides the spatial light modulator with more uniform illumination. In embodiments wherein the spatial light modulator includes a plurality of pixels, uniform illumination advantageously reduces Moiré effects, as described above. For example, in one configuration the non-linear non-intersecting elongate features (e.g., ridges or grooves) in a nonlinear light recycling film 160 oscillate an integral number of periods within each pixel of the spatial light modulator. While diffusers are optionally used to cause light to diffuse the light from the light guide, use of strong (that is, high angle) diffusers can disadvantageously reduce the gain of the backlit display, increase the thickness of the backlit display, and/or increase the cost of the backlit display. For example, in certain embodiments use of one or more of the nonlinear light recycling films 160 illustrated in FIG. 22A provides similar advantages as compared to use of a diffuser with one or more linear light recycling films 22, such as that illustrated in FIG. 2A. In a modified embodiment, a diffuser is formed on a surface of the light recycling film 160 without any microstructures, such as the second surface 106 illustrated in FIG. 22B.

For example, in one embodiment a first backlit display includes two perpendicularly-crossed nonlinear light recycling films 160 of FIG. 22A and a 3° diffuser. A second backlit display includes two perpendicularly-crossed linear light recycling films 22 of FIG. 2A and a 10° diffuser. With other parameters held constant, such as the light guide dimensions, the first backlit display produces a higher gain (1.77) than the second backlit display (1.72). Even in modified embodiments wherein use of a nonlinear light recycling film 160 yields little or no gain advantage as compared to linear light recycling films, the nonlinear light recycling film are still configurable to collect light from a larger spatial area of the light guide, thus helping to reduce Moiré effects.

Figure 23A:
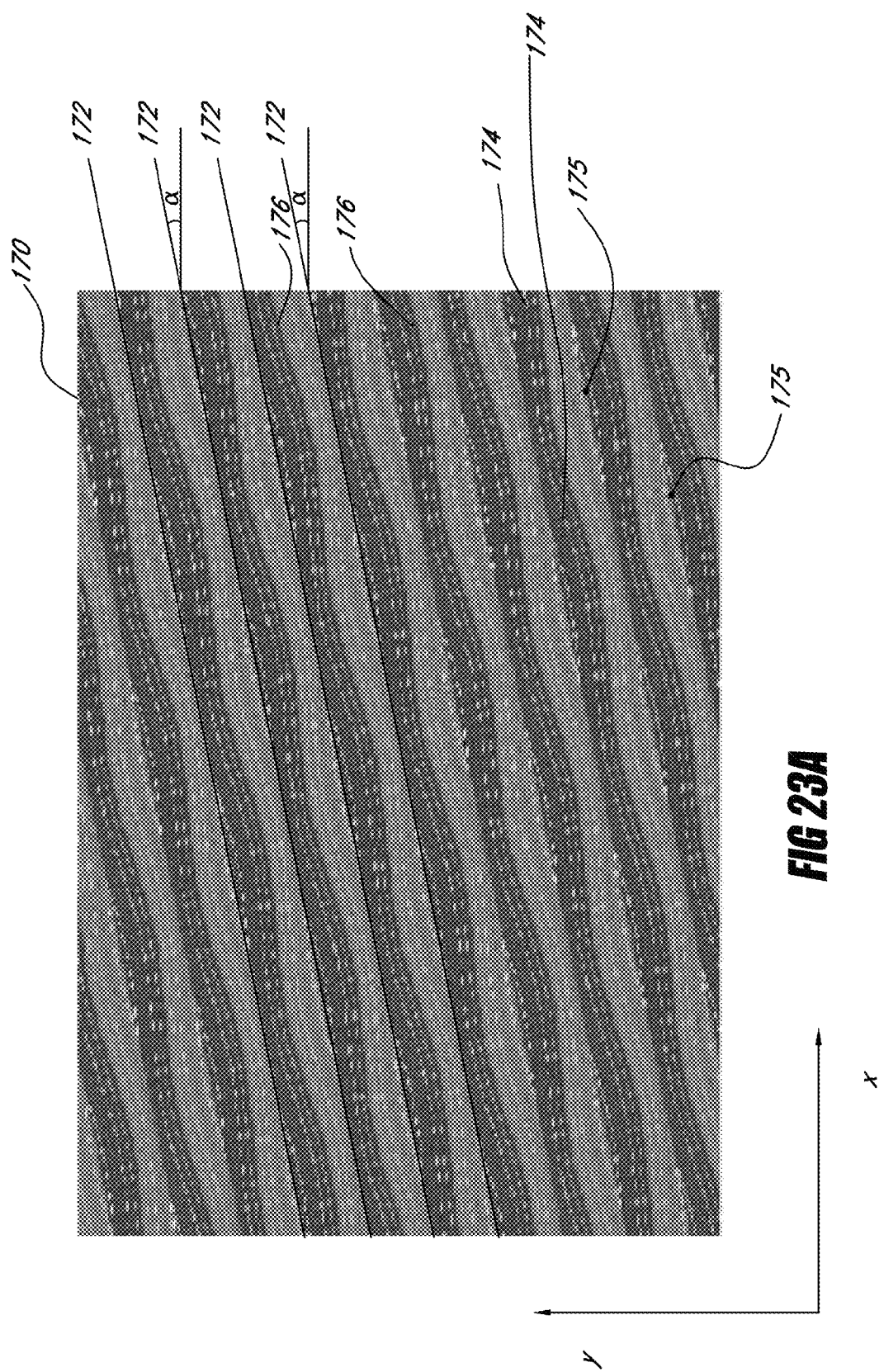
FIG. 23A is a top surface view (in the xy plane) of a modified light recycling film having a plurality of linear elongate features (e.g., grooves or ridgelines) with varying elevation, which are oriented with respect to the x axis by an angle α.

In certain embodiments, the modified light recycling film 112 illustrated in FIG. 3A is further modified such that linear non-intersecting elongate features that define the film (for example, the parallel ridges 108 and grooves 110 of FIG. 3A) have a varying elevation over the surface of the film. For example, FIG. 23A is a top surface view (in the xy plane) of a modified light recycling film 170 having a plurality of linear elongate features with varying elevation, which are indicated by lines 172. The lines 172 are rotated with respect to the x axis by an angle α. In one example, this modified light recycling film 170 may comprise a plurality of linear grooves that follow along the lines 172. The depth or pitch of the grooves may vary or oscillate. In embodiments where the angle of the sloping sidewalls of the groove remains constant, the width of the groove will increase with deeper groove depths. Accordingly, as the groove varies in depth, so too will the groove vary in width. In other embodiments, the angle of the sloping sidewalls of the groove may vary. In another example, the modified light recycling film 170 may comprise a plurality of ridges of varying or oscillating height. A more generalized description applicable to both ridges and grooves is provided below with continued reference to FIG. 23A.

Figure 23B:
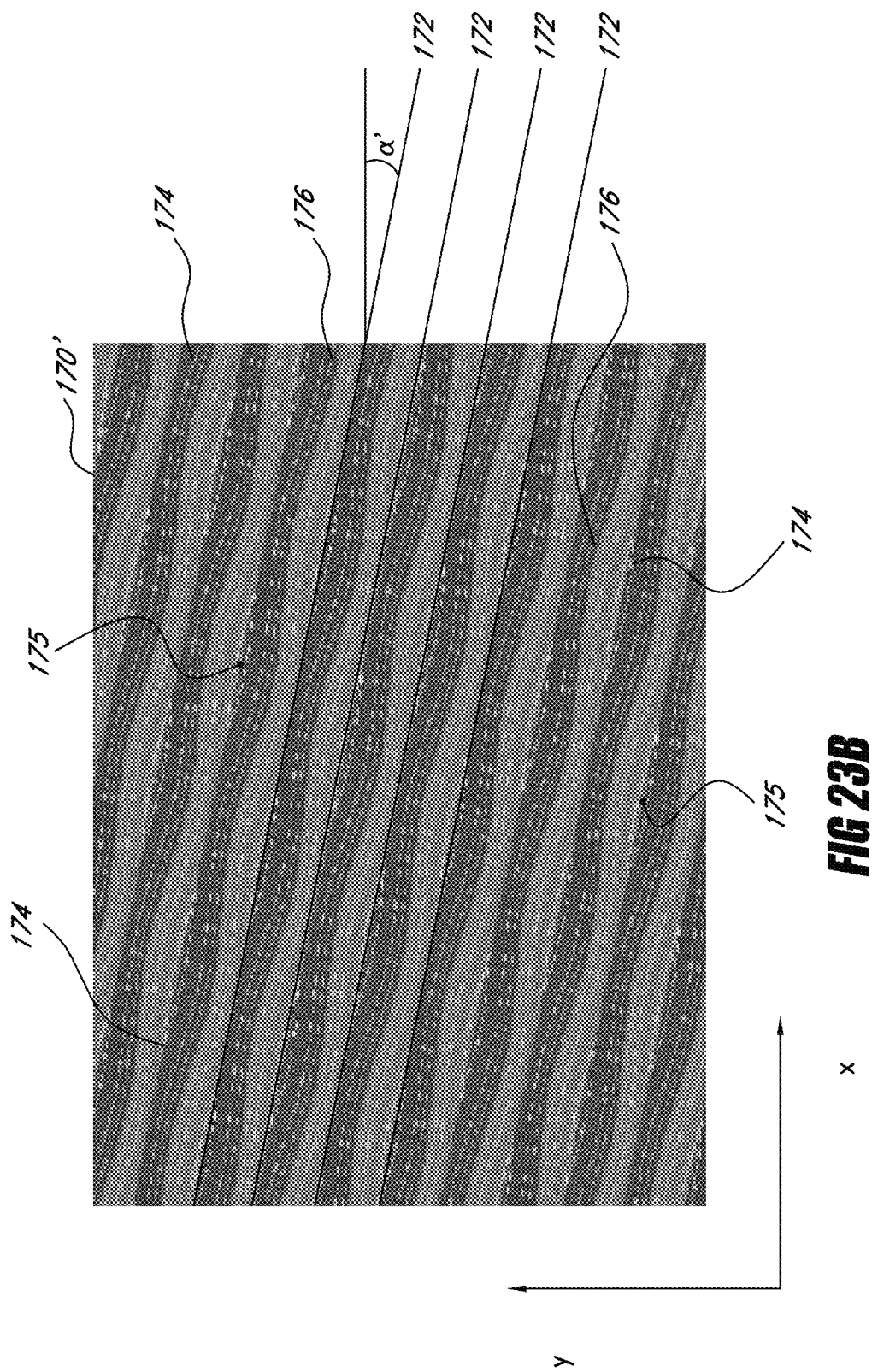
FIG. 23B is a top surface view (in the xy plane) of a modified light recycling film having a plurality of linear elongate features (e.g., grooves or ridgelines) with varying elevation, which are oriented with respect to the x axis by an angle α'.

As illustrated by FIG. 23A, the elevation of the surface of the modified light recycling film 170 is indicated by broken contour lines 174 which are drawn at a constant elevation with respect to a reference or base, and elevation extrema along the lines 172 are located at points 175. Between adjacent lines 172 is a constant-elevation nonlinear interface path 176. The interface path 176 oscillates laterally between the surrounding lines 172, depending on the relative elevation difference between the elongate features at a selected point along the interface path 176. For example, the interface path 176 is relatively far from a selected line 172 at a point adjacent an extrema 175 along the selected line 172. FIG. 23B is a top surface view of a modified light recycling film 170' wherein the lines 172 are rotated with respect to the x axis by an angle α'. In this example, the angle α illustrated in FIG. 23A is equal to the angle α' illustrated in FIG. 23B.

Figure 23C:
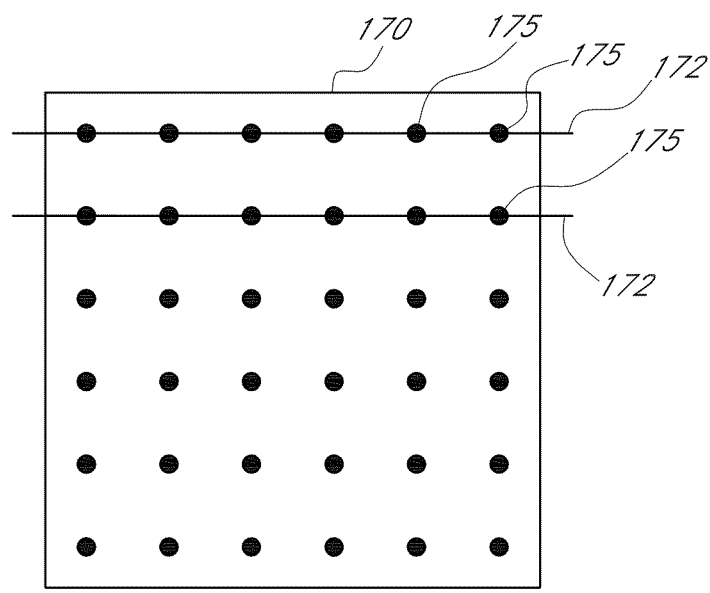
FIG. 23C is a schematic illustration of in-phase extrema points on a modified light recycling film having variable-elevation elongate features.
Figure 23D:
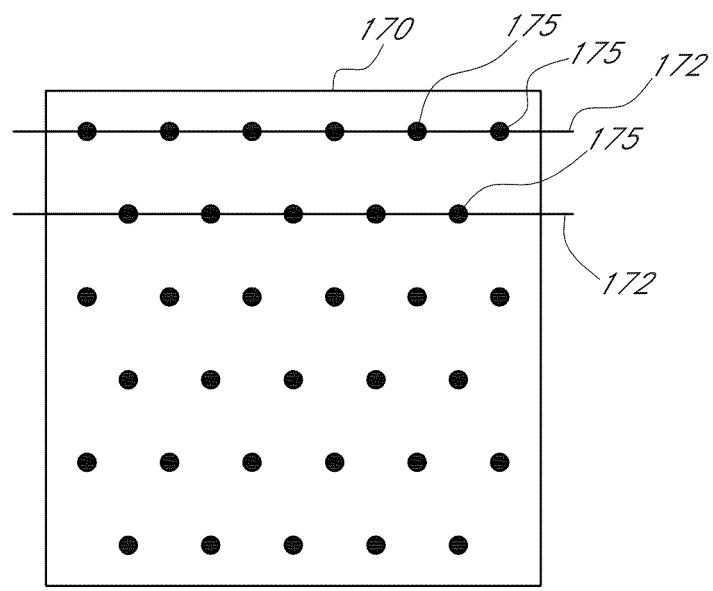
FIG. 23D is a schematic illustration of 180° out-of-phase extrema points on a modified light recycling film having variable-elevation elongate features.

In FIGS. 23A and 23B, the extrema 175 positioned along adjacent lines 172 are out of phase with respect to each other by an angle less than 180°. In embodiments wherein respective extrema positioned along adjacent lines 172 are in phase with each other, the array of extrema points 175 will form a rectangular array, as schematically illustrated in FIG. 23C. In embodiments wherein extrema positioned along adjacent lines 172 are out of phase with respect to each other by an angle of 180°, a selected extrema point 175 will be positioned between two extrema points on an adjacent line 172, as schematically illustrated in FIG. 23D.

Figure 23E:
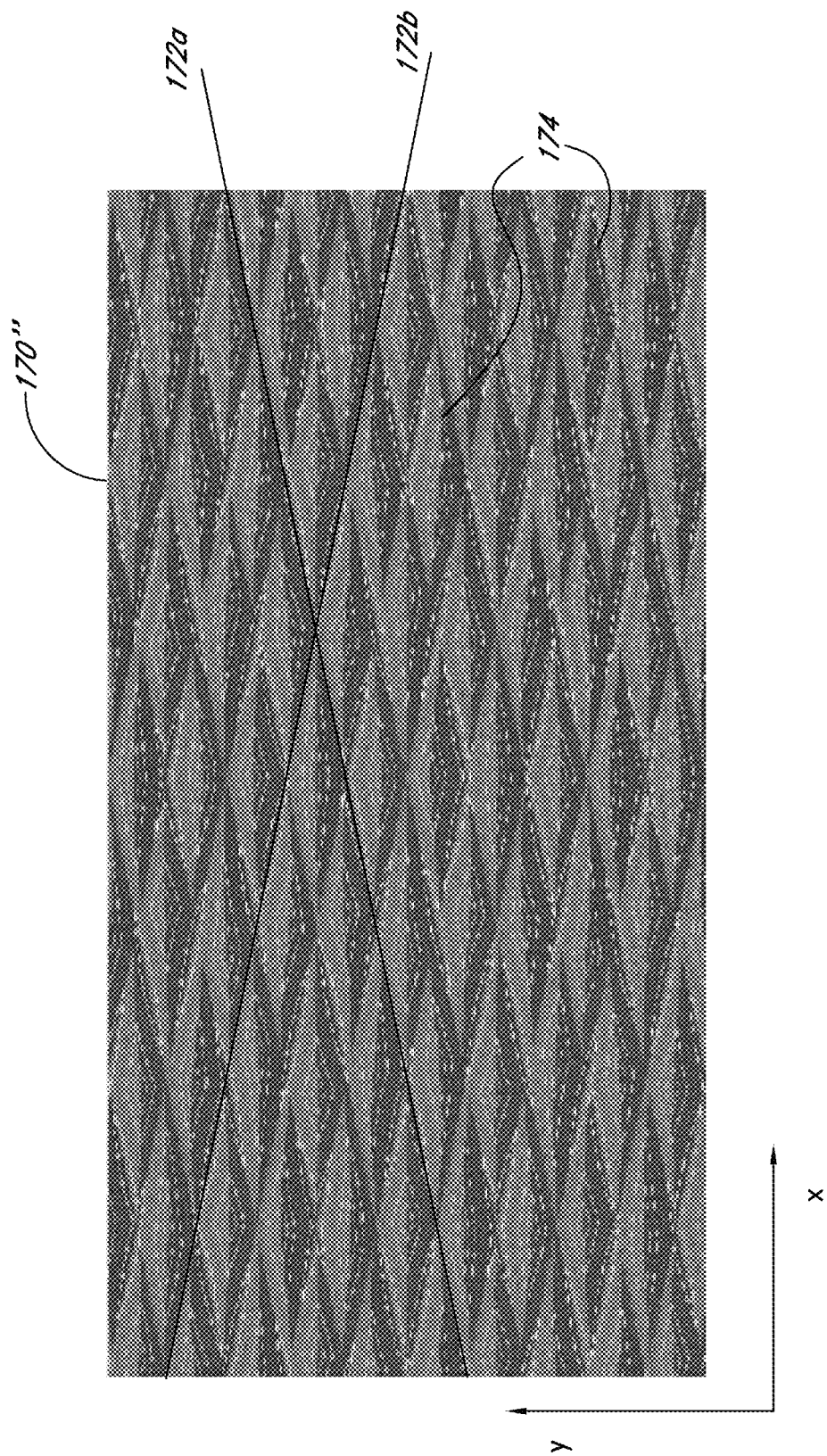
FIG. 23E is a top surface view (parallel to xy plane) of a composite modified light recycling film formed by combining the pattern of elongate features rotated by an angle α (FIG. 23A) with the pattern of elongate features rotated by an angle α' (FIG. 23B).

In an example embodiment, the sets of elongate features used to form the modified light recycling films 170, 170' illustrated in FIGS. 23A and 23B are combined to form a composite modified light recycling film. FIG. 23E schematically illustrates a two-array composite modified light recycling film 170" formed by combining the elongate features in FIG. 23A represented by lines 172 and rotated by an angle α with the elongate features in FIG. 23B represented by lines 172 and rotated by an angle α'. In FIG. 23E, line 172a is parallel to the array of lines corresponding to modified light recycling film 170, and line 172b is parallel to the array of microstructure lines corresponding to the modified light recycling film 170'. The elevation of the surface of the modified light recycling film 170" is indicated by broken contour lines 174 which are drawn at a constant elevation with respect to a base. As described herein, the lines 172 correspond to varying-height ridges and varying-height grooves in alternative embodiments.

FIG. 23F is a top surface view (in the xy plane) of a modified light recycling film 178 having a plurality of linear parallel elongate features with varying elevation, which are indicated by lines 172. Lines 172 are parallel with respect to the x axis. In the embodiment illustrated in FIG. 23F, the elongate features have an elevation that varies sinusoidally. In other embodiments the elongate features have an elevation that varies according to another pattern, such as a triangle pattern (that is, linearly decreasing for a selected segment, followed by linearly decreasing for a selected segment). In still other embodiments, the elongate features have an elevation that varies according to a pattern of connected arc segments.

Figure 23G:
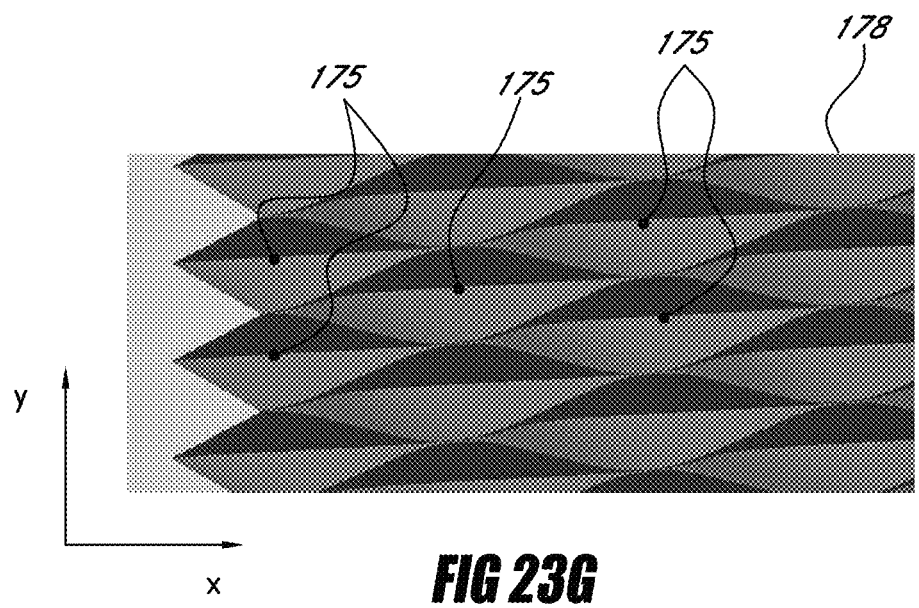
FIG. 23G is a perspective view of the modified light recycling film of FIG. 23F, wherein the extrema points correspond to elevation minima in an inverted configuration.
Figure 23H:
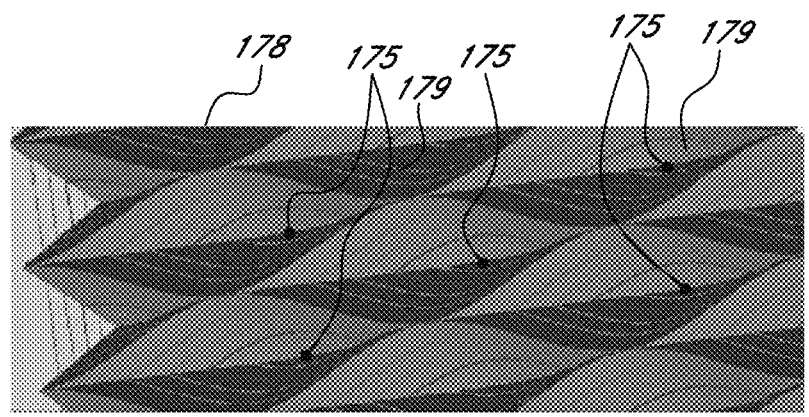
FIG. 23H is a perspective view of the modified light recycling film of FIG. 23F, wherein the extrema points correspond to elevation maxima in an upright ("everted") configuration.

In FIG. 23F, the elevation of the surface of the modified light recycling film 178 is indicated by contour lines 179 which are drawn at a constant elevation with respect to a base, and elevation extrema along the lines 172 are located at points 175. In the example embodiment illustrated in FIG. 23F, the extrema points 175 are 180° out of phase, as schematically illustrated in FIG. 23D. FIG. 23G is a perspective view of the modified light recycling film 178 of FIG. 23F, wherein the extrema points 175 correspond to elevation minima. This configuration is referred to as inverted. FIG. 23H is a perspective view of the modified light recycling film 178 of FIG. 23F, wherein the extrema points 175 correspond to elevation maxima. This configuration is referred to as upright or "everted". Additional contour lines 179 are also shown.

Figure 23I:
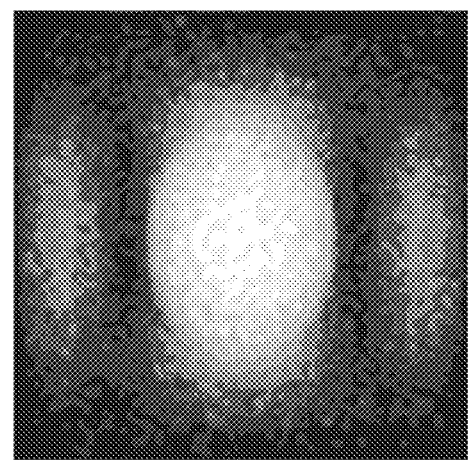
FIG. 23I is a plot of the intensity of the light transmitted by the light recycling film of FIG. 23F.

FIG. 23I is a plot of intensity versus angle in the vertical and horizontal directions (parallel to the x and y axes, respectively) of the transmitted light distribution for the light recycling film 178 illustrated in FIG. 23F. In certain embodiments, the light recycling film 178 is advantageously capable of collecting light from a larger spatial area of the light guide 18, as compared to certain other nonlinear composite light recycling films disclosed herein (for example, see FIGS. 22E and 23E). Thus, the configuration illustrated in FIG. 23F advantageously reduces Moiré patterns in certain embodiments, and, because it includes a single set of parallel linear elongate features, may simplify fabrication in certain embodiments. Furthermore, the gain of the modified light recycling film 178 of FIG. 23F is comparable to certain other nonlinear composite light recycling films disclosed herein (for example, see FIGS. 22E and 23E).

In some embodiments, height variations may be introduced that are small. For example, the ridges may vary in height by an amount small compared to the height of the ridge.

The structures and methods described herein may be used in a wide variety of applications. The light recycling films may be used in displays such as LCD televisions, monitors, handheld devices such as personal digital assistants (PDAs), cell phones, watches, etc., portable computers such as notebooks, navigational devices such as GPS and instrumentation, including automobile, nautical, and aviation instrumentation, as well as stadium and roadside screens. A wide variety of other display applications are also possible. The light recycling structures may be used in lighting applications including down lighting, display lighting, architectural lighting, traffic and airport lighting etc. The applications should not be limited to these. The structures and methods described herein may be employed in medical, industrial, military, and consumer applications as well as in other areas.

In certain embodiments, at least a portion of the elongate features that comprise the light recycling film are provided with a modified surface profile. One example of such a modified surface profile is achieved by exposing a master used in the formation of the light recycling film to a stress. The stress can be generated by the application of energy, chemicals, machining or pressure to a portion of the master. For example, energy can be applied as either electrical energy or focused heat, such as by an infrared laser or a pencil tip torch. For instance, focused laser energy can be used to melt a very small amount of material in a localized area of the master.

Use of chemicals to stress the surface of the master are particularly useful in embodiments wherein the master comprises a plastic material. For example, in such embodiments, application of a solvent on the master causes the film surface to pucker slightly, thereby affecting the orientation of the elongate features.

Machining techniques are useful for altering the internal mechanical stress of the master, and are particularly useful in embodiments wherein the master includes internal stresses. An example machining technique is micro-drilling, wherein small amounts of material are removed from the master to slightly relieve local mechanical stresses. This stress relieve creates minute distortion of the elongate features.

Application of mechanical pressure can be used to produce localized distension involving the movement of material in the master, such as by contact of the master against projecting blunt fingers. Such localized distension preserves material mass while creating stress, and can be provided by a mechanical device, such as by a finger roller that is rolled against the master.

The light recycling film may be formed from the master. In certain embodiments, the master may be used form intermediate components such as copies or replicas that may be used to form the light recycling film. In some embodiments, the master may be a copy itself. A wide variety of such processing variations are possible.

Regardless of the method of application, stress can be used to introduce an aberration in the structure of the features that comprise the light recycling film, wherein the aberration affects the transmission of light through the feature. In one embodiment, the aberration is introduced in only a selected spatial area of the light recycling film. Additional information regarding use of stress to modify the elongate features of the light recycling film is provided in U.S. Pat. No. 6,871,966.

Figure 24:
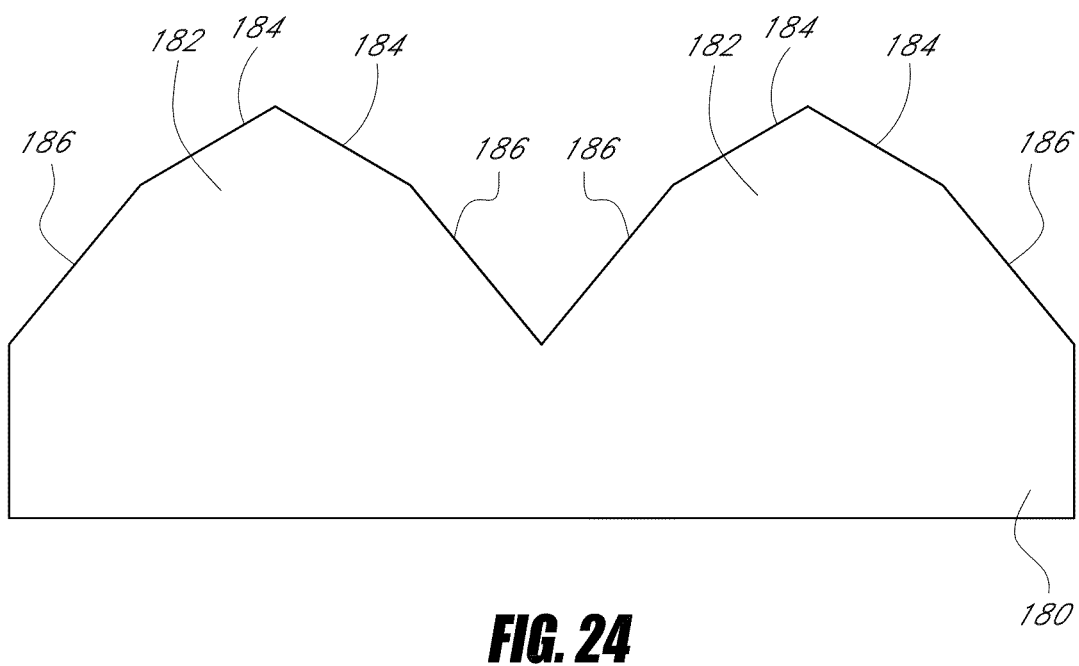
FIG. 24 is a partial cross-sectional view of a light recycling films having elongate features with multiple faceted edges.

In a modified embodiment, the elongate features have multiple faceted edges. For example, FIG. 24 illustrates a partial cross-sectional profile of a light recycling film 180 that includes a pair of elongate features 182 that have multiple faceted edges. In particular, in the embodiment illustrated in FIG. 24, the elongate features 182 include a first pair of faceted edges 184 and a second pair of faceted edges 186. In other embodiments, the elongate features 182 include more than two pairs of faceted edges. Elongate features having multiple faceted edges can be formed, for example, using a cutter with faceted edges corresponding to the shape of the features to be formed.

In another modified embodiment, the tip of the cutting tool used to form the elongate grooves defines a straight groove root parallel to the xy plane, but the cutting tool oscillates within a plane containing the groove root. That is, the cutting tool oscillates to and fro parallel to the direction of the groove. The attitude of the tool with respect to the substrate is controlled as a function of the position of the cutting tool along the groove. In this mode of operation, the center of oscillation is the tip of the cutting tool. This mode produces a groove having groove walls that undulate such that the included groove angle expands and contracts along the length of the groove. As the cutting tool oscillates in accordance with this embodiment, the included groove angle will vary across the surface of the film. Additional information regarding certain methods wherein the cutting tool is oscillated are provided in U.S. Pat. No. 6,984,047 entitled "Retroreflector with controlled divergence made by the method of groove undulation," issued Jan. 10, 2006.

In another modified embodiment, the tip of the cutting tool used to form the elongate grooves defines a straight, constant elevation groove root, while the cutting tool oscillates within planes perpendicular to the groove root. That is, the cutting tool oscillates transverse to the direction of the groove. In this method, while the magnitude of the groove angle itself will not change along the length of the groove, the progressive oscillation the cutting tool along the groove will result in variations in the angle between the xy plane and the groove walls. Additional information regarding embodiments that may work are provided in U.S. Pat. No. 6,984,047 entitled "Retroreflector with controlled divergence made by the method of groove undulation," issued Jan. 10, 2006, subsection "Fourth Mode" (paragraph [0068]).

A wide range of variations in design are possible. Each of the parameters described herein may be varied and various combinations of different features may be used in different embodiments. Still other variations are possible. For example, the on-axis gain may depend on the index of refraction of the light recycling film. Accordingly, the index of refraction of the light recycling film may be tuned as desired. Similarly, in cases where two or more sheets are employed, each of the sheets need not have the same index of refraction. Still other parameters, including those described herein as well as others may be varied. Additionally, features may be added, features may be removed, and different arrangements and configurations may also be used, include those yet to be devised. Other variations are also possible.

While the foregoing detailed description discloses several embodiments of the present invention, it should be understood that this disclosure is illustrative only and is not limiting of the present invention. It should be appreciated that the specific configurations and operations disclosed can differ from those described above, and that the methods described herein can be used in contexts other than light recycling films.

What is claimed is:

1. An optical member comprising an array of total internal reflection structures, the optical member comprising:
    an optically transmissive film having a surface;
    a first plurality of non-intersecting elongate features formed in the surface; and
    a second plurality of non-intersecting elongate features formed in the surface, the first plurality of non-intersecting elongate features being oriented at an angle with respect to the second plurality of non-intersecting elongate features that is less than 30°,
    wherein each of the non-intersecting elongate features in the first plurality extends across the multiple non-intersecting elongate features in the second plurality thereby defining the total internal reflection structures, and at least one of the total internal reflection structures comprises a prism having facets having rounded edges,
    wherein at least a portion of the second plurality of nonintersecting elongate features has a height or depth that is smaller than a height or depth of at least a portion of the first plurality of non-intersecting elongate features but that is greater than 50% of the height or depth of the portion of the first plurality of non-intersecting elongate features,
    wherein a thickness of the optically transmissive film is selected based at least partly on a pitch of at least some non-intersecting elongate features of the first plurality or the second plurality so as to provide a desired on-axis luminance enhancement of light passing through the film.

2. The optical member of claim 1, wherein at least one of the total internal reflection structures comprises a prism having planar facets.

3. The optical member of claim 1, wherein each of the facets in the prisms has substantially the same projected area.

4. The optical member of claim 1, further comprising a third plurality of non-intersecting elongate features.

5. The optical member of claim 1, wherein the pitch of at least some non-intersecting elongate features in the second plurality is unequal.

6. The optical member of claim 1, wherein the first and second plurality of non-intersecting elongate features are arranged non-symmetrically.

7. The optical member of claim 1, wherein the optically transmissive film has a rough surface.

8. The optical member of claim 1, wherein at least one of the elongate features includes a first pair of faceted edges and a second pair of faceted edges.

9. The optical member of claim 8, wherein the first and second pairs of faceted edges are formed using a cutter corresponding to a shape of the features to be formed.

10. The optical member of claim 1, wherein the non-intersecting elongate features comprise grooves, and the grooves are formed using a cutting tool that defines a groove root parallel to a plane of the surface of the film and that oscillates within a plane containing the groove root.

11. The optical member of claim 1, wherein the non-intersecting elongate features comprise grooves, and the grooves are formed using a cutting tool that defines a groove root parallel to a plane of the surface of the film and that oscillates transverse to the direction of the groove root.

12. The optical member of claim 1, wherein an index of refraction of the film is selected to provide a desired on-axis luminance enhancement of light passing through the film.

13. The optical member of claim 1, wherein the optical member is used in an LCD television or a monitor for a handheld device.

14. The optical member of claim 1, wherein the film is a composite light recycling film.

15. The optical member of claim 1, wherein stress is used to introduce an aberration in the structure of the features in at least a portion of the film.

16. The optical member of claim 1, wherein the angle is less than 10°.

* * * * *